US012719062B2

(12) United States Patent
Lee et al.

(10) Patent No.: US 12,719,062 B2
(45) Date of Patent: Aug. 25, 2026

(54) NOBLE METAL SINGLE ATOM OR CLUSTER-POROUS MOLYBDENUM CARBIDE/CARBON NANOCOMPOSITE USING DYNAMIC ARRANGEMENT OF NOBLE METAL ATOMS, METHOD FOR MANUFACTURING SAME, CATALYST FOR HYDROGEN EVOLUTION REACTION OR HYDROGEN OXIDATION REACTION COMPRISING SAME, AND ELECTRODE COMPRISING THE CATALYST

(71) Applicant: Korea Advanced Institute of Science and Technology, Daejeon (KR)

(72) Inventors: Jinwoo Lee, Daejeon (KR); Seongbeen Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 740 days.

(21) Appl. No.: 18/171,089

(22) Filed: Feb. 17, 2023

(65) Prior Publication Data

US 2023/0378481 A1 Nov. 23, 2023

(30) Foreign Application Priority Data

May 23, 2022 (KR) ........................ 10-2022-0063019

(51) Int. Cl.
*H01M 4/92* (2006.01)
*C25B 1/04* (2021.01)
(Continued)

(52) U.S. Cl.
CPC ............... *H01M 4/926* (2013.01); *C25B 1/04* (2013.01); *C25B 11/054* (2021.01); (Continued)

(58) Field of Classification Search
CPC ... B01J 21/18; B01J 23/40; B01J 35/53; B01J 35/615; B01J 35/633; B01J 35/635; (Continued)

(56) References Cited

U.S. PATENT DOCUMENTS

2005/0096213 A1* 5/2005 Thompson ............. B01J 23/652 502/185
2014/0121097 A1* 5/2014 Phillips .................... B01J 37/16 502/325
2014/0221706 A1* 8/2014 Kim ......................... B01J 27/22 585/240

FOREIGN PATENT DOCUMENTS

KR 20210069301 6/2021
KR 20210069301 A * 6/2021 ............. B01J 35/19
(Continued)

OTHER PUBLICATIONS

Shanshan Niu et al., "Single-atom Pt promoted Mo2C for electrochemical hydrogen evolution reaction." Journal of Energy Chemistry 57, pp. 371-377. (Year: 2021).*
(Continued)

*Primary Examiner* — Patricia L. Hailey
(74) *Attorney, Agent, or Firm* — DUAN MORRIS LLP; Gregory M. Lefkowitz; Brandon A. Chan

(57) ABSTRACT

The present disclosure relates to a noble metal single atom or cluster-porous molybdenum carbide/carbon nanocomposite using dynamic arrangement of noble metal single atoms or clusters, a method for preparing the same, a catalyst for hydrogen evolution reaction or hydrogen oxidation reaction including the same, and an electrode including the catalyst. The noble metal single atom or cluster-porous molybdenum carbide/carbon nanocomposite of the present disclosure, which is prepared by uniformly bonding a noble metal catalyst only on molybdenum carbide in the form of single atoms or clusters in atomic scale through selective dynamic
(Continued)

arrangement, may have remarkably improved catalytic activity and kinetic characteristics since the utilization of the noble metal is improved through selective dynamic arrangement of the noble metal catalyst, may have high stability due to strong interaction between the noble metal catalyst and the molybdenum carbide, and may have high tolerance to carbon monoxide.

In addition, the use of the noble metal can be decreased and the nanocomposite can be used as a catalyst for electrochemical hydrogen evolution reaction (HER) or hydrogen oxidation reaction (HOR) under acidic and basic conditions because it has superior catalytic activity, high stability and high tolerance to carbon monoxide. Furthermore, it can be prepared at low cost by a simple synthesis method and has good commercial viability.

20 Claims, 37 Drawing Sheets

(51) Int. Cl.
*C25B 11/054* (2021.01)
*C25B 11/069* (2021.01)
*C25B 11/081* (2021.01)
*H01M 4/86* (2006.01)
*H01M 4/88* (2006.01)

(52) U.S. Cl.
CPC .......... *C25B 11/069* (2021.01); *C25B 11/081* (2021.01); *H01M 4/8652* (2013.01); *H01M 4/8846* (2013.01)

(58) Field of Classification Search
CPC ...... B01J 35/647; B01J 37/084; B01J 37/088; C01B 32/949; H01M 4/926; C25B 11/081; C25B 11/054; C25B 11/069
USPC ........ 429/524; 502/101, 177, 185, 313, 325, 502/339
See application file for complete search history.

(56) References Cited

FOREIGN PATENT DOCUMENTS

KR 20220045724 4/2022
KR 20220045724 A * 4/2022 ............. C01B 32/05

OTHER PUBLICATIONS

Lili Lin et al., "Pt/Mo2C/C-cp as a highly active and stable catalyst for ethanol electrooxidation." Journal of Power Sources 345, pp. 182-189. (Year: 2017).*

Xueliang Fan et al., "Synergistic effect of dual active sites over Ru/α-MoC for accelerating alkaline hydrogen evolution reaction." Applied Catalysis B: Environmental 318, pp. 1-40 (includes Supplemental Information). (Year: 2022).*

Juan Li et al., "a-MoC Supported Noble Metal Catalysts for Water-Gas Shift Reaction: Single-Atom Promoter or Single-Atom Player." Journal of Physical Chemistry Letters 12, pp. 11415-11421. (Year: 2021).*

Li Sun et al., "High-Efficiency Water Gas Shift Reaction Catalysis on a-MoC Promoted by Single-Atom Ir Species." ACS Catalysis 11, pp. 5942-5950. (Year: 2021).*

Baiyin Wei et al., "Efficient and Stable Co/b-Mo2C Catalyst for Hydroformylation." ACS Catalysis 11, pp. 14139-14327. (Year: 2021).*

Supplemental Information for "Facile Synthesis of porous Mo2C/C composites by using luffa sponge-derived carbon template in molten salt media," by Minzhong Huang et al. (Year: 2019).*

Supporting Information for "Quasi-paired Pt atomic sites on Mo2C promoting selective four-electron oxygen reduction," by Lei Zhang et al. (Year: 2021).*

Zhang, L., et al., "Quasi-Paired Pt Atomic Sites on Mo2C Promoting Selective Four-Electron Oxygen Reduction," Adv. Sci. 2021 , 8, 2107344.

Huang, M., et al., "Facile synthesis of porous Mo2C/C composites by using luffa sponge-derived carbon template in molten salt media," R. Soc. open sci., May 22, 2019; 6: 190547; http://dx.doi.org/10.1098/rsos.190547.

* cited by examiner

◇: β-$Mo_2C$, ◆: α-$MoC_{1-x}$, ○: Pt

◇: β-$Mo_2C$, ◆: α-$MoC_{1-x}$, ○: Pt

◇: $\beta$-$Mo_2C$, ◆: $\alpha$-$MoC_{1-x}$, ○: Pt

FIG. 9B

◇: $\beta$-$Mo_2C$, ◆: $\alpha$-$MoC_{1-x}$, ○: Pt

FIG. 26
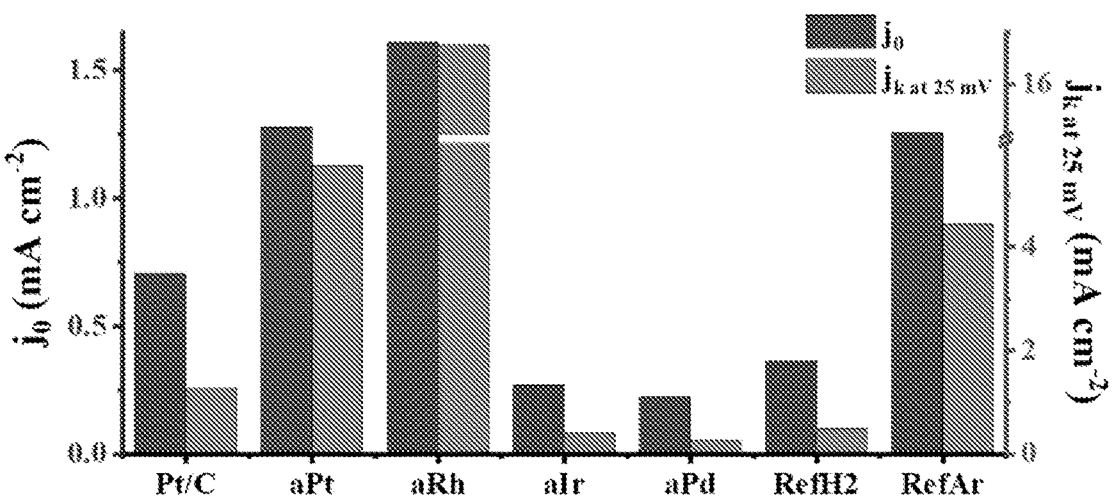
FIG. 27
$j_0$
$j_{k\ at\ 25\ mV}$
$j_0$ (mA cm$^{-2}$ mg$_{NM}^{-1}$)
$j_{k\ at\ 25\ mV}$ (mA cm$^{-2}$ mg$_{NM}^{-1}$)
0
30
60
180
210
0
50
100
150
1000
1050
Pt/C
aPt
aRh
aIr
aPd
RefH2
RefAr
FIG. 28
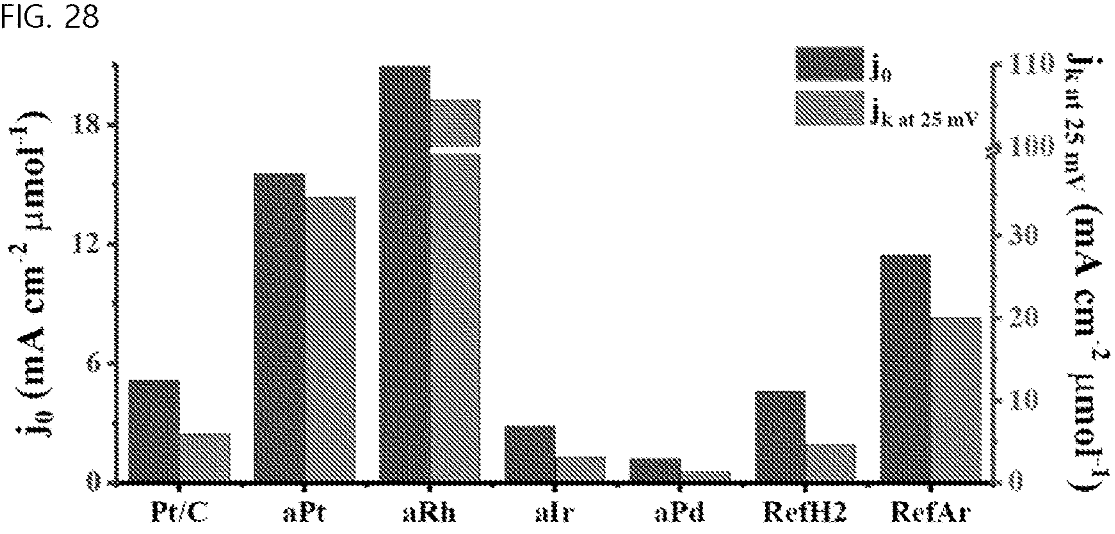

NOBLE METAL SINGLE ATOM OR CLUSTER-POROUS MOLYBDENUM CARBIDE/CARBON NANOCOMPOSITE USING DYNAMIC ARRANGEMENT OF NOBLE METAL ATOMS, METHOD FOR MANUFACTURING SAME, CATALYST FOR HYDROGEN EVOLUTION REACTION OR HYDROGEN OXIDATION REACTION COMPRISING SAME, AND ELECTRODE COMPRISING THE CATALYST

CROSS-REFERENCE TO RELATED APPLICATION

This application claims priority to Korean Patent Application No. 10-2022-0063019 filed on May 23, 2022, and all the benefits accruing therefrom under 35 U.S.C. § 119, the contents of which in its entirety are herein incorporated by reference.

TECHNICAL FIELD

The present disclosure relates to a noble metal single atom or cluster-porous molybdenum carbide/carbon nanocomposite using dynamic arrangement of noble metal atoms, a method for manufacturing the same, a catalyst for hydrogen evolution reaction or hydrogen oxidation reaction including the same, and an electrode including the catalyst.

BACKGROUND

Because the existing fossil fuel-based energy cycle has the problems of limited reserves and environmental issues, the development of a sustainable and environment-friendly energy cycle capable of resolving these problems is essential. In order to solve these problems, a lot of investments and developments have been made for new renewable energy sources such as solar light and wind power. They are important factors in power generation as much as to account for 29% of total power generation as of 2020. However, the new renewable energy source has the problems of mismatch of supply and demand due to the intermittence of supply and frequent occurrence of surplus power and power shortage. Accordingly, it is essential to develop an appropriate energy storage system (ESS) capable of strong surplus power and allowing the stored power to be used when power shortage occurs.

In this regard, hydrogen energy cycle is one of the most ideal energy cycles. The hydrogen energy cycle can store surplus power by converting electrical energy to chemical energy of hydrogen using a water electrolyzer. In addition, the chemical energy of hydrogen can be converted to electrical energy by a fuel cell for utilization when power shortage occurs. Especially, whereas the energy efficiency of the existing devices using thermal energy is only about 30-40%, the energy efficiency can be increased to 60-80% when an electrochemical conversion device is used.

For embodiment of the hydrogen energy cycle having such advantages, it is essential to optimize the efficiency of electrochemical conversion devices such as a fuel cell and an electrolytic cell, extend the life span of components and reduce cost.

The key reactions of the two electrochemical conversion devices include hydrogen evolution reaction (HER) and hydrogen oxidation reaction (HOR), which are electrochemical reactions of hydrogen, and oxygen reduction reaction (ORR) and oxygen evolution reaction (OER), which are electrochemical reactions of oxygen. A proton-exchange membrane fuel cell (PEMFC) and a proton-exchange membrane water electrolysis cell (PEMWC), which are currently commercially available proton-exchange membrane-based conversion devices, are operated under acidic conditions, and a platinum-based catalyst is used in each electrode in order to improve energy efficiency by lowering the high activation energy of electrochemical reactions.

However, a large amount of noble metal is necessary because of the very slow kinetic characteristics of ORR and OER under acidic conditions, and it is also difficult to achieve the stability of the noble metal catalyst at feasible level. In addition, because the components should endure the acidic conditions, the choice of material is limited and the cost is increased. For this reason, the material cost is 40% for catalysts and 20% for components based on the total production cost for 500,000 systems/year. Therefore, it is necessary to reduce the cost of catalysts by reducing the amount of noble metal used in the catalysts for oxygen reactions or extending their life span and to significantly reduce the cost of the components for realization of commercialization.

Meanwhile, an anion-exchange membrane fuel cell (AEMFC) and an anion-exchange membrane water electrolysis cell (AEMWC), which are anion-exchange membrane-based electrochemical conversion devices, are drawing attentions as start-up technologies capable of effectively solving the problems of the cation-exchange membrane-based electrochemical conversion devices. Because the anion-exchange membrane-based conversion devices are operated under basic conditions, the choice of material is diverse and the cost of the components can be reduced significantly. In addition, the cost of catalysts can be reduced effectively because high performance and stability can be achieved even with non-noble metal catalysts owing to superior kinetic characteristics of electrochemical oxygen reactions (ORR and OER) under the basic conditions.

However, because platinum-based catalysts have tens to hundreds of times lower kinetic characteristics for HER and HOR and low stability under basic conditions, it is necessary to improve the performance and stability of the catalysts for HER and HOR under basic conditions for commercialization of the anion-exchange membrane-based electrochemical conversion devices.

The high price of noble metal catalysts owing to their low deposits is a big obstacle to commercialization. Therefore, to improve the performance of noble metals per mass is one of the most effective strategies for reducing cost. For this, most strategies aim at increasing the specific surface area of noble metals by reducing the size of the noble metal catalysts in the form of nanoparticles. However, the noble metal catalysts are easily poisoned by CO, etc. As a result, the catalytic performance is decreased severely as the active sites of the catalysts are blocked, and the life span of the catalysts is decreased due to decreased stability caused by the high surface energy of the noble metal chemical species on the surface. Therefore, it is necessary to optimize the utilization of noble metals by increasing the dispersibility of noble metals through adequate catalyst design and, at the same time, to resolve the poisoning and life span issues.

Under basic conditions, the kinetic characteristics of HER and HOR are determined by the dissociation of water. The platinum-based catalysts have low kinetic characteristics under basic conditions due to low water dissociation characteristics. Therefore, the kinetic characteristics of noble metal active site can be improved greatly by introducing active sites having high performance around the noble metal active sites.

A noble metal-based atomically dispersed catalyst (ADC) refers to a catalyst wherein a noble metal element is supported on a support in the form of single atoms or nanometer-sized clusters and the noble metal-support system serves as an active site. Because nearly all noble metal is exposed on the surface, the utilization of the noble metal can be maximized and the cost of the catalyst material can be reduced significantly by decreasing the use of the noble metal. In addition, it is advantageous in that the noble metal-support interface is maximized and the effect of the support can be maximized.

However, when wet chemistry-based low-temperature synthesis is used for the ADC due to the high surface energy of the atomic-scale noble metal, there is limitation in improving performance owing to the limited loading amount of the noble metal, and the resulting catalyst has low stability due to absence of adequate bonding between the catalyst and the support. The alternatives to the wet chemistry-based method are synthesis techniques requiring expensive equipment or experimental procedure and having low productivity, such as ALD, CVD, mass-selected soft landing, etc., which are not suitable for commercialization.

REFERENCES OF THE RELATED ART

Patent Documents (Patent document 1) Korean Patent Publication No. 2021-0069301.

SUMMARY

In order to solve the problems described above, the present disclosure is directed to providing a noble metal single atom or cluster-porous molybdenum carbide/carbon nanocomposite wherein a noble metal catalyst is dynamically arranged selectively on molybdenum carbide in atomic scale.

The present disclosure is also directed to providing a catalyst for hydrogen evolution reaction, which includes the noble metal single atom or cluster-porous molybdenum carbide/carbon nanocomposite according to the present disclosure.

The present disclosure is also directed to providing a catalyst for hydrogen oxidation reaction, which includes the noble metal single atom or cluster-porous molybdenum carbide/carbon nanocomposite according to the present disclosure.

In addition, the present disclosure is directed to providing an electrode including the catalyst for hydrogen evolution reaction according to the present disclosure.

In addition, the present disclosure is directed to providing an electrode including the catalyst for hydrogen oxidation reaction according to the present disclosure.

In addition, the present disclosure is directed to providing an apparatus for hydrogen evolution, which includes an electrode including the catalyst for hydrogen evolution reaction according to the present disclosure, a counter electrode and an electrolyte or an ionic liquid.

In addition, the present disclosure is directed to providing an apparatus for hydrogen reduction, which includes an electrode including the catalyst for hydrogen oxidation reaction according to the present disclosure, a counter electrode and an electrolyte or an ionic liquid.

In addition, the present disclosure is directed to providing a method for preparing a noble metal single atom or cluster-porous molybdenum carbide/carbon nanocomposite.

The present disclosure provides a noble metal single atom or cluster-porous molybdenum carbide/carbon nanocomposite, which includes: a porous carbon support; molybdenum carbide nanoparticles bonded on the porous carbon support; a noble metal catalyst supported on the molybdenum carbide nanoparticles as being dispersed as single atoms, clusters or a mixture thereof; and a plurality of mesopores formed between the porous carbon support, wherein the noble metal catalyst is selectively bonded on the molybdenum carbide nanoparticles as it is dynamically arranged in atomic scale.

In addition, the present disclosure provides a catalyst for hydrogen evolution reaction including the noble metal single atom or cluster-porous molybdenum carbide/carbon nanocomposite according to the present disclosure.

In addition, the present disclosure provides a catalyst for hydrogen oxidation reaction including the noble metal single atom or cluster-porous molybdenum carbide/carbon nanocomposite according to the present disclosure.

In addition, the present disclosure provides an electrode including the catalyst for hydrogen evolution reaction according to the present disclosure.

In addition, the present disclosure provides an electrode including the catalyst for hydrogen oxidation reaction according to the present disclosure.

In addition, the present disclosure provides an apparatus for hydrogen evolution which includes an electrode including the catalyst for hydrogen evolution reaction according to the present disclosure, a counter electrode and an electrolyte or an ionic liquid.

In addition, the present disclosure provides an apparatus for hydrogen reduction which includes an electrode including the catalyst for hydrogen oxidation reaction according to the present disclosure, a counter electrode and an electrolyte or an ionic liquid.

In addition, the present disclosure provides a method for preparing a noble metal single atom or cluster-porous molybdenum carbide/carbon nanocomposite, which includes: (a) a step of preparing a mixture solution wherein an amphiphilic block copolymer, a molybdenum precursor, a carbon precursor, an organic polymer and a noble metal catalyst precursor are mixed in a solvent; (b) a step of preparing a composite wherein the molybdenum precursor, the carbon precursor, the organic polymer and the noble metal catalyst precursor are dispersed in a hydrophilic polymer of the amphiphilic block copolymer through evaporation-induced self-assembly (EISA) by removing the solvent from the mixture solution; (c) a step of preparing a composite wherein a noble metal catalyst is dispersed in a porous molybdenum carbide/carbon composite support as the amphiphilic block copolymer is removed and mesopores are formed by heat-treating the composite of (b) firstly under inert gas atmosphere; (d) a step of controlling the valence electronic structure of molybdenum carbide by heat-treating the firstly heat-treated composite secondly under atmosphere of a mixture of inert gas and oxygen gas; and (e) a step of preparing a noble metal single atom or cluster-porous molybdenum carbide/carbon nanocomposite wherein the noble metal catalyst is redispersed and bonded on the porous molybdenum carbide/carbon composite support in the form of single atoms, clusters or a mixture thereof by heat-treating the secondly heat-treated composite thirdly under inert gas atmosphere, wherein the noble metal catalyst is selectively bonded on molybdenum carbide nanoparticles of the noble metal single atom or cluster-porous molybdenum carbide/carbon nanocomposite as it is dynamically arranged in atomic scale.

In addition, the present disclosure provides a method for preparing a noble metal single atom or cluster-porous molybdenum carbide/carbon nanocomposite, which includes: (a) a step of preparing a mixture solution wherein an amphiphilic block copolymer, a molybdenum precursor, a carbon precursor and an organic polymer are mixed in a solvent; (b) a step of preparing a composite wherein the molybdenum precursor, the carbon precursor and the organic polymer are dispersed in a hydrophilic polymer of the amphiphilic block copolymer through evaporation-induced self-assembly (EISA) by removing the solvent from the mixture solution; (c) a step of preparing a porous molybdenum carbide/carbon composite support as the amphiphilic block copolymer is removed and mesopores are formed by heat-treating the composite of (b) firstly under inert gas atmosphere; (d) a step of controlling the valence electronic structure of molybdenum carbide by heat-treating the firstly heat-treated porous molybdenum carbide/carbon composite support secondly under atmosphere of a mixture of inert gas and oxygen gas; (e) a step of dispersing a noble metal catalyst precursor solution in a dispersion including the secondly heat-treated porous molybdenum carbide/carbon composite support and then supporting the noble metal catalyst precursor on the porous molybdenum carbide/carbon composite support by wet impregnation; and (f) a step of preparing a noble metal single atom or cluster-porous molybdenum carbide/carbon nanocomposite wherein the noble metal catalyst is redispersed and bonded on the porous molybdenum carbide/carbon composite support in the form of single atoms, clusters or a mixture thereof by heat-treating the porous molybdenum carbide/carbon composite support on which the noble metal catalyst precursor is supported thirdly, wherein, in the step (f), the noble metal catalyst is selectively bonded on molybdenum carbide nanoparticles of the porous molybdenum carbide/carbon nanocomposite as it is dynamically arranged in atomic scale.

The noble metal single atom or cluster-porous molybdenum carbide/carbon nanocomposite of the present disclosure, which is prepared by uniformly bonding a noble metal catalyst only on molybdenum carbide in the form of single atoms or clusters in atomic scale through selective dynamic arrangement, may have remarkably improved catalytic activity and kinetic characteristics since the utilization of the noble metal is improved through selective dynamic arrangement of the noble metal catalyst, may have high stability due to strong interaction between the noble metal catalyst and the molybdenum carbide, and may have high tolerance to carbon monoxide.

In addition, the use of the noble metal can be decreased and the nanocomposite can be used as a catalyst for electrochemical hydrogen evolution reaction (HER) or hydrogen oxidation reaction (HOR) under acidic and basic conditions because it has superior catalytic activity, high stability and high tolerance to carbon monoxide. Furthermore, it can be prepared at low cost by a simple synthesis method and has good commercial viability.

The effects of the present disclosure are not limited to those described above. It is to be understood that the effects of the present disclosure include all the effects that can be inferred from the following description.

BRIEF DESCRIPTION OF DRAWINGS

FIGS. 9A and 9B show the XRD spectra of nanocomposites prepared in Examples 1 and 5 and Comparative Example 2 (FIG. 9A) and the XRD spectra magnified at a region of 36°≤2θ≤48° (FIG. 9B).

FIG. 26 shows the exchange current density ($j_0$) and diffusion-controlled kinetic current density (at 25 mV vs. RHE) ($j_k$ at 25 mV) of aNM-$Mo_xC$ nanocomposites prepared in Examples 1-5 and Comparative Example 2 and an existing Pt/C catalyst for HOR under basic condition (1 M KOH ($H_2$ with 1000 ppm CO purged), 1 mV/s).

FIG. 27 shows the exchange current density ($j_0$) and diffusion-controlled kinetic current density (at 25 mV vs. RHE) ($j_k$ at 25 mV) of aNM-$Mo_xC$ nanocomposites prepared in Examples 1-5 and Comparative Example 2 and an existing Pt/C catalyst for HOR under basic condition (1 M KOH ($H_2$ with 1000 ppm CO purged), 1 mV/s) per mass of noble metal.

FIG. 28 shows the exchange current density ($j_0$) and diffusion-controlled kinetic current density (at 25 mV vs. RHE) ($j_k$ at 25 mV) of aNM-$Mo_xC$ nanocomposites prepared in Examples 1-5 and Comparative Example 2 and an existing Pt/C catalyst for HOR under basic condition (1 M KOH ($H_2$ with 1000 ppm CO purged), 1 mV/s) per mole of noble metal.

DETAILED DESCRIPTION OF EMBODIMENTS

Figure 1A:
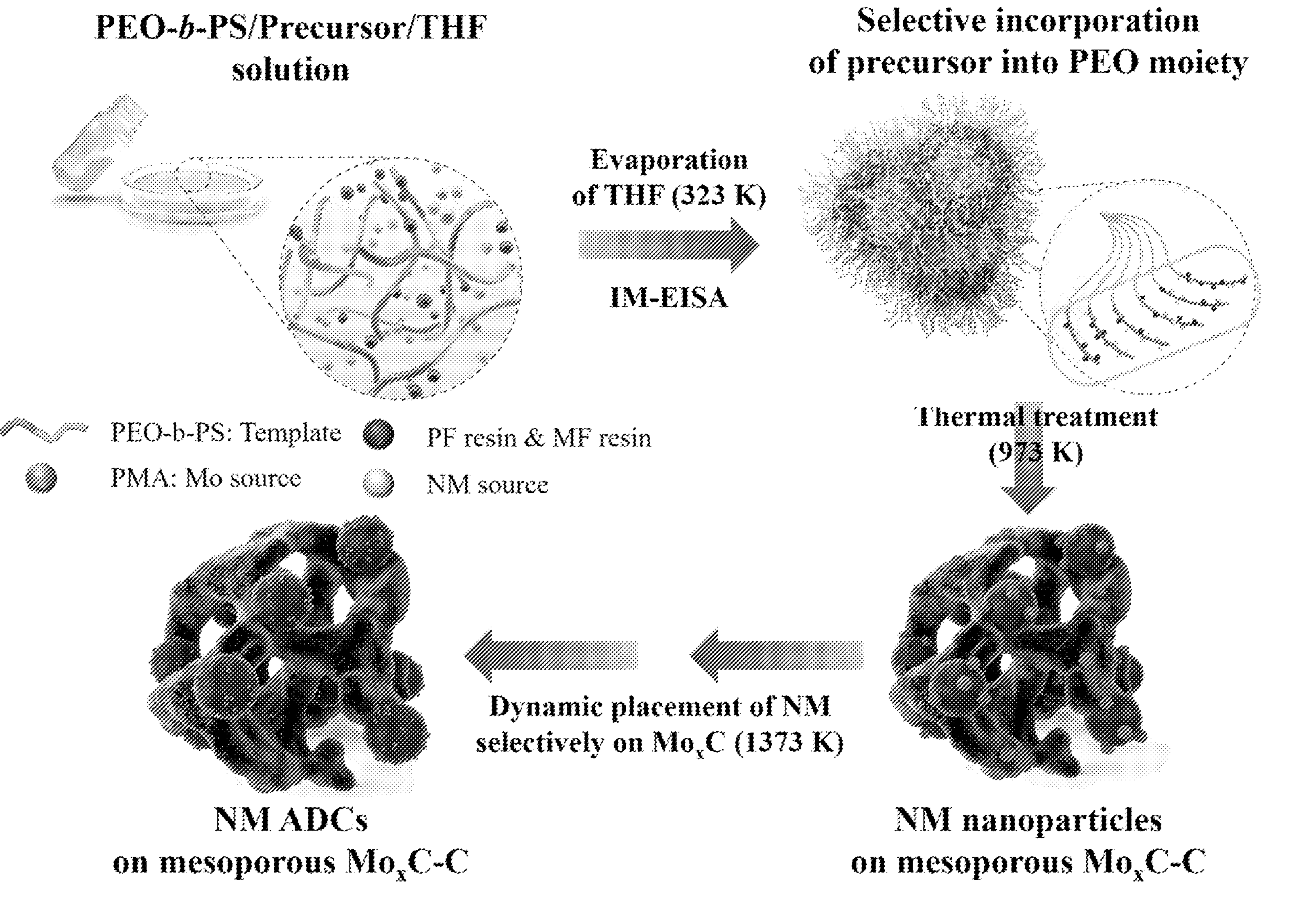
FIG. 1A schematically illustrates a method for preparing a noble metal single atom or cluster-porous molybdenum carbide/carbon nanocomposite according to the present disclosure (aNM-$Mo_xC$).

Hereinafter, exemplary embodiments of the present disclosure are described in more detail.

In the present disclosure, an atomic-scale structure refers to a structure wherein single atoms, clusters with a size of smaller than 2 nm, or a mixture thereof are dispersed.

The present disclosure relates to a noble metal single atom or cluster-porous molybdenum carbide/carbon nanocomposite using dynamic arrangement of noble metal single atoms or clusters, a method for preparing the same, a catalyst for hydrogen evolution reaction or hydrogen oxidation reaction including the same, and an electrode including the catalyst.

The noble metal single atom or cluster-porous molybdenum carbide/carbon nanocomposite of the present disclosure, which is prepared by uniformly bonding a noble metal catalyst only on molybdenum carbide in the form of single atoms or clusters in atomic scale through selective dynamic arrangement, may have remarkably improved catalytic activity and kinetic characteristics since the utilization of the noble metal is improved through selective dynamic arrangement of the noble metal catalyst, may have high stability due to strong interaction between the noble metal catalyst and the molybdenum carbide, and may have high tolerance to carbon monoxide.

In addition, the use of the noble metal can be decreased and the nanocomposite can be used as a catalyst for electrochemical hydrogen evolution reaction (HER) or hydrogen oxidation reaction (HOR) under acidic and basic conditions because it has superior catalytic activity, high stability and high tolerance to carbon monoxide. Furthermore, it can be prepared at low cost by a simple synthesis method and has good commercial viability.

Specifically, the present disclosure provides a noble metal single atom or cluster-porous molybdenum carbide/carbon nanocomposite, which includes: a porous carbon support; molybdenum carbide nanoparticles bonded on the porous carbon support; a noble metal catalyst supported on the molybdenum carbide nanoparticles as being dispersed as single atoms, clusters or a mixture thereof; and a plurality of mesopores formed between the porous carbon support, wherein the noble metal catalyst is selectively bonded on the molybdenum carbide nanoparticles as it is dynamically arranged in atomic scale.

The molybdenum carbide nanoparticles have superior water dissociation ability and can dynamically arrange the noble metal catalyst selectively through strong interaction with the noble metal catalyst. As a specific example, the molybdenum carbide nanoparticles may be α-MoC, β-$Mo_2C$ or a mixture thereof, specifically a mixture of α-MoC and β-$Mo_2C$.

The noble metal catalyst may be supported on the molybdenum carbide nanoparticles as being dispersed as single atoms, clusters or a mixture thereof, specifically as a mixture of single atoms and clusters, selectively only on the molybdenum carbide nanoparticles, and the cluster may have a size of smaller than 2 nm, specifically 0.5-3 nm, most specifically 0.5-2 nm.

The noble metal catalyst has high affinity for the molybdenum carbide nanoparticles and, thus, strong chemical bonding may be formed between the noble metal catalyst and the molybdenum carbide nanoparticles through heat treatment at high temperature. Therefore, the noble metal catalyst has superior stability as compared to a commercial Pt/C catalyst.

The noble metal catalyst may be one or more metal selected from a group consisting of Pt, Ir, Pd, Rh and Ru, specifically Pt, Rh or a mixture thereof, most specifically Pt.

The loading amount of the noble metal catalyst may be 0.5-8 wt %, specifically 2-7 wt %, more specifically 4-6 wt %, most specifically 4.6-5.3 wt %, based on 100 wt % of the noble metal single atom or cluster-porous molybdenum carbide/carbon nanocomposite. If the loading amount of the noble metal catalyst is less than 2 wt %, catalytic activity may not be exerted because the number of catalytic sites is too small. And, if it exceeds 7 wt %, hydrogen evolution reaction or hydrogen oxidation reaction may not occur effectively due to aggregation of the noble metal catalyst.

The noble metal single atom or cluster-porous molybdenum carbide/carbon nanocomposite may have a pore volume of 0.2-0.7 $cm^3/g$ and a pore size of 20-40 nm, specifically a pore volume of 0.35-0.55 $cm^3/g$ and a pore size of 22-37 nm, most specifically a pore volume of 0.4-0.53 $cm^3/g$ and a pore size of 28-37 nm.

The noble metal single atom or cluster-porous molybdenum carbide/carbon nanocomposite may have a BET surface area of 190-600 $m^2/g$, specifically 355-520 $m^2/g$, more specifically 368-416 $m^2/g$, most specifically 405-407 $m^2/g$. If the BET surface area is smaller than 190 $m^2/g$, catalytic performance may decrease because hydrogen evolution reaction or hydrogen oxidation reaction does not occur enough since the atomic-scale structure of the noble metal cannot be formed due to insufficient specific surface area.

If any of the pore volume, pore size and BET surface area of the noble metal single atom or cluster-porous molybdenum carbide/carbon nanocomposite does not satisfy the ranges described above, hydrogen evolution reaction or hydrogen oxidation reaction may not occur enough because the transfer of reactants and products is unsuccessful.

The noble metal single atom or cluster-porous molybdenum carbide/carbon nanocomposite may exhibit a first effective peak and a second effective peak at binding energies of 70-72 eV and 74-76 eV as a result of XPS analysis, when the noble metal catalyst is Pt, and the ratio of the intensity of the first effective peak to the intensity of the second effective peak may be 0.7-0.9.

The noble metal single atom or cluster-porous molybdenum carbide/carbon nanocomposite of the present disclosure may have remarkably improved catalytic activity and kinetic characteristics since the utilization of the noble metal is improved through selective dynamic arrangement of the noble metal catalyst, may have high stability due to strong interaction between the noble metal catalyst and the molybdenum carbide, and may have high tolerance to carbon monoxide.

In addition, the noble metal single atom or cluster-porous molybdenum carbide/carbon nanocomposite may be applied to various electrochemical reactions wherein existing noble metal catalysts are used. For example, it can be used for hydrogen evolution reaction and hydrogen oxidation reaction under acidic condition and electrochemical oxidation reactions of aldehydes, alcohols (methanol, ethanol, etc.), formate, etc.

In addition, the noble metal single atom or cluster-porous molybdenum carbide/carbon nanocomposite, which uses a multifunctional molybdenum carbide/carbon composite support, can resolve the fundamental limitations of the existing PEMFCs and PEMWCs by greatly improving kinetic characteristics per noble metal for HER, HOR or electrochemical oxidation reactions wherein the oxidation of hydrocarbons such as CO, etc. is the major reaction step under acidic or basic conditions through superior water dissociation characteristics, and it is industrially important in that it can replace AEMFCs and AEMWCs. In addition, it can significantly improve the economical efficiency and durability of the catalyst with high stability corresponding to several times that of the commercial Pt/C catalyst through dynamic arrangement at high temperature.

The present disclosure also provides a catalyst for hydrogen evolution reaction, which includes the noble metal single atom or cluster-porous molybdenum carbide/carbon nanocomposite according to the present disclosure.

In addition, the present disclosure provides a catalyst for hydrogen oxidation reaction, which includes the noble metal single atom or cluster-porous molybdenum carbide/carbon nanocomposite according to the present disclosure.

In addition, the present disclosure provides an electrode including the catalyst for hydrogen evolution reaction according to the present disclosure.

In addition, the present disclosure provides an electrode including the catalyst for hydrogen oxidation reaction according to the present disclosure.

In addition, the present disclosure provides an apparatus for hydrogen evolution including an electrode including the catalyst for hydrogen evolution reaction according to the present disclosure, a counter electrode and an electrolyte or an ionic liquid.

In addition, the present disclosure provides an apparatus for hydrogen reduction including an electrode including the catalyst for hydrogen evolution reaction according to the present disclosure, a counter electrode and an electrolyte or an ionic liquid.

In addition, the present disclosure provides a method for preparing a noble metal single atom or cluster-porous molybdenum carbide/carbon nanocomposite, which includes: (a) a step of preparing a mixture solution wherein an amphiphilic block copolymer, a molybdenum precursor, a carbon precursor, an organic polymer and a noble metal catalyst precursor are mixed in a solvent; (b) a step of preparing a composite wherein the molybdenum precursor, the carbon precursor, the organic polymer and the noble metal catalyst precursor are dispersed in a hydrophilic polymer of the amphiphilic block copolymer through evaporation-induced self-assembly (EISA) by removing the solvent from the mixture solution; (c) a step of preparing a composite wherein a noble metal catalyst is dispersed in a porous molybdenum carbide/carbon composite support as the amphiphilic block copolymer is removed and mesopores are formed by heat-treating the composite of (b) firstly under inert gas atmosphere; (d) a step of controlling the valence electronic structure of molybdenum carbide by heat-treating the firstly heat-treated composite secondly under atmosphere of a mixture of inert gas and oxygen gas; and (e) a step of preparing a noble metal single atom or cluster-porous molybdenum carbide/carbon nanocomposite wherein the noble metal catalyst is redispersed and bonded on the porous molybdenum carbide/carbon composite support in the form of single atoms, clusters or a mixture thereof by heat-treating the secondly heat-treated composite thirdly under inert gas atmosphere, wherein the noble metal catalyst is selectively bonded on molybdenum carbide nanoparticles of the noble metal single atom or cluster-porous molybdenum carbide/carbon nanocomposite as it is dynamically arranged in atomic scale.

FIG. 1A schematically illustrates a method for preparing a noble metal single atom or cluster-porous molybdenum carbide/carbon nanocomposite according to the present disclosure (aNM-$Mo_xC$).

Referring to FIG. 1A, a mixture solution is prepared first by mixing an amphiphilic block copolymer, a molybdenum precursor, a carbon precursor, an organic polymer and a noble metal catalyst precursor. Then, a composite wherein the molybdenum precursor, the carbon precursor, the organic polymer and the noble metal catalyst precursor are dispersed in a hydrophilic polymer of the amphiphilic block copolymer is prepared through evaporation-induced self-assembly.

Subsequently, a porous carbon support is formed as the carbon precursor and the organic polymer are carbonized through first heat treatment, and molybdenum carbide nanoparticles are dispersed on the porous carbon support. In addition, the noble metal catalyst is bonded on the molybdenum carbide nanoparticles and the porous carbon support as nanoparticles.

Then, the change of the valence electronic structure of molybdenum carbide is induced through second heat treatment. Finally, through third heat treatment, the noble metal catalyst is dispersed selectively only on the surface of the molybdenum carbide as it is dynamically arranged in atomic scale in the form of single atoms or clusters and bonded by strong interaction with the molybdenum carbide nanoparticles.

Figure 1B:
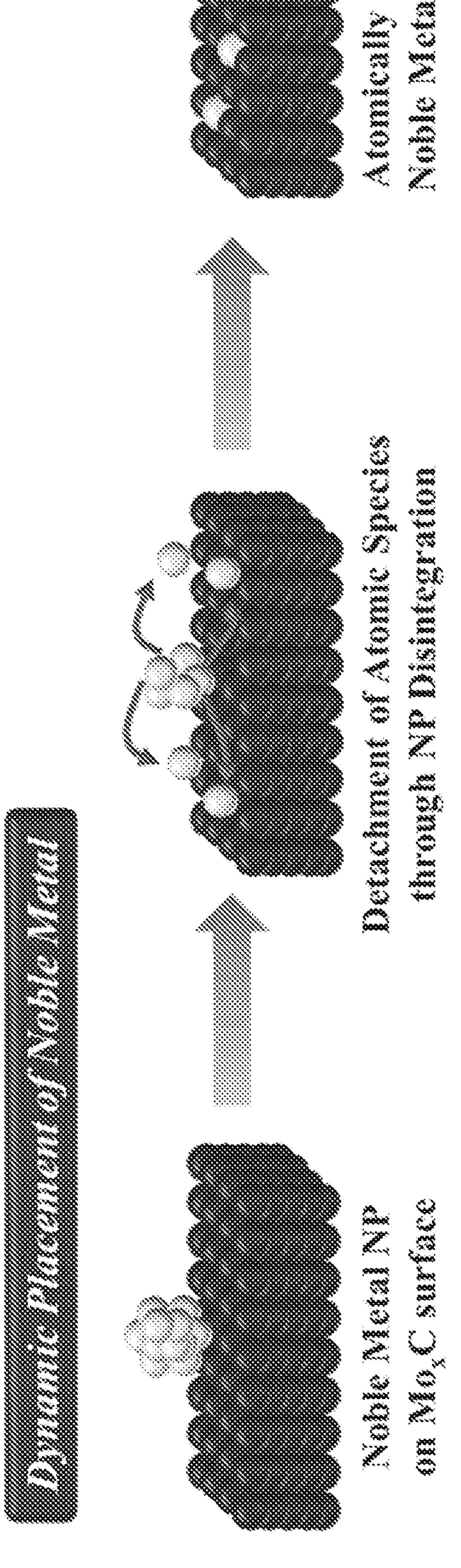
FIG. 1B schematically illustrates the synthesis of a noble metal single atom or cluster-porous molybdenum carbide/carbon nanocomposite according to the present disclosure (aNM-$Mo_xC$) through dynamic arrangement. The Ostwald process and the Smoluchowski process, which are the basic principles of high-temperature dynamic arrangement, are illustrated.
Figure 1B:
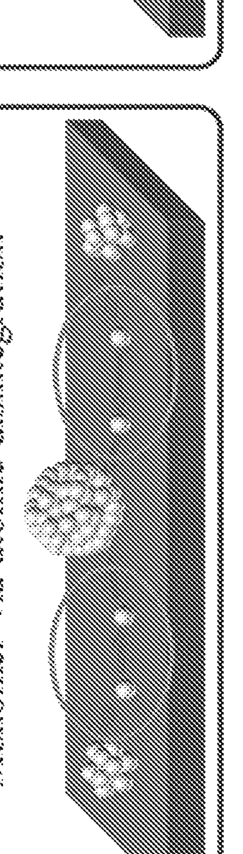

FIG. 1B schematically illustrates the synthesis of the noble metal single atom or cluster-porous molybdenum carbide/carbon nanocomposite according to the present disclosure (aNM-$Mo_xC$) through dynamic arrangement. The Ostwald process and the Smoluchowski process, which are the basic principles of high-temperature dynamic arrangement, are illustrated.

The method for preparing a noble metal single atom or cluster-porous molybdenum carbide/carbon nanocomposite according to the present disclosure allows large-scale production, cost reduction, application to various industries, and commercialization because the synthesis can be achieved through simple heat treatment at high temperature and does not require expensive equipment or complicated procedures unlike the existing methods for synthesizing noble metal catalysts.

Hereinafter, each step is described in detail.

Step (a)

First, in the step (a), a mixture solution containing an amphiphilic block copolymer, a carbon precursor, an organic polymer, a molybdenum precursor and a noble metal catalyst precursor in a solvent is prepared.

The solvent may be one or more selected from a group consisting of chloroform, tetrahydrofuran, hexane, ethanol, xylene, toluene and anisole, specifically tetrahydrofuran, ethanol or a mixture thereof, most specifically tetrahydrofuran.

The amphiphilic block copolymer may be one or more selected from a group consisting of poly(ethylene oxide)-b-poly(styrene), poly(ethylene oxide)-b-poly(methyl methacrylate), poly(isoprene)-b-poly(ethylene oxide), poly(isoprene)-b-poly(styrene)-b-poly(ethylene oxide), poly(4-tert-butyl)styrene-block-polyethylene oxide and a Pluronic-based commercial block copolymer (P123, F127 or F108).

The amphiphilic block copolymer may be specifically one or more selected from a group consisting of poly(ethylene oxide)-b-poly(styrene), poly(ethylene oxide)-b-poly(methyl methacrylate) and poly(isoprene)-b-poly(ethylene oxide), most specifically poly(ethylene oxide)-b-poly(styrene).

The molybdenum precursor may be one or more selected from a group consisting of phosphomolybdic acid, molybdenyl acetylacetonate, molybdenum hexacarbonyl and molybdenum chloride, specifically phosphomolybdic acid, molybdenyl acetylacetonate or a mixture thereof, most specifically phosphomolybdic acid.

The carbon precursor may be one or more selected from a group consisting of phenol-formaldehyde, resol, furfuryl alcohol, furfurylamine, sucrose, glucose and dopamine, specifically one or more selected from a group consisting of phenol-formaldehyde, resol and furfurylamine, most specifically phenol-formaldehyde.

The organic polymer may be one or more selected from a group consisting of melamine-formaldehyde, urea-formaldehyde, phloroglucinol-formaldehyde and resorcinol-formaldehyde, specifically melamine-formaldehyde, urea-formaldehyde or a mixture thereof, most specifically melamine-formaldehyde.

The noble metal catalyst precursor may be a precursor containing one or more metal selected from a group consisting of Pt, Ir, Pd, Rh and Ru, specifically Pt, Rh or a mixture thereof, most specifically Pt.

Specific examples of the noble metal catalyst precursor may be one or more selected from a group consisting of chloroplatinic acid, an iridium chloride hydrate solution, a palladium chloride HCl solution, a rhodium acetylacetonate toluene solution and a ruthenium toluene solution.

The mixture solution may include 25-200 parts by weight of the amphiphilic block copolymer, 25-200 parts by weight of the carbon precursor, 5-30 parts by weight of the organic polymer and 1-25 parts by weight of the noble metal catalyst precursor based on 100 parts by weight of the molybdenum precursor.

Step (b)

Next, in the step (b), a composite wherein the molybdenum precursor, the carbon precursor, the organic polymer and the noble metal catalyst precursor are dispersed in a hydrophilic polymer of the amphiphilic block copolymer is prepared by removing the solvent from the mixture solution. The evaporation-induced self-assembly may greatly improve the dispersibility of the molybdenum precursor and the noble metal catalyst. Especially, the noble metal catalyst may be selectively bonded to the porous molybdenum carbide as it is dynamically arranged in atomic scale through third heat treatment at high temperature in the step (e) which will be described below.

The evaporation-induced self-assembly may be performed at 40-80° C., specifically 45-60° C., most specifically 48-53° C. When the evaporation-induced self-assembly occurs within the above temperature range, a composite with a porous structure may be formed as phase separation occurs uniformly at the same time during the evaporation of the solvent from the mixture solution.

The step (b) may further include a step of preparing a carbon source by polymerizing the carbon precursor and the organic polymer in the composite by performing annealing at 90-120° C. for 45-52 hours after removing the solvent. This is for inducing stable dispersion of the molybdenum precursor and the noble metal precursor in the hydrophilic block of the amphiphilic block copolymer.

Step (c)

Then, first heat treatment is performed in the step (c). During this process, the carbon source formed in the step (b) forms a porous carbon support through first heat treatment, and mesopores are formed in the porous carbon support as the amphiphilic block copolymer is decomposed.

In addition, molybdenum carbide is supported on the porous carbon support through reaction between the carbon source and molybdenum element, and a composite may be formed as the noble metal catalyst is dispersed on the porous carbon support and the molybdenum carbide.

In the step (c), the first heat treatment temperature may be 600-800° C., specifically 630-780° C., more specifically 670-720° C., most specifically 700° C.

If the first heat treatment temperature is below 600° C., porosity may be decreased significantly as the decomposition of the amphiphilic block copolymer, which acts as a polymer template, does not occur enough, and the conductivity of the porous carbon support may be decreased significantly or molybdenum carbide may not be formed due to insufficient carbonization of the carbon precursor. The first heat treatment may be performed for 6-24 hours, more specifically 10-14 hours, most specifically 12 hours.

Step (d)

In the step (d), the change in the valence electronic structure of the molybdenum carbide after the final heat treatment may be induced through second heat treatment.

The second heat treatment temperature may be 130-170° C., specifically 140-160° C., more specifically 145-155° C., most specifically 150° C.

If the second heat treatment temperature is below 130° C., the final valence electronic structure of the carbide may not be changed as desired because the compositional change of the molybdenum compound does not occur. Otherwise, if it exceeds 170° C., the specific surface area of the carbide may be decreased greatly due to aggregation of molybdenum carbide caused by the oxidation of the porous carbon support. The second heat treatment may be performed for 3-10 hours, more specifically 5-7 hours, most specifically 6 hours.

Step (e)

In the step (e), the secondly heat-treated composite may be heat-treated thirdly such that the noble metal catalyst is selectively bonded on molybdenum carbide nanoparticles of the noble metal single atom or cluster-porous molybdenum carbide/carbon nanocomposite as it is dynamically arranged in atomic scale due to thermal vibration of particles at high temperature and it is selectively bonded to the molybdenum carbide support, which has high affinity for the noble metal, through strong interaction.

The third heat treatment may be performed at 900-1300° C., specifically 1000-1200° C., more specifically 1050-1150° C., most specifically 1100° C.

If the third heat treatment temperature is below 900° C., catalytic activity may be decreased due to insufficient dynamic arrangement of the noble metal catalyst. Otherwise, if it exceeds 1300° C., the performance of hydrogen evolution reaction or hydrogen oxidation reaction may be decreased due to alloying of the noble metal and molybdenum.

The inert gas may be any one selected from argon, nitrogen, hydrogen, helium, xenon, krypton and neon, specifically argon.

The loading amount of the noble metal catalyst may be 0.5-8 wt %, specifically 2-7 wt %, more specifically 4-6 wt %, most specifically 4.6-5.3 wt %, based on 100 wt % of the noble metal single atom or cluster-porous molybdenum carbide/carbon nanocomposite. Whereas the loading amount of the noble metal catalyst is generally about 0.2-1 wt % for the existing low-temperature wet impregnation, the content of the noble metal catalyst can be increased by at least 2 times in the present disclosure as compared to the existing synthesis method.

In addition, the present disclosure provides a method for preparing a noble metal single atom or cluster-porous molybdenum carbide/carbon nanocomposite, which includes: (a) a step of preparing a mixture solution wherein an amphiphilic block copolymer, a molybdenum precursor, a carbon precursor and an organic polymer are mixed in a solvent; (b) a step of preparing a composite wherein the molybdenum precursor, the carbon precursor and the organic polymer are dispersed in a hydrophilic polymer of the amphiphilic block copolymer through evaporation-induced self-assembly (EISA) by removing the solvent from the mixture solution; (c) a step of preparing a porous molybdenum carbide/carbon composite support as the amphiphilic block copolymer is removed and mesopores are formed by heat-treating the composite of (b) firstly under inert gas atmosphere; (d) a step of controlling the valence electronic structure of molybdenum carbide by heat-treating the firstly heat-treated porous molybdenum carbide/carbon composite support secondly under atmosphere of a mixture of inert gas and oxygen gas; (e) a step of dispersing a noble metal catalyst precursor solution in a dispersion including the secondly heat-treated porous molybdenum carbide/carbon composite support and then supporting the noble metal catalyst precursor on the porous molybdenum carbide/carbon composite support by wet impregnation; and (f) a step of preparing a noble metal single atom or cluster-porous molybdenum carbide/carbon nanocomposite wherein the noble metal catalyst is redispersed and bonded on the porous molybdenum carbide/carbon composite support in the form of single atoms, clusters or a mixture thereof by heat-treating the porous molybdenum carbide/carbon composite support on which the noble metal catalyst precursor is supported thirdly, wherein, in the step (f), the noble metal catalyst is selectively bonded on molybdenum carbide nanoparticles of the porous molybdenum carbide/carbon nanocomposite as it is dynamically arranged in atomic scale.

The steps (a)-(d) are the same as those described above, except that the noble metal catalyst precursor is not mixed.

Step (e)

In the step (e), the noble metal catalyst precursor solution may be dispersed in a dispersion including the secondly heat-treated porous molybdenum carbide/carbon composite support and then the noble metal catalyst precursor may be supported on the porous molybdenum carbide/carbon composite support by wet impregnation.

The noble metal precursor may be supported by a commonly used wet impregnation method. Then, the dispersed noble metal catalyst may be induced to be dynamically arranged in atomic scale through third heat treatment at high temperature, and the noble metal chemical species may be selectively bonded through strong interaction with the molybdenum carbide.

A solvent for the wet impregnation may be one or more selected from a group consisting of acetone, water, ethanol and tetrahydrofuran, specifically acetone.

The wet impregnation may be performed at 30-80° C. for 20-30 hours, specifically at 42-60° C. for 22-27 hours, most specifically at 48-53° C. for 23-25 hours. If any of the wet impregnation temperature and time does not satisfy the above ranges, catalytic activity may be decreased due to an insufficient loading amount of the noble metal catalyst or the noble metal catalyst may not be dynamically arranged uniformly on the molybdenum carbide due to an excessively large loading amount.

Step (f)

In the step (f), the noble metal catalyst may be redispersed and bonded in the form of single atoms, clusters or a mixture thereof on the porous molybdenum carbide/carbon composite support through third heat treatment.

The third heat treatment may be performed at 900-1300° C., specifically 1000-1200° C., more specifically 1050-1150° C., most specifically 1100° C. If the third heat treatment temperature is below 900° C., catalytic activity may be decreased due to insufficient dynamic arrangement of the noble metal catalyst. Otherwise, if it exceeds 1300° C., the performance of hydrogen evolution reaction or hydrogen oxidation reaction may be decreased due to alloying of the noble metal chemical species and molybdenum.

Although not described explicitly in the following examples, comparative examples, etc., a nanocomposite was prepared by varying the following 16 conditions in the method for preparing a noble metal single atom or cluster-porous molybdenum carbide/carbon nanocomposite according to the present disclosure, and it was used as a catalyst for hydrogen evolution reaction for 300 days by a common method to evaluate the performance of hydrogen evolution reaction, stability and durability of the catalyst.

As a result, it was confirmed that high performance of hydrogen evolution reaction was maintained for a long time unlike the existing Pt/C-based catalyst when all of the following conditions were satisfied. The catalyst showed superior stability and durability because the noble metal catalyst bonded on the molybdenum carbide remained as single atoms, clusters or a mixture thereof without separation or loss.

(1) The amphiphilic block copolymer is one or more selected from a group consisting of poly(ethylene oxide)-b-poly(styrene), poly(ethylene oxide)-b-poly(methyl methacrylate) and poly(isoprene)-b-poly(ethylene oxide). (2) The solvent is tetrahydrofuran, ethanol or a mixture thereof. (3) The molybdenum precursor is phosphomolybdic acid, molybdenyl acetylacetonate or a mixture thereof. (4) The carbon precursor is phenol-formaldehyde. (5) The organic polymer is melamine-formaldehyde. (6) The noble metal catalyst is Pt, Rh or a mixture thereof. (7) In the step (b), the evaporation-induced self-assembly is performed at 45-60° C. (8) The step (b) further includes a step of polymerizing the carbon precursor and the organic polymer in the composite by performing annealing at 90-120° C. for 45-52 hours after removing the solvent. (9) The first heat treatment is performed at 630-780° C. (10) The second heat treatment is performed at 130-160° C. (11) The third heat treatment is performed at 1000-1200° C. (12) The inert gas is argon. (13) The molybdenum carbide nanoparticles are a mixture of $\alpha$-MoC and $\beta$-$Mo_2C$. (14) The loading amount of the noble metal catalyst is 4-6 wt % based on 100 wt % of the noble metal single atom or cluster-porous molybdenum carbide/carbon nanocomposite. (15) The noble metal single atom or cluster-porous molybdenum carbide/carbon nanocomposite has a pore volume of 0.35-0.55 $cm^3/g$ and a pore size of 22-37 nm. (16) The noble metal single atom or cluster-porous molybdenum carbide/carbon nanocomposite has a BET surface area of 368-416 $m^2/g$.

When any of the above 16 conditions was not satisfied, the performance of hydrogen evolution reaction was decreased rapidly with time. In addition, the stability and durability of the catalyst were decreased significantly as some of the noble metal catalyst bonded on the molybdenum carbide was separated to form aggregates or was lost partially.

In addition, although not described explicitly in the following examples, comparative examples, etc., a nanocomposite was prepared by varying the following 17 conditions in the method for preparing a noble metal single atom or cluster-porous molybdenum carbide/carbon nanocomposite according to the present disclosure, and it was used as a catalyst for water electrolysis for 100 days by a common method to evaluate the hydrogen production amount and rate in hydrogen evolution reaction.

As a result, it was confirmed that the hydrogen production amount was improved by 2.5 times or more as compared to the existing Pt/C-based catalyst when all of the following conditions were satisfied. In addition, hydrogen could be produced with catalytic activity and fast rate for a long period of time.

(1) The amphiphilic block copolymer is poly(ethylene oxide)-b-poly(styrene). (2) The solvent is tetrahydrofuran. (3) The molybdenum precursor is phosphomolybdic acid. (4) The carbon precursor is phenol-formaldehyde. (5) The organic polymer is melamine-formaldehyde. (6) The noble metal catalyst is Pt. (7) In the step (b), the evaporation-induced self-assembly is performed at 48-53° C. (8) The step (b) further includes a step of polymerizing the carbon precursor and the organic polymer in the composite by performing annealing at 90-120° C. for 45-52 hours after removing the solvent. (9) The first heat treatment is performed at 670-720° C. (10) The second heat treatment is performed at 145-155° C. (11) The third heat treatment is performed at 1050-1150° C. (12) The inert gas is argon. (13) The molybdenum carbide nanoparticles are a mixture of $\alpha$-MoC and $\beta$-$Mo_2C$. (14) The loading amount of the noble metal catalyst is 4.6-5.3 wt % based on 100 wt % of the noble metal single atom or cluster-porous molybdenum carbide/carbon nanocomposite. (15) The noble metal single atom or cluster-porous molybdenum carbide/carbon nanocomposite has a pore volume of 0.4-0.53 $cm^3/g$ and a pore size of 28-37 nm. (16) The noble metal single atom or cluster-porous molybdenum carbide/carbon nanocomposite has a BET surface area of 405-407 $m^2/g$. (17) The noble metal single atom or cluster-porous molybdenum carbide/carbon nanocomposite exhibits a first effective peak and a second effective peak at binding energies of 70-72 eV and 74-76 eV as a result of XPS analysis, and the ratio of the intensity of the first effective peak to the intensity of the second effective peak is 0.7-0.9.

When any of the above 17 conditions was not satisfied, the hydrogen production amount in the hydrogen evolution reaction was similar or slightly better as compared to the existing Pt/C-based catalyst, and the rate of hydrogen production was decreased significantly with time.

Hereinafter, the present disclosure is described more specifically through examples. However, the present disclosure is not limited by the following examples.

Example 1: Preparation of aPt-$Mo_xC$ Nanocomposite (1) Materials

For preparation of a catalyst, phenol-formaldehyde (PF) resin was used as a carbon precursor, phosphomolybdic acid (PMA) as a Mo precursor, poly(ethylene oxide)-b-styrene (PEO-b-PS) as an amphiphilic block copolymer template, and melamine-formaldehyde (MF) resin as an organic polymer which is an interaction mediator (IM). In addition, tetrahydrofuran (THF) was used as a solvent for evaporation-induced self-assembly, and acetone as a solvent for wet impregnation.

(2) Preparation of aPt-$Mo_xC$ Nanocomposite

For synthesis of an aPt-$Mo_xC$ nanocomposite wherein platinum nanoparticles are supported as a noble metal, a mixture solution was prepared by mixing 100 parts by weight of the block copolymer (PEO-b-PS), 100 parts by weight of the molybdenum precursor (PMA), 50 parts by weight of the carbon precursor (PF resin), 10 parts by weight of the organic polymer (MF resin) and 11.8 parts by weight of a chloroplatinic acid catalyst precursor in the tetrahydrofuran (THF) organic solvent. After pouring the mixture solution in a Petri dish, a phase-separated composite wherein the PMA, the PF resin, the MF resin and the chloroplatinic acid catalyst precursor are present in the block copolymer was prepared through evaporation-induced self-assembly by slowly evaporating the solvent on a hot plate at 50° C. for 24 hours or longer. After the solvent was evaporated completely, polymerization of the PF resin and the MF resin was induced by annealing the phase-separated composite at 100° C. for 48 hours, so that the Mo precursor and the Pt catalyst precursor could be stably dispersed in the hydrophilic moiety. Then, an aPt-$Mo_xC$/C nanocomposite wherein a noble metal (Pt) ADC (atomically dispersed catalyst) is selectively supported on $Mo_xC$ surface was synthesized by heat-treating the obtained sample firstly at 850° C. under Ar 200 sccm atmosphere for 12 hours, conducting second heat treatment at 130° C. under Ar 80 sccm and $O_2$ 20 sccm atmosphere for 6 hours, and finally conducting third heat treatment at 1100° C. under Ar 200 sccm atmosphere for 6 hours. Hereinafter, $Mo_xC$/C is denoted as $Mo_xC$, wherein $0.05 \le x \le 1$.

Example 2: Preparation of aIr-$Mo_xC$ Nanocomposite

An aIr-$Mo_xC$ nanocomposite catalyst wherein a noble metal (Ir) ADC is selectively supported on $Mo_xC$ surface was synthesized in the same manner as in Example 1, except that an iridium chloride hydrate solution was used as the noble metal precursor.

Example 3: Preparation of aPd-$Mo_xC$ Nanocomposite

An aPd-$Mo_xC$ nanocomposite catalyst wherein a noble metal (Pd) is selectively supported on $Mo_xC$ surface was synthesized in the same manner as in Example 1, except that a palladium chloride HCl solution was used as the noble metal precursor.

Example 4: Preparation of aRh-$Mo_xC$ Nanocomposite

An aRh-$Mo_xC$ nanocomposite catalyst wherein a noble metal (Rh) is selectively supported on $Mo_xC$ surface was synthesized in the same manner as in Example 1, except that a rhodium acetylacetonate toluene solution was used as the noble metal precursor.

Example 5: Preparation of Pt-RefAr Nanocomposite

For synthesis of a $Mo_xC$ nanocomposite for wet impregnation of a noble metal precursor, a $Mo_xC$ nanocomposite catalyst wherein no noble metal is supported was synthesized in the same manner as in Example 1 by conducting the second heat treatment without mixing the noble metal precursor. Then, a dispersion was prepared dispersing 100 parts by weight of the $Mo_xC$ composite in acetone. After dispersing 131 parts by weight of a Pt catalyst precursor solution in 100 parts by weight of the dispersion, a composite wherein a Pt catalyst is supported on molybdenum carbide was prepared by conducting wet impregnation for about 24 hours at 50° C. until the solution was evaporated completely. Then, a Pt-RefAr nanocomposite was prepared by heat-treating the Pt catalyst-supported composite at 1100° C. under 200 sccm Ar atmosphere for 6 hours.

Example 6: Preparation of aPt-$Mo_xC$/Vulcan Nanocomposite

An aPt-$Mo_xC$/vulcan nanocomposite wherein Pt was dynamically arranged at high temperature was prepared in the same manner as in Example 1, except that a $Mo_xC$/vulcan support was prepared by mixing commercially available vulcan carbon instead of the carbon precursor (PF resin).

Comparative Example 1: Preparation of Allo-$Mo_xC$ Nanocomposite

An allo-$Mo_xC$ nanocomposite catalyst was synthesized in the same manner as in Example 1 without mixing the noble metal precursor.

Comparative Example 2: Preparation of Pt-Ref$H_2$ Nanocomposite

After dispersing 131 parts by weight of a Pt precursor solution in a dispersion wherein 100 parts by weight of allo-$Mo_xC$ composite was dispersed in acetone, a composite wherein a Pt catalyst is supported on the allo-$Mo_xC$ was prepared by conducting wet impregnation at 50° C. for about 24 hours until evaporation was completed. Then, a Pt-Ref$H_2$ catalyst was prepared by conducting heat treatment at 100° C. under 20 sccm $H_2$ and 180 sccm Ar atmosphere.

Test Example 1: XRD, STEM and EDX Mapping Analyses of Structural Change of Noble Metal Single Atoms or Clusters Depending on Temperature In order to investigate the change in the structure of noble metal single atoms or clusters during the heat treatment steps, XRD, STEM and EDX mapping analyses were conducted on the aPt-$Mo_xC$ nanocomposite obtained in Example 1 after each heat treatment step at 850° C. (first heat treatment), 130° C. (second heat treatment) and 1100° C. (third heat treatment). The result is shown in FIGS. 2A-5.

Figure 2A:
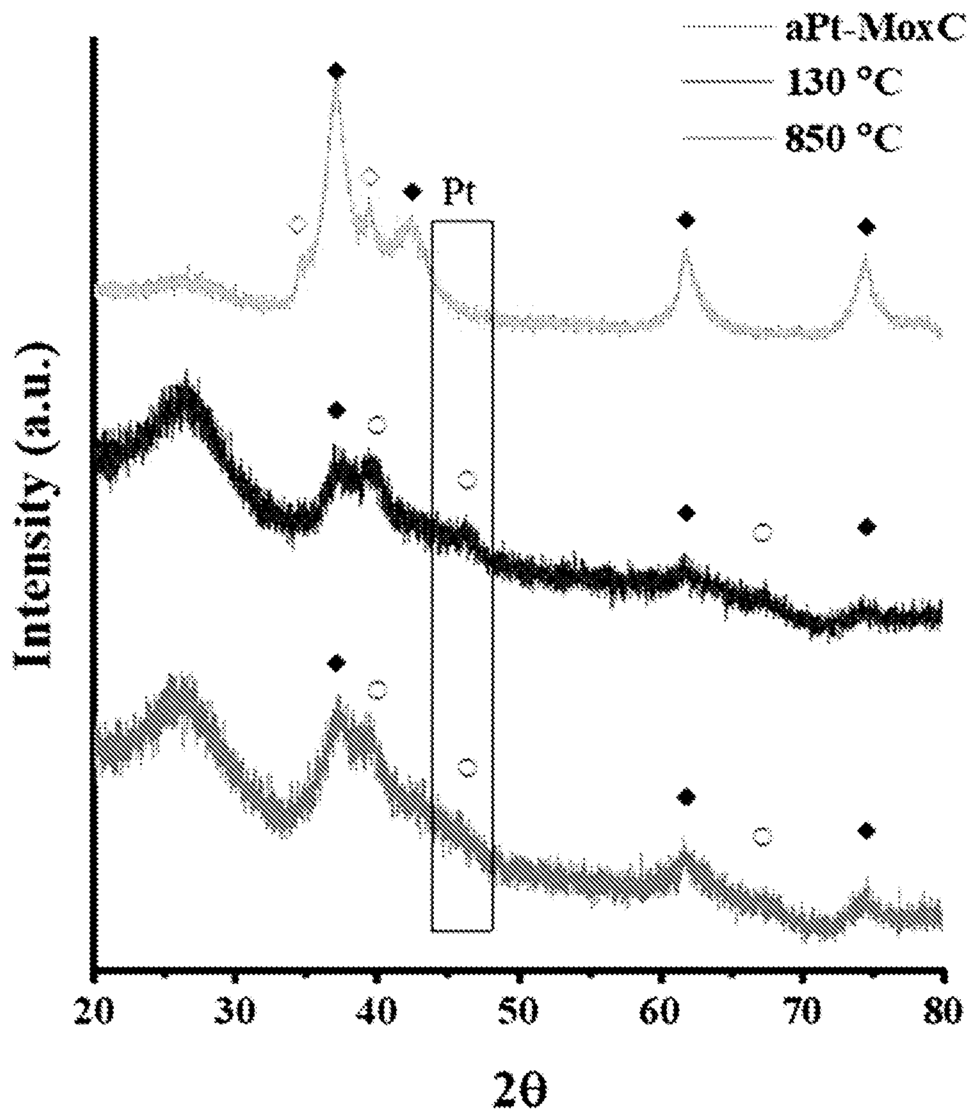
FIGS. 2A and 2B show the XRD spectra of an aPt-$Mo_xC$ nanocomposite prepared in Example 1 in different heat treatment steps (850° C., 130° C. and 1100° C.) (FIG. 2A) and the XRD spectra magnified at a region of 33°≤2θ≤48° (FIG. 2B).
Figure 2B:
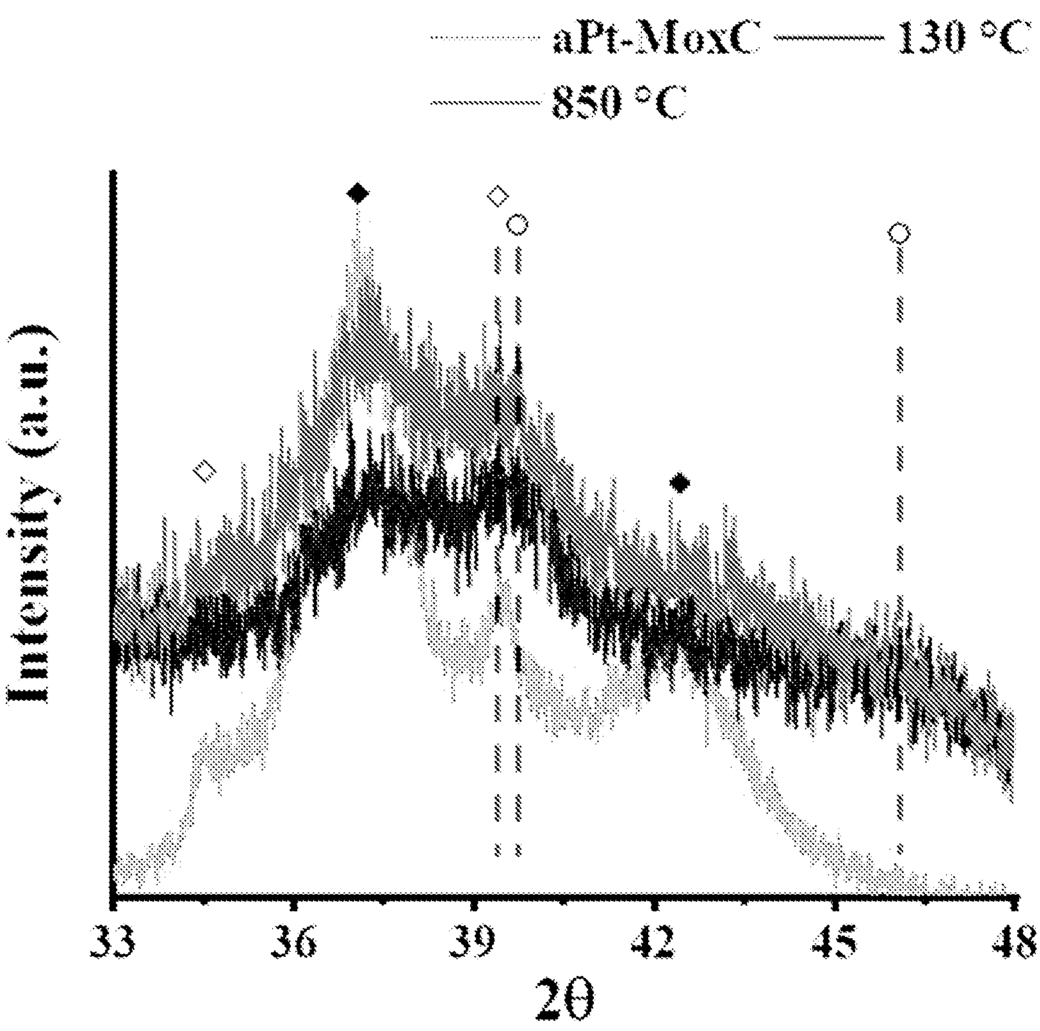

FIGS. 2A and 2B show the XRD spectra of the aPt-$Mo_xC$ nanocomposite prepared in Example 1 in different heat treatment steps (850° C., 130° C. and 1100° C.) (FIG. 2A)

and the XRD spectra magnified at a region of 33°≤2θ≤48° (FIG. 2B). Referring to FIGS. 2A and 2B, a crystalline Pt peak was observed before the heat treatment at 1100° C., but no peak was observed other than that of $Mo_xC$ after the heat treatment at 1100° C.

Figure 3A:
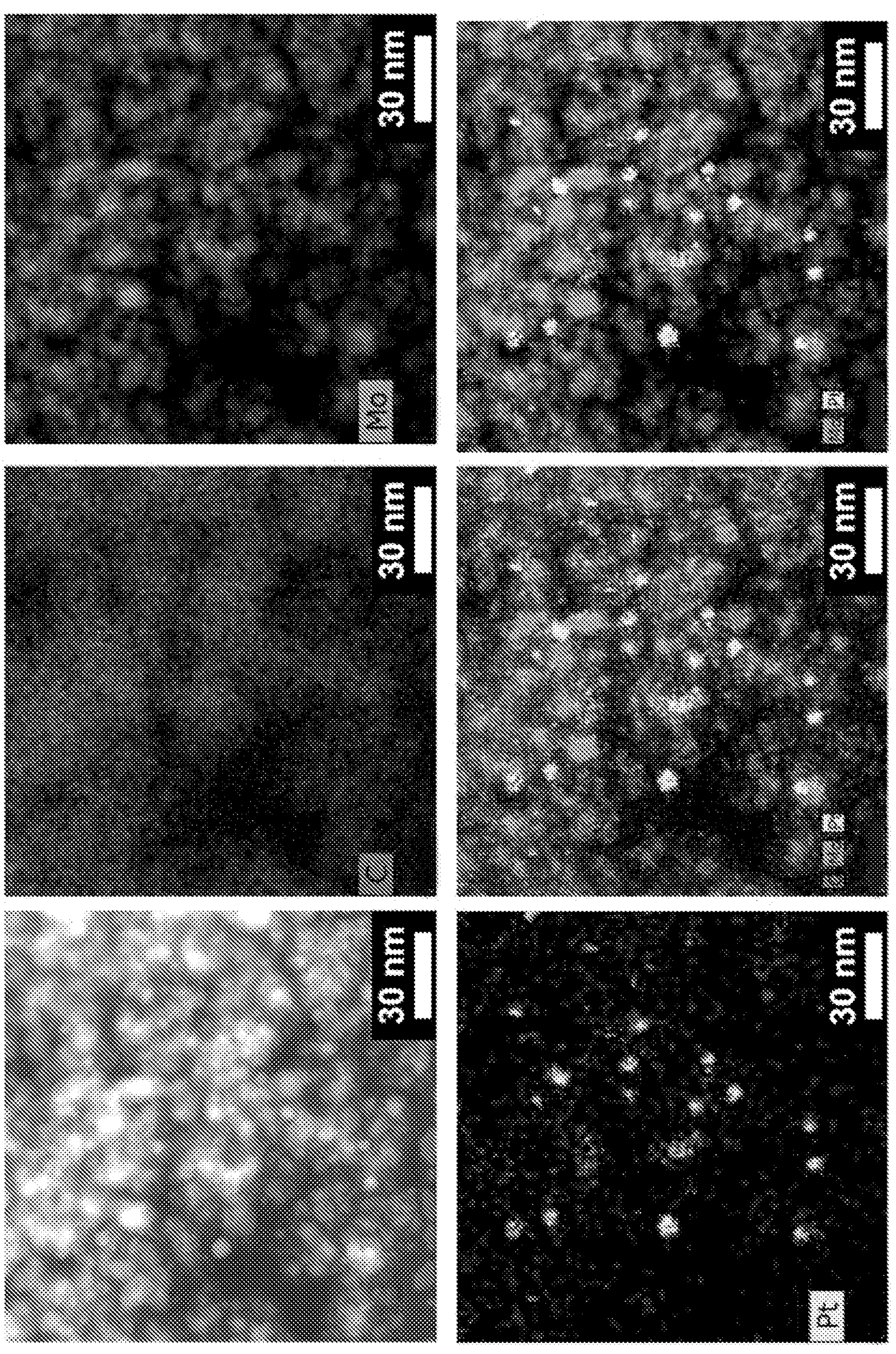
FIGS. 3A and 3B show the STEM images and EDX mapping results of an aPt-$Mo_xC$ nanocomposite prepared in Example 1 for first heat treatment (850° C.) (FIG. 3A) and second heat treatment (130° C.) (FIG. 3B) of three heat treatment steps.
Figure 3B:
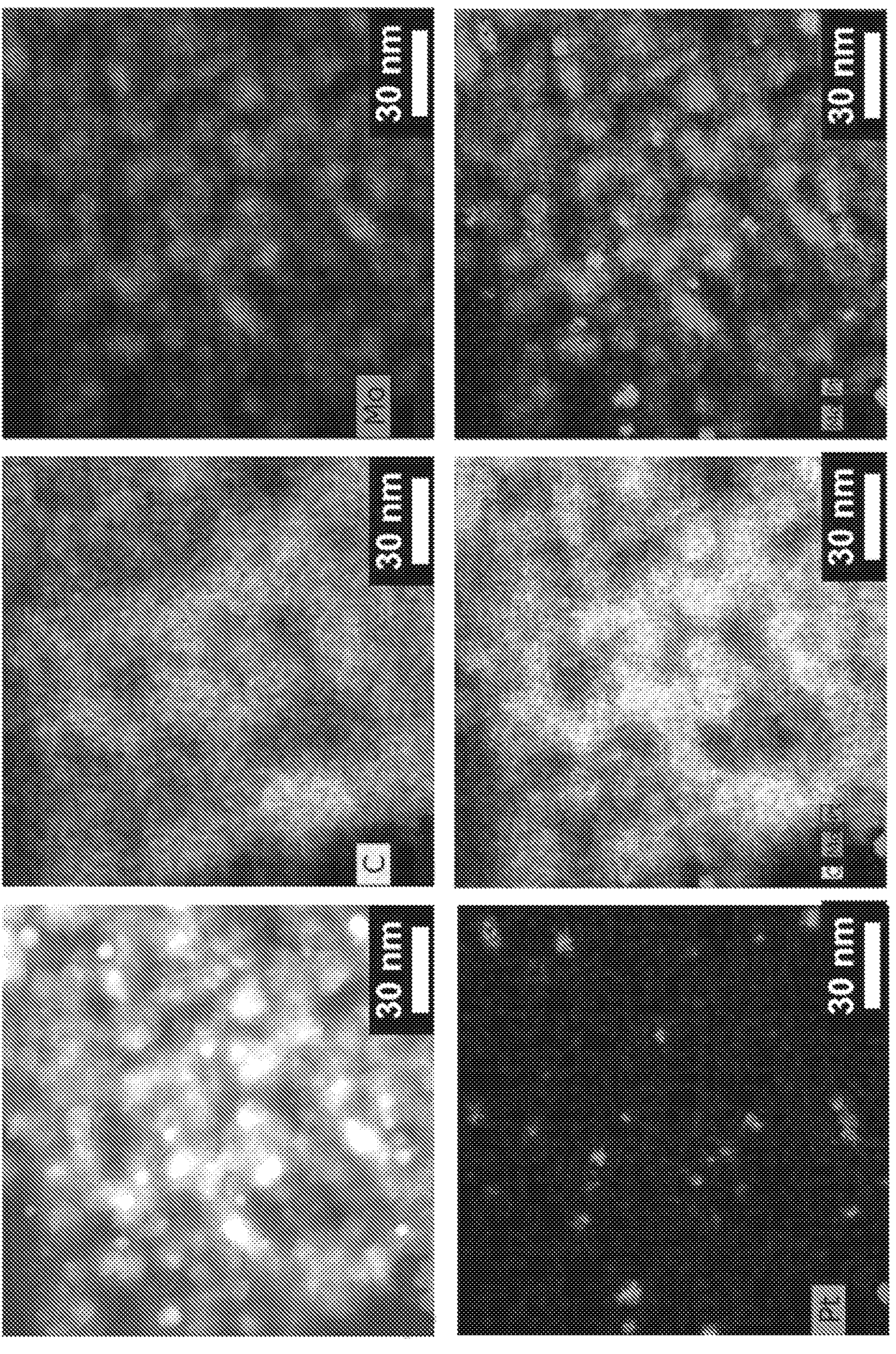

FIGS. 3A and 3B show the STEM images and EDX mapping results of the aPt-$Mo_xC$ nanocomposite prepared in Example 1 for the first heat treatment (850° C.) (FIG. 3A) and the second heat treatment (130° C.) (FIG. 3B) of the three heat treatment steps.

Referring to FIGS. 3A and 3B, after the first and second heat treatment, many Pt nanoparticles having an average particle size of 5 nm were present on $Mo_xC$ surface and some on carbon surface. After the third heat treatment at 1100° C., the Pt nanoparticles disappeared and Pt having an atomic-scale structure was selectively dispersed uniformly on $Mo_xC$ surface.

Figure 4:
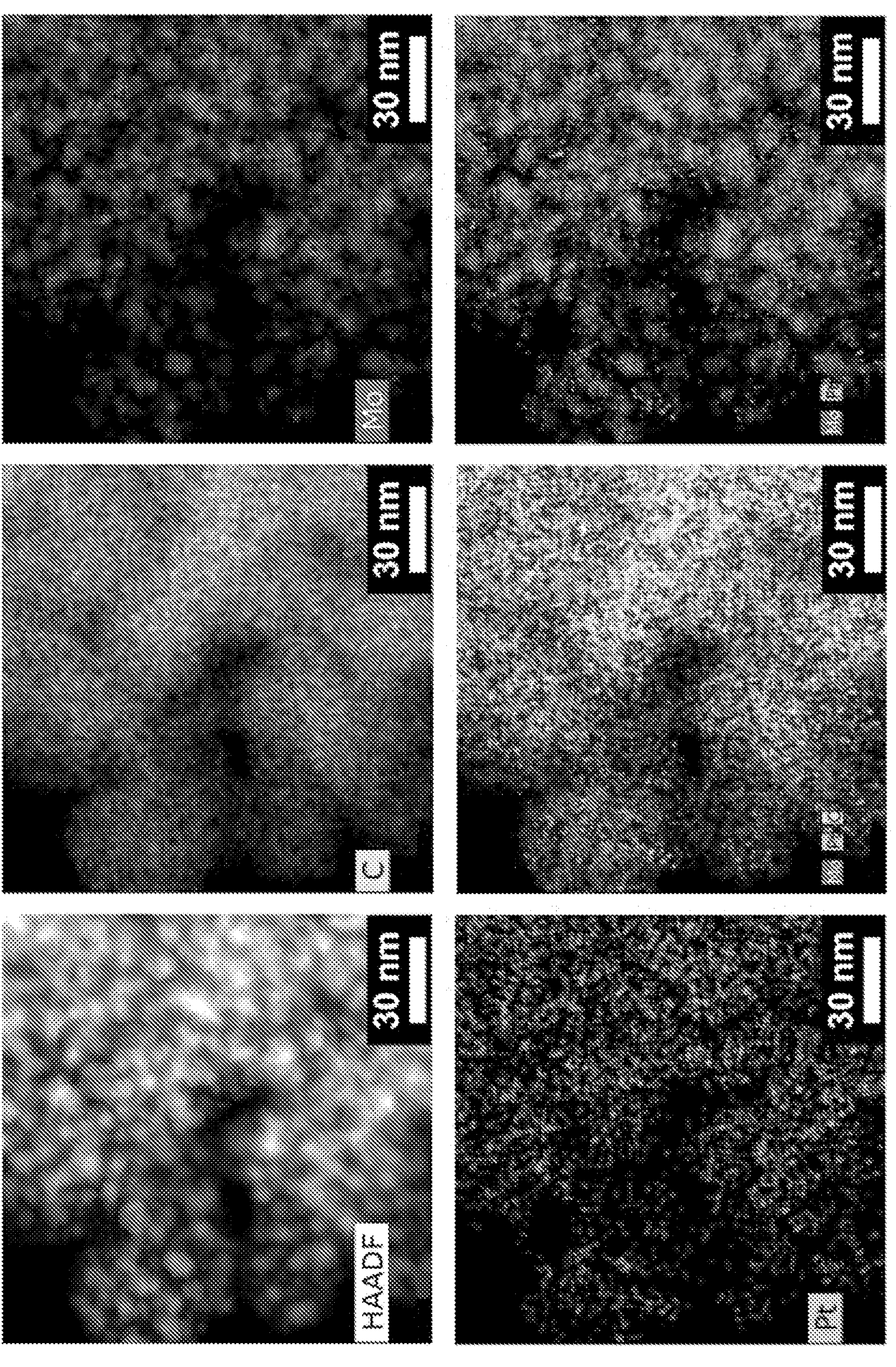
FIG. 4 shows the STEM images and EDX mapping results of an aPt-$Mo_xC$ nanocomposite prepared in Example 1.

FIG. 4 shows the STEM images and EDX mapping results of the aPt-$Mo_xC$ nanocomposite prepared in Example 1. Referring to FIG. 4, it was confirmed from the overlapping of Mo and Pt mapping images that Pt chemical species having an atomic-scale structure were selectively supported only on $Mo_xC$ surface. It was also confirmed that all the Pt nanoparticles were decomposed into single atom Pt chemical species through high-temperature dynamic arrangement.

Figure 5:
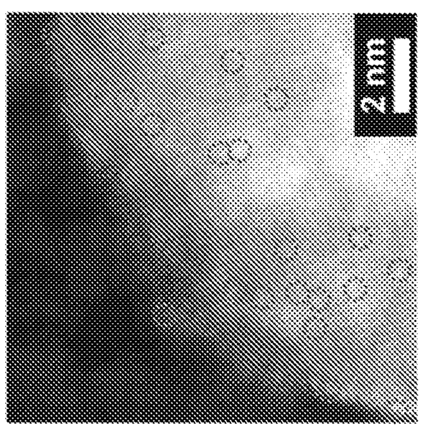
FIG. 5 shows the magnified STEM images and EDX mapping results of an aPt-$Mo_xC$ nanocomposite prepared in Example 1.
Figure 5:
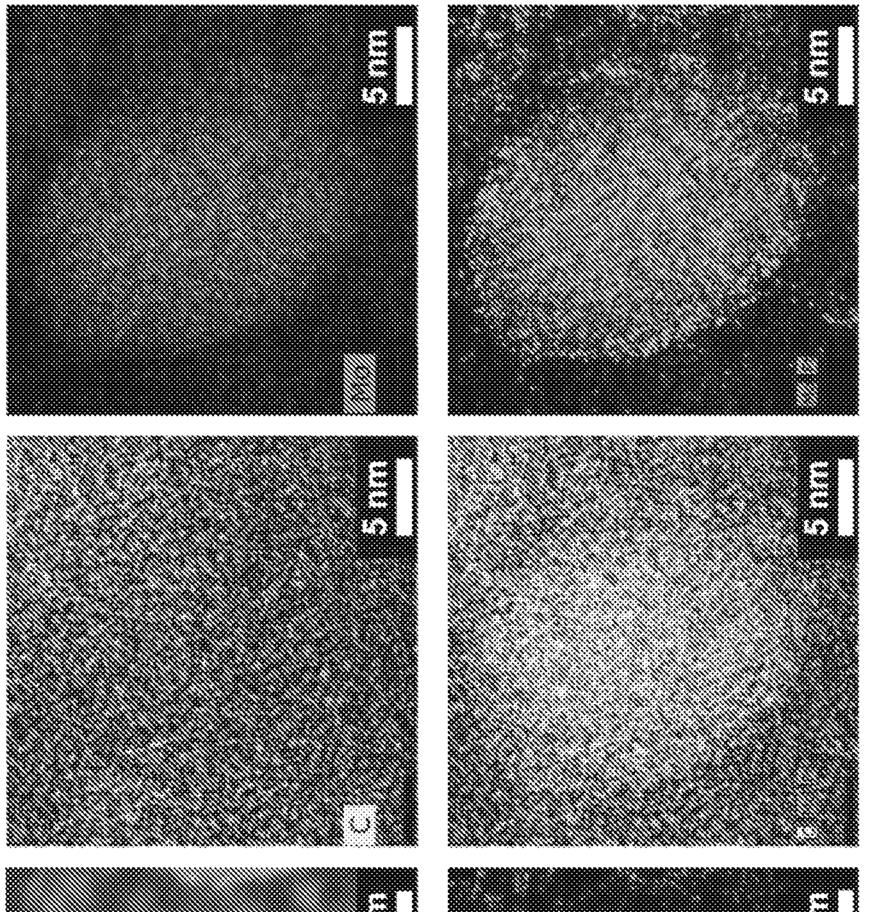

FIG. 5 shows the magnified STEM images and EDX mapping results of the aPt-$Mo_xC$ nanocomposite prepared in Example 1. Referring to FIG. 5, it can be seen that the utilization of Pt was maximized because the Pt having an atomic-scale structure was selectively bonded only on the surface without being doped inside the $Mo_xC$ particles. The brighter spots in the magnified EDX mapping image are Pt chemical species. It can be seen that Pt having an atomic-scale structure is dispersed on $Mo_xC$ surface with high density. Through this, it was confirmed that a noble metal single atom or cluster catalyst (ADC) can be synthesized as a nanocomposite through selective high-temperature dynamic arrangement on $Mo_xC$ only when the high temperature condition allowing the decomposition of noble metal particles to an atomic scale and the presence of $Mo_xC$ having high affinity for the noble metal are satisfied.

Test Example 2: XRD, STEM and EDX Mapping Analyses Depending on Noble Metal Chemical Species XRD, STEM and EDX mapping analyses were conducted to identify the atomic-scale structure of the aNM-$Mo_xC$ nanocomposites (NM: Pt, Ir, Pd, Rh or No) prepared in Examples 1-4 and Comparative Example 1. The result is shown in FIGS. 6-9 and Table 1.

Figure 6:
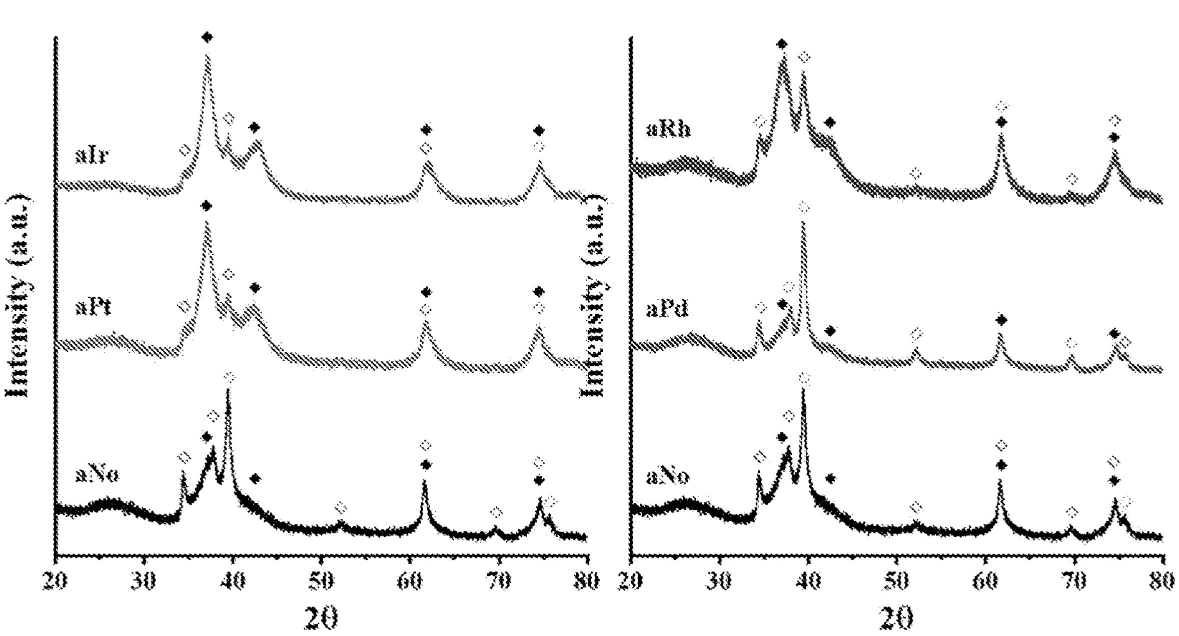
FIG. 6 shows the XRD spectra of aNM-$Mo_xC$ nanocomposites (NM: Pt, Ir, Pd, Rh or No) prepared in Examples 1-4.

FIG. 6 shows the XRD spectra of the aNM-$Mo_xC$ nanocomposites (NM: Pt, Ir, Pd, Rh or No) prepared in Examples 1-4. Referring to FIG. 6, crystalline Pt, Ir, Pd and Rh peaks were not observed in the XRD spectra, and only the peaks of α-$MoC_{1-x}$ and β-$Mo_2C$ were observed (0.05≤x≤0.5).

Figure 7A:
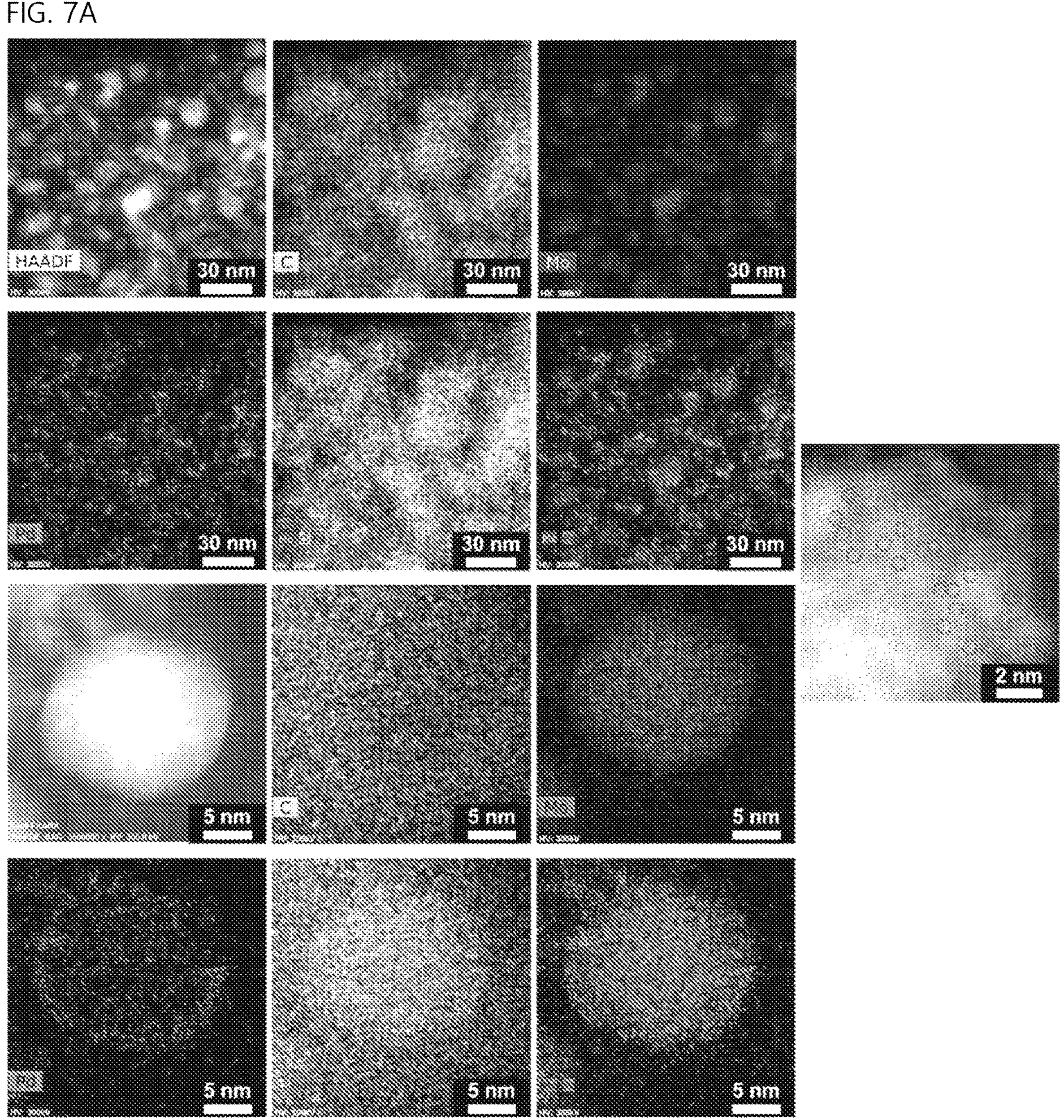
FIGS. 7A, 7B and 7C show the STEM images, EDX mapping results and magnified STEM images (right) of an aPd-$Mo_xC$ nanocomposite of Example 2 (FIG. 7A), an aRh-$Mo_xC$ nanocomposite of Example 4 (FIG. 7B) and an aIr-$Mo_xC$ nanocomposite of Example 2 (FIG. 7C).
Figure 7B:
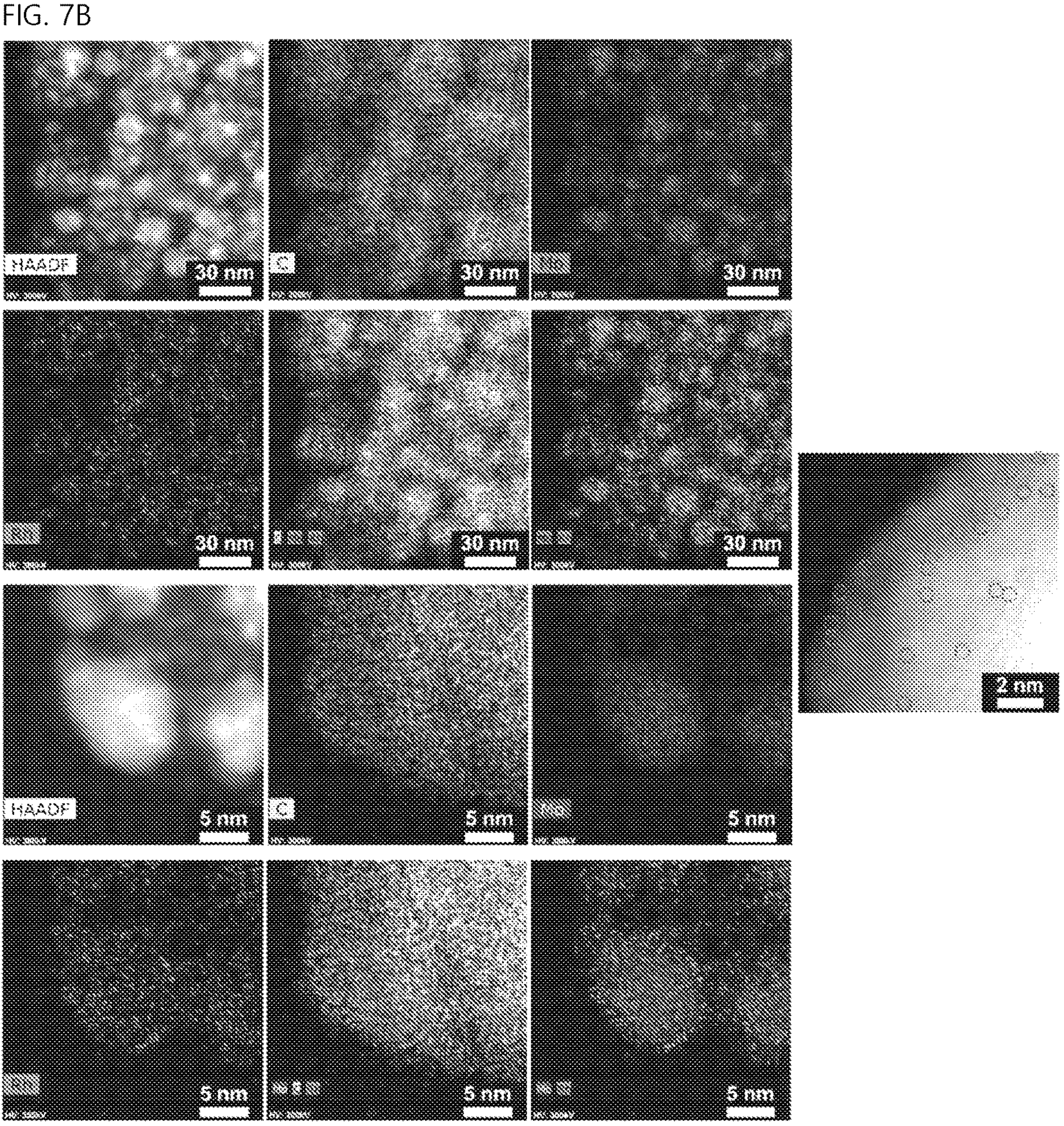
Figure 7C:
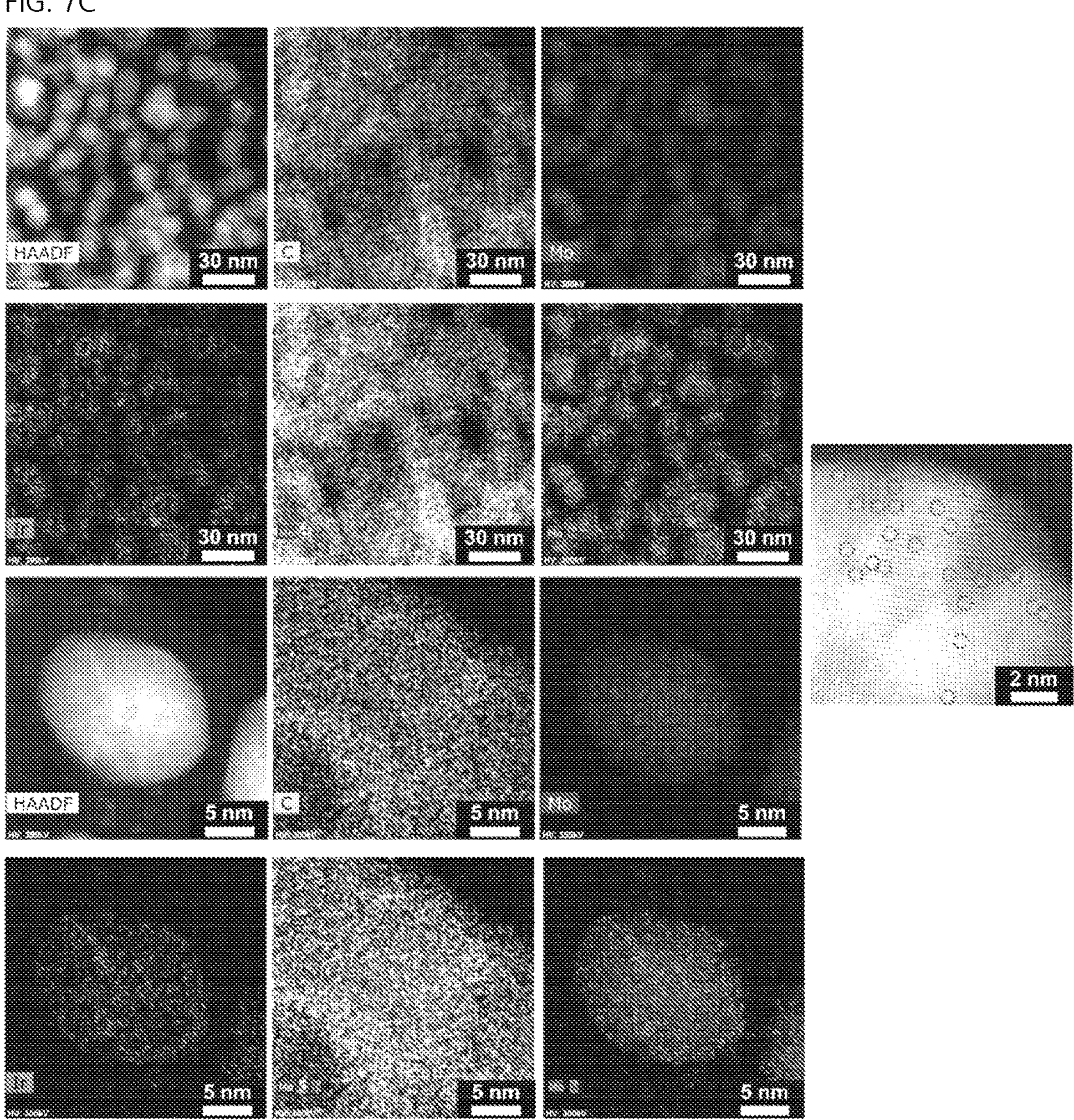

FIGS. 7A, 7B and 7C show the STEM images, EDX mapping results and magnified STEM images (right) of the aPd-$Mo_xC$ nanocomposite of Example 2 (FIG. 7A), the aRh-$Mo_xC$ nanocomposite of Example 4 (FIG. 7B) and the alr-$Mo_xC$ nanocomposite of Example 2 (FIG. 7C).

Referring to FIGS. 7A, 7B and 7C, it was confirmed that noble metal nanoparticles were nonexistent in the nanocomposites of Examples 2-4 and most of the noble metal chemical species were high-temperature dynamically arranged with an atomic-scale structure selectively only on the $Mo_xC$ surface. In addition, it was confirmed from the magnified STEM images that the utilization of the noble metal was maximized since the noble metal chemical species with an atomic-scale structure was arranged selectively only on the surface without being doped inside $Mo_xC$. Furthermore, it was also confirmed from the STEM image with a scale bar of 2 nm that the single atom noble metal chemical species are selectively arranged on the $Mo_xC$ surface with high density.

Figure 8A:
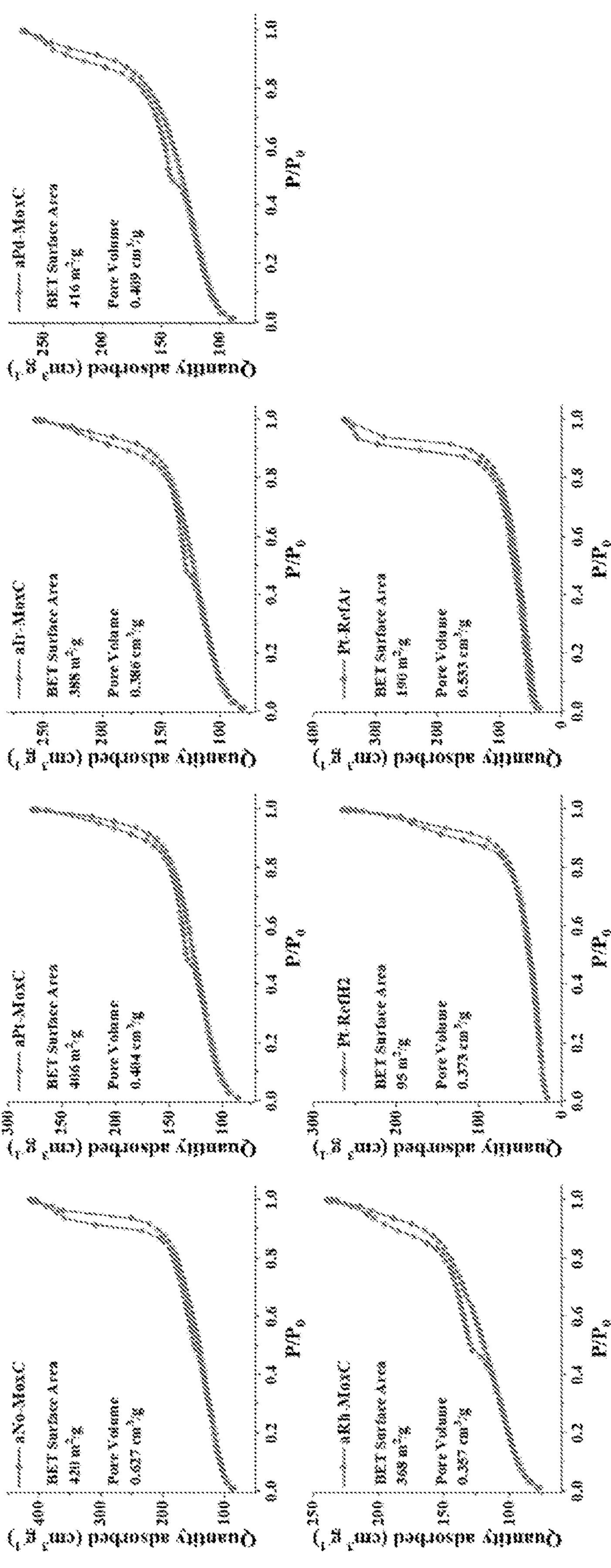
FIG. 8A shows the $N_2$ adsorption-desorption pattern (BET surface area and pore volume) for aNM-$Mo_xC$ nanocomposites prepared in Examples 1-4 and Comparative Example 1 (NM: Pt, Ir, Pd, Rh or No: no noble metal), Pt-Ref$H_2$ of Comparative Example 2 and a Pt-RefAr nanocomposite of Example 5.

FIG. 8A shows the $N_2$ adsorption-desorption pattern (BET surface area and pore volume) for the aNM-$Mo_xC$ nanocomposites prepared in Examples 1-4 and Comparative Example 1 (NM: Pt, Ir, Pd, Rh or No: no noble metal), the Pt-Ref$H_2$ of Comparative Example 2 and the Pt-RefAr nanocomposite of Example 5.

Figure 8B:
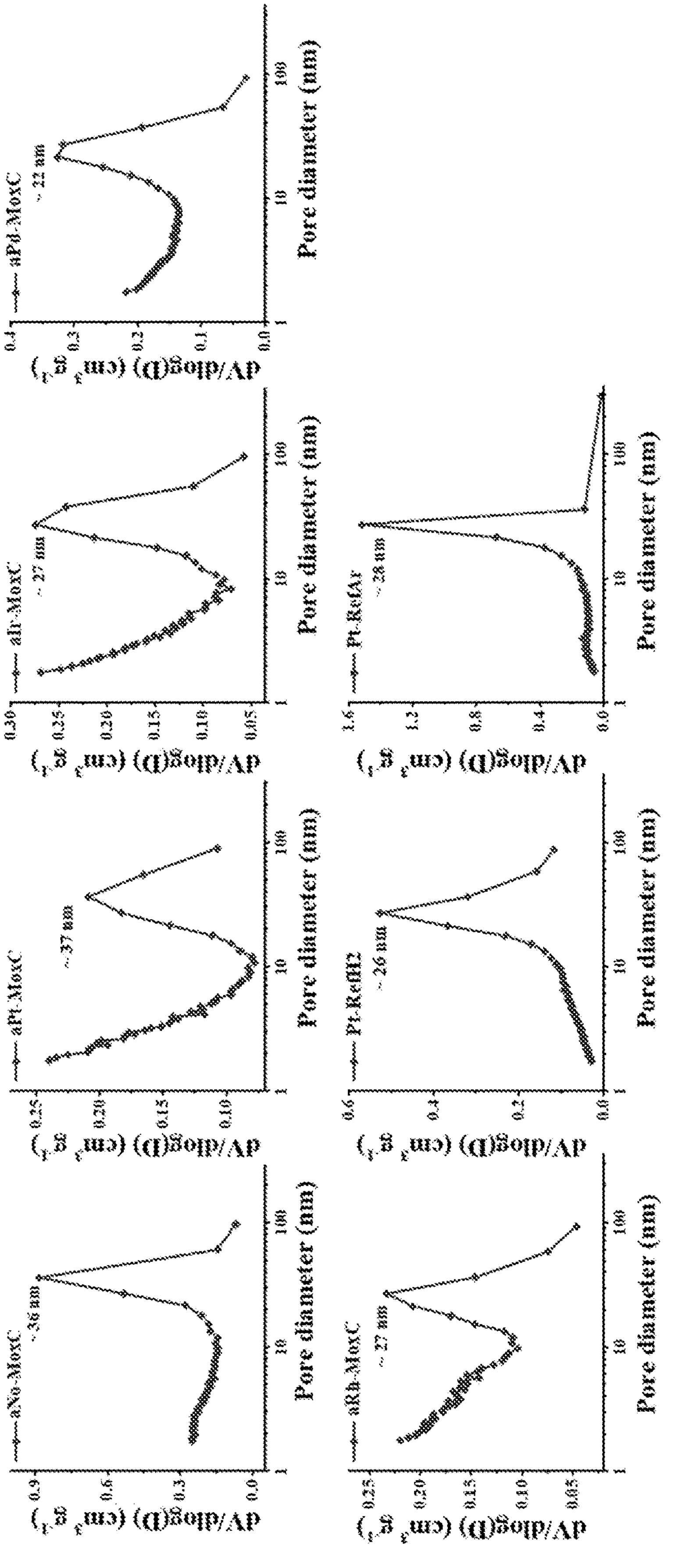
FIG. 8B shows the pore size distribution of aNM-$Mo_xC$ nanocomposites prepared in Examples 1-4 and Comparative Example 1 (NM: Pt, Ir, Pd, Rh or No: no noble metal), Pt-Ref$H_2$ of Comparative Example 2 and a Pt-RefAr nanocomposite of Example 5.

FIG. 8B shows the pore size distribution of the aNM-$Mo_xC$ nanocomposites prepared in Examples 1-4 and Comparative Example 1 (NM: Pt, Ir, Pd, Rh or No: no noble metal), the Pt-Ref$H_2$ of Comparative Example 2 and the Pt-RefAr nanocomposite of Example 5.

Referring to FIGS. 8A and 8B, the aNM-$Mo_xC$ nanocomposites of Examples 1-4 and the Pt-RefAr nanocomposite of Example 5 showed superior porosity and narrow pore size distribution regardless of the noble metal chemical species introduced through the evaporation-induced self-assembly. In particular, the aNM-$Mo_xC$ nanocomposites of Examples 1-4 had a BET surface area of 350-416 $m^2/g$, superior porosity with a pore volume of 0.35-0.5 $cm^3/g$, and narrow pore distribution with a pore size of 25-37 nm.

Table 1 shows the content (wt %) of noble metal chemical species and the moles of noble metal per mass of the catalyst for the aNM-$Mo_xC$ nanocomposites prepared in Examples 1-4 and Comparative Example 1 (NM: Pt, Ir, Pd, h or No), the Pt-Ref$H_2$ of Comparative Example 2 and the Pt-RefAr nanocomposite of Example 5 investigated by ICP-MS analysis.

TABLE 1

ICP-MS results of noble metal contents for aNM-MoxC, Pt-RefH2, and Pt-RefAr

| | aPt-MoxC | aIr-MoxC | aPd-MoxC | aRh-MoxC | Pt-RefH2 | Pt-RefAr |
|---|---|---|---|---|---|---|
| NM (wt %) | 5.21 | 4.27 | 3.56 | 2.72 | 3.57 | 7.23 |
| NM (mol/$g_{cat}$) | 267.1 | 222.1 | 334.5 | 264.3 | 183.0 | 370.6 |

Referring to Table 1, the aNM-$Mo_xC$ nanocomposites of Examples 1-4 and the Pt-RefAr nanocomposite of Example 5 include similar moles of the noble metal per mass of the noble metal. The noble metal chemical species were supported with high contents through the high-temperature dynamic arrangement. In particular, in the aPt-$Mo_xC$ nanocomposite of Example 1, the catalyst with an atomic-scale structure was loaded at a high content of 5 wt % or higher.

Through this, it was confirmed that the high-temperature dynamic arrangement strategy can be applied universally for noble metal chemical species having sufficiently high affinity for $Mo_xC$, and porosity can be introduced effectively by using a block copolymer as a template.

Test Example 3: XRD, STEM and EDX Mapping Analyses for Wet Impregnation

XRD, STEM and EDX mapping analyses were conducted for the nanocomposites prepared in Examples 1, 5 and 6 and Comparative Example 2 by supporting the noble metal precursor through wet impregnation in order to analyze high-temperature dynamic arrangement. The result is shown in FIGS. 9-11.

Figure 9A:
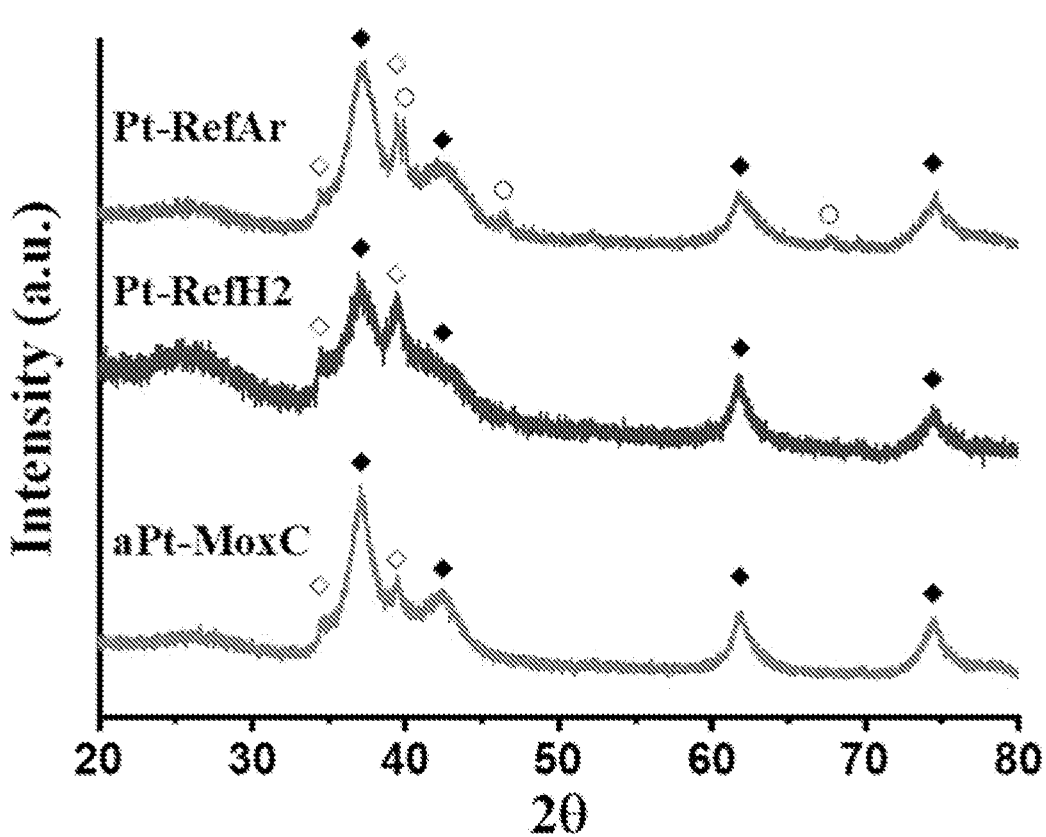
Figure 9B:
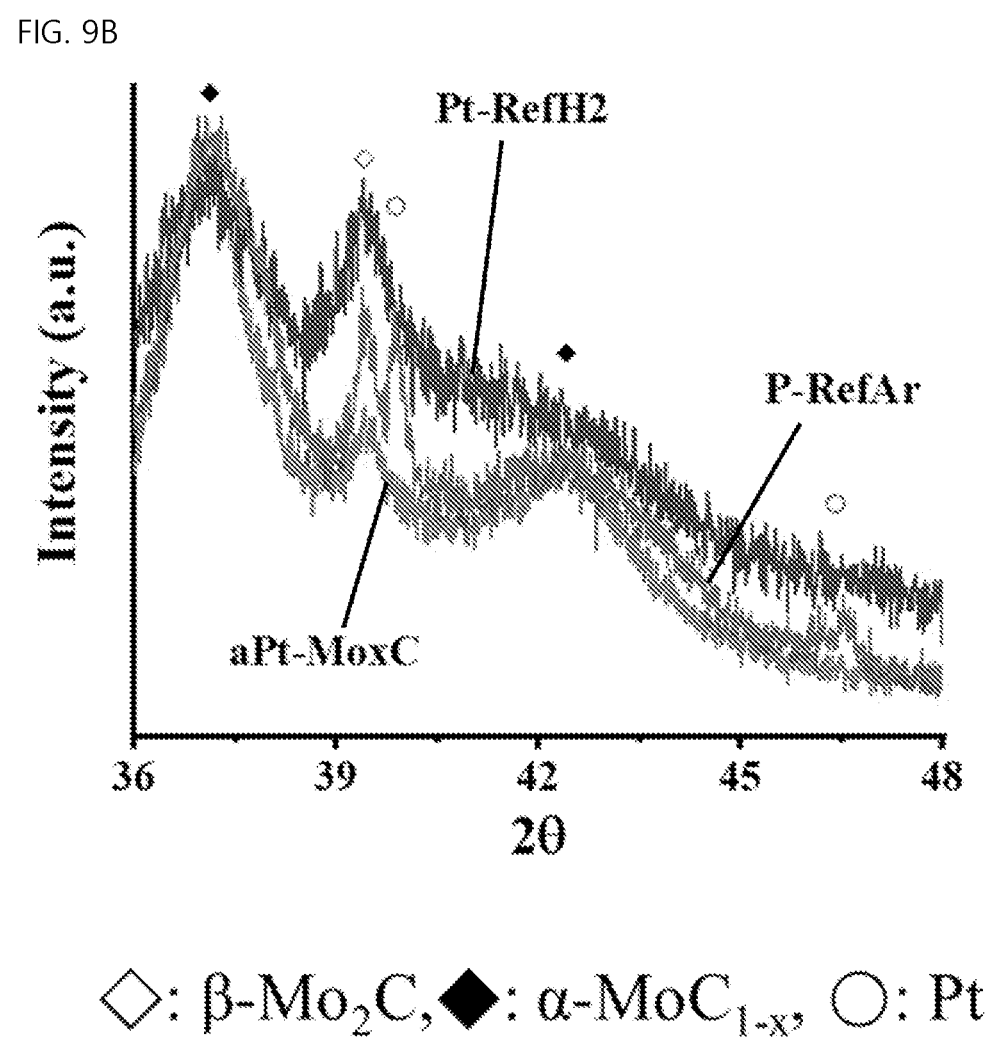

FIGS. 9A and 9B show the XRD spectra of the nanocomposites prepared in Examples 1 and 5 and Comparative Example 2 (FIG. 9A) and the XRD spectra magnified at a region of $36° \leq 2\theta \leq 48°$ (FIG. 9B). Referring to FIGS. 9A and 9B, the crystalline Pt peak was not observed in the Pt-Ref$H_2$ of Comparative Example 2 synthesized at low temperature, suggesting that Pt exists as clusters and single atoms due to low crystallinity.

The Pt peak was observed in the Pt-RefAr of Example 5 synthesized at high temperature, indicating that large Pt crystals were formed by the Pt precursor which was not dispersed uniformly through wet impregnation by sintering during the high-temperature heat treatment.

Figure 10:
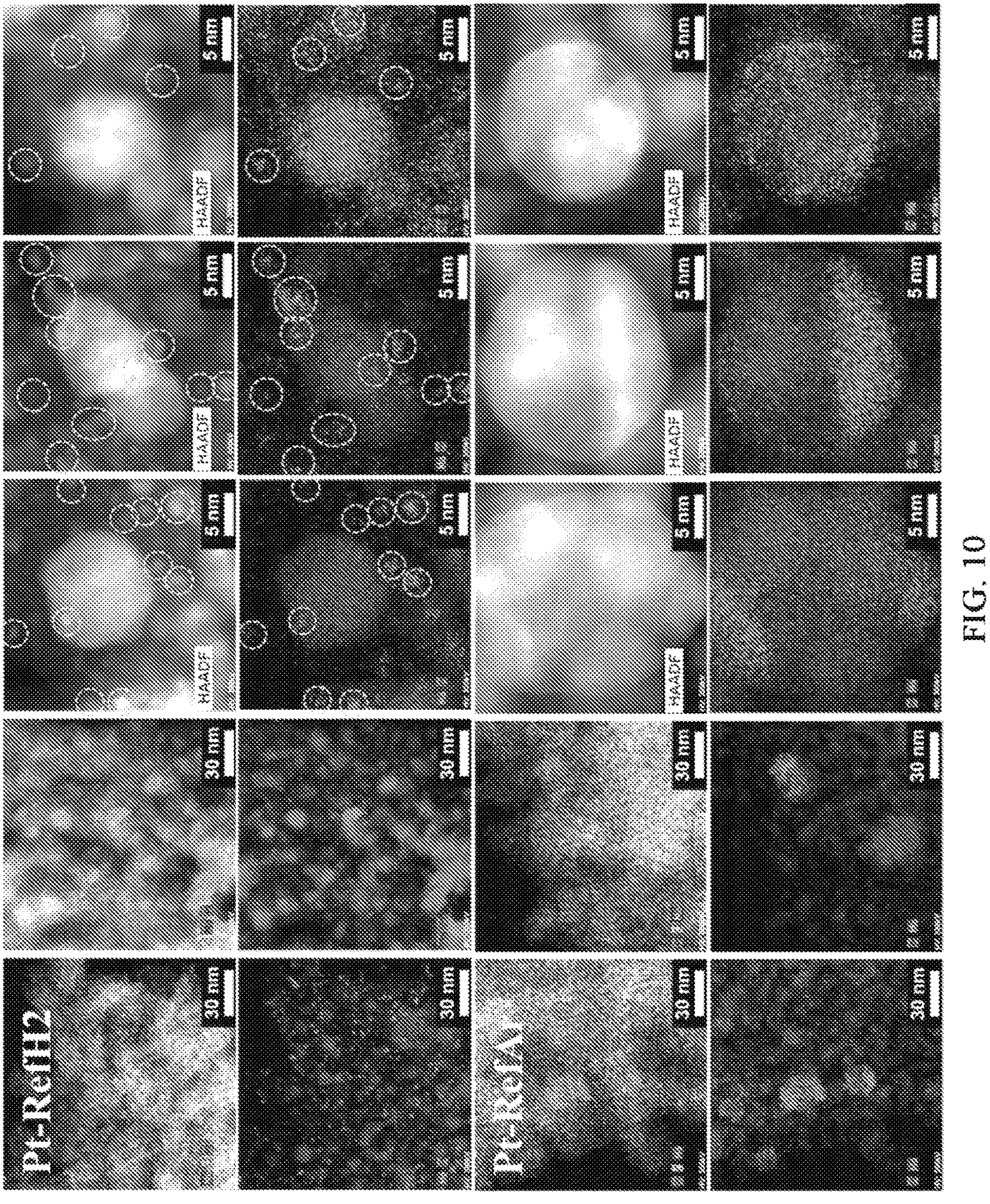
FIG. 10 shows the STEM images and EDX mapping results (scale bar: 30, 5 nm) of Pt-Ref$H_2$ and Pt-RefAr prepared in Comparative Example 2 and Example 5.

FIG. 10 shows the STEM images and EDX mapping results (scale bar: 30, 5 nm) of the Pt-Ref$H_2$ and Pt-RefAr prepared in Comparative Example 2 and Example 5. Referring to FIG. 10, it was confirmed that Pt segregation occurred in both Comparative Example 2 and Example 5, because the Pt precursor was not dispersed uniformly in the $Mo_xC$—C composite through the wet impregnation. Specifically, the Pt-Ref$H_2$ of Comparative Example 2 showed large Pt aggregates. Pt clusters and Pt single atoms were supported non-selectively on the carbon or $Mo_xC$ surface, and most of the Pt chemical species were present on the carbon surface as nanometer-sized clusters. In particular, the Pt aggregates were not observed in XRD analysis due to low crystallinity owing to the low-temperature synthesis condition.

In contrast, in the Pt-RefAr of Example 5, although some large Pt crystals were observed, most Pt chemical species were supported selectively on the $Mo_xC$ surface as single atoms. Through this, it was confirmed that the high-temperature dynamic arrangement is effective even after the wet impregnation, and the evaporation-induced self-assembly is useful for superior dispersibility of the noble metal.

Figure 11A:
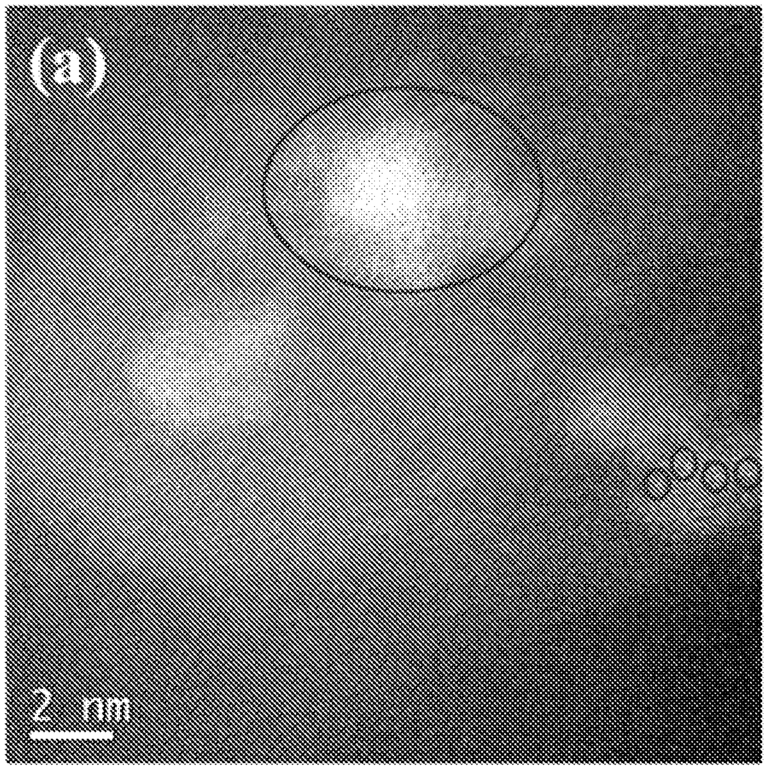
FIGS. 11A and 11B show the STEM images (FIG. 11A) and magnified STEM images (FIG. 11B) of an aPt-$Mo_xC$/vulcan nanocomposite prepared in Example 6.
Figure 11B:
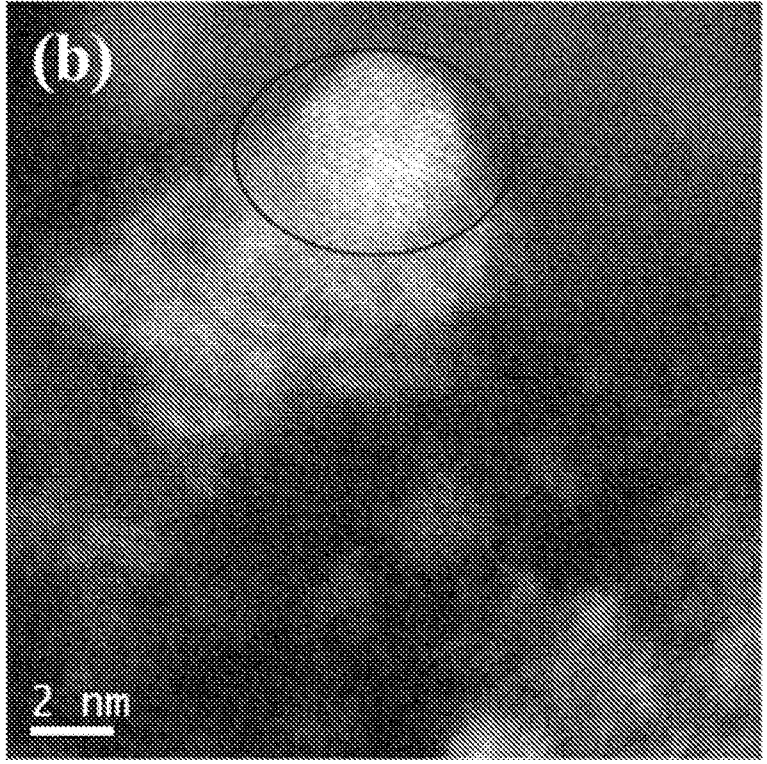

FIGS. 11A and 11B show the STEM images (FIG. 11A) and magnified STEM images (FIG. 11B) of the aPt-$Mo_xC$/vulcan nanocomposite prepared in Example 6. Referring to FIGS. 11A and 11B, it was confirmed that single atom Pt chemical species were dispersed selectively on the $Mo_xC$ surface. Through this, it can be seen that large Pt chemical species was observed because the wet impregnation has limitation in uniformly supporting the noble metal precursor, and this can be resolved by uniformly dispersing the noble metal chemical species through evaporation-induced self-assembly.

In addition, it can be seen that the catalyst synthesized by the general low-temperature synthesis method has the problems that dispersion at high loading amount in atomic scale is difficult because Pt single atoms and clusters exist together, large Pt chemical species are absorbed and selective supporting on the $Mo_xC$ surface is impossible. In contrast, in the catalyst synthesized at high temperature, many Pt chemical species were selectively supported on the $Mo_xC$ surface although some large Pt chemical species were observed. Accordingly, it can be seen that the high-temperature dynamic arrangement can also be applied to the nanocomposite obtained through wet impregnation and the $Mo_xC$—C composites using various carbon materials.

Test Example 4: Analysis of Electrochemical Structure and Geometrical Structure

In order to investigate the change in the electrochemical structure and geometrical structure of noble metal chemical species in the nanocomposites prepared in Examples 1-5 and Comparative Example 2, XPS analysis was conducted for Pt 4f, Ir 4f, Pd 3d and Rh 3d. The result is shown in FIGS. 12-14 and Table 2.

Figure 12A:
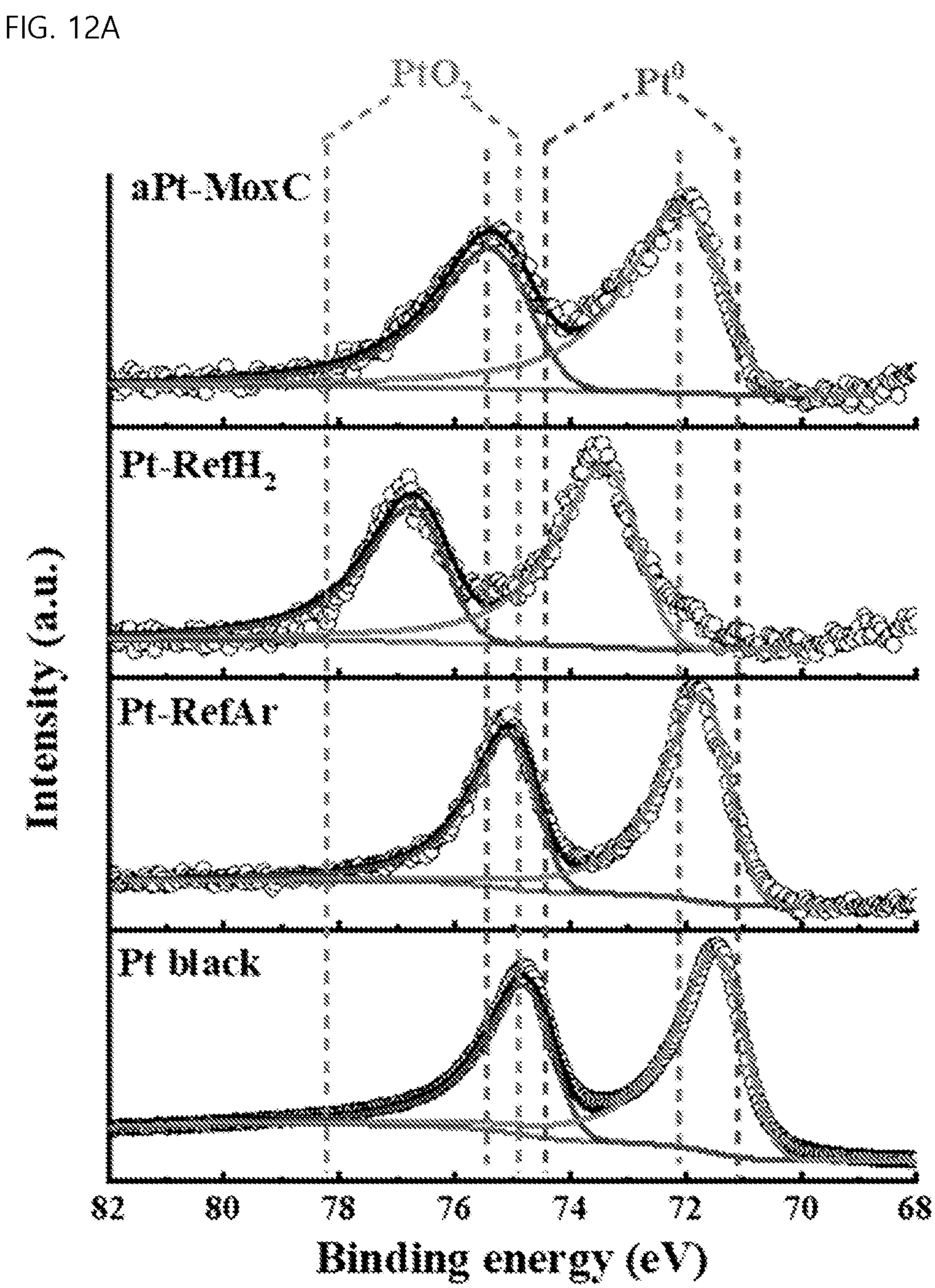
FIGS. 12A, 12B, 12C and 12D show the XPS spectra of nanocomposites prepared in Examples 1-5 and Comparative Example 2 for Pt 4f (FIG. 12A), Ir 4f (FIG. 12B), Pd 3d (FIG. 12C) and Rh 3d (FIG. 12D).
Figure 12B:
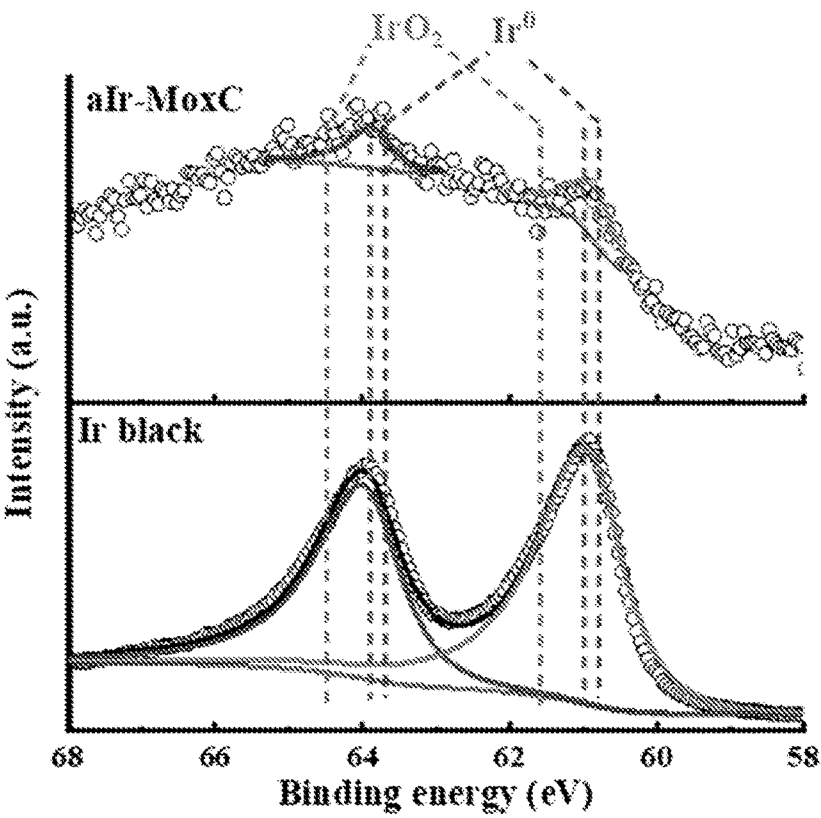
Figure 12C:
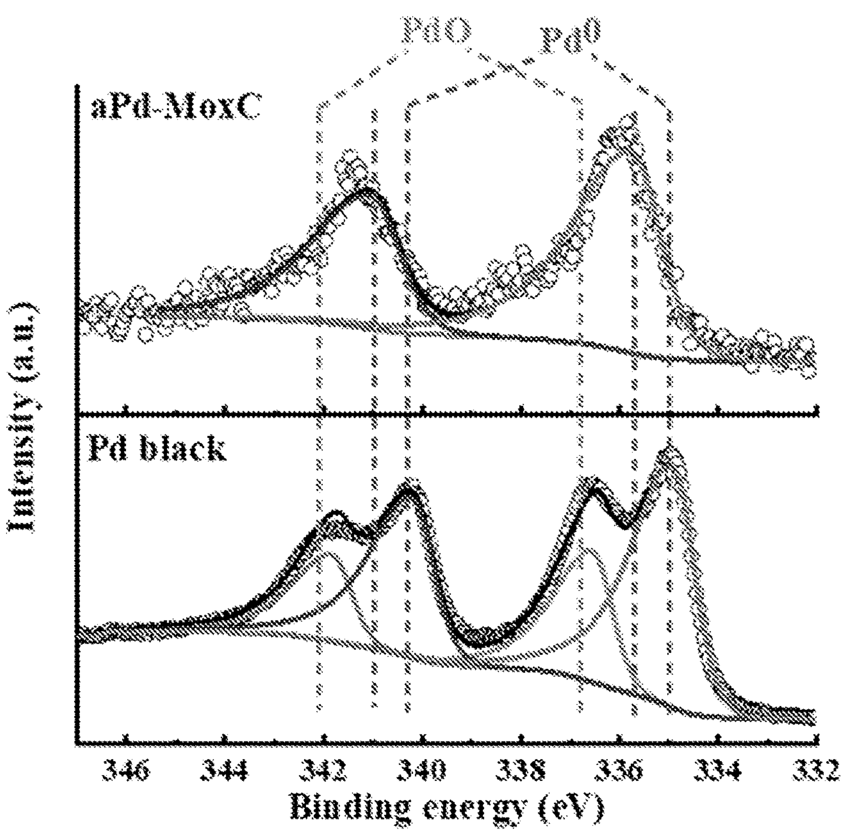
Figure 12D:
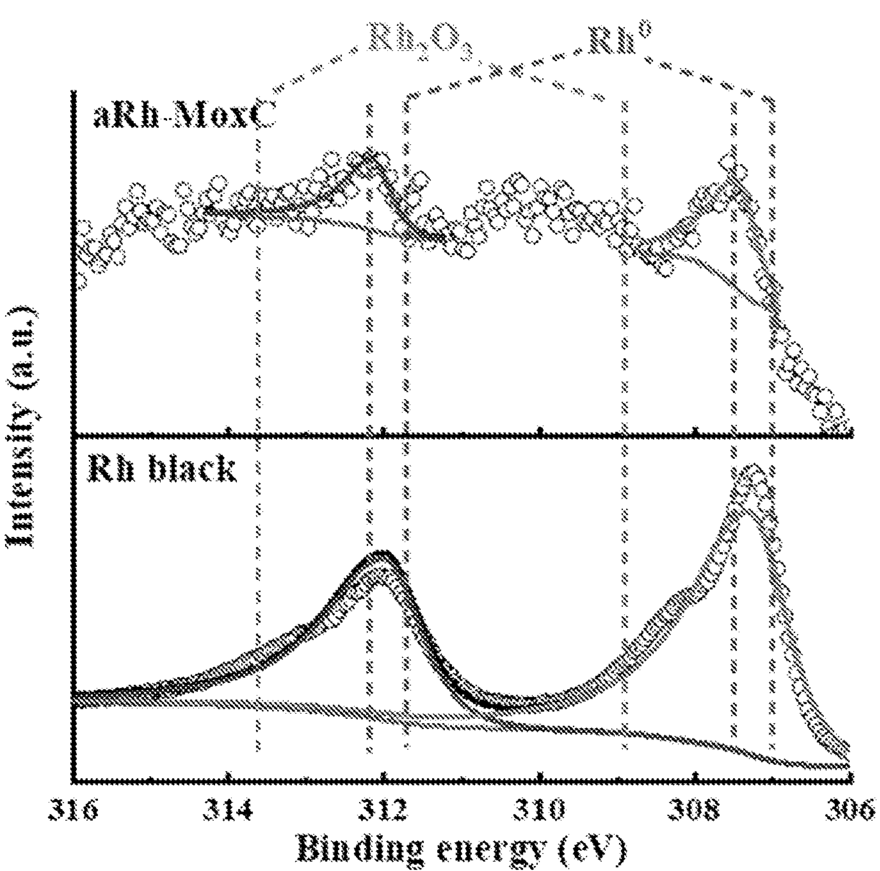

FIGS. 12A, 12B, 12C and 12D show the XPS spectra of the nanocomposites prepared in Examples 1-5 and Comparative Example 2 for Pt 4f (FIG. 12A), Ir 4f (FIG. 12B), Pd 3d (FIG. 12C) and Rh 3d (FIG. 12D). Referring to FIGS. 12A, 12B, 12C and 12D, whereas the aNM-$Mo_xC$ nanocomposites of Examples 1-4 and the Pt-RefAr nanocomposite of Example 5 have metallic properties because the noble metal chemical species are close to commercial noble metal blacks, the Pt-Ref$H_2$ of Comparative Example 2 synthesized by the low-temperature synthesis method has a cationic electrochemical structure. Through this, it was confirmed that the noble metal has metallic properties due to strong interaction with the metallic $Mo_xC$ support.

In particular, as a result of XPS analysis, Examples 1 and 5 exhibited a first effective peak and a second effective peak at binding energies of 70-72 eV and 74-76 eV, and the ratio of the intensity of the first effective peak to the intensity of the second effective peak was 0.7-0.9.

Figure 13A:
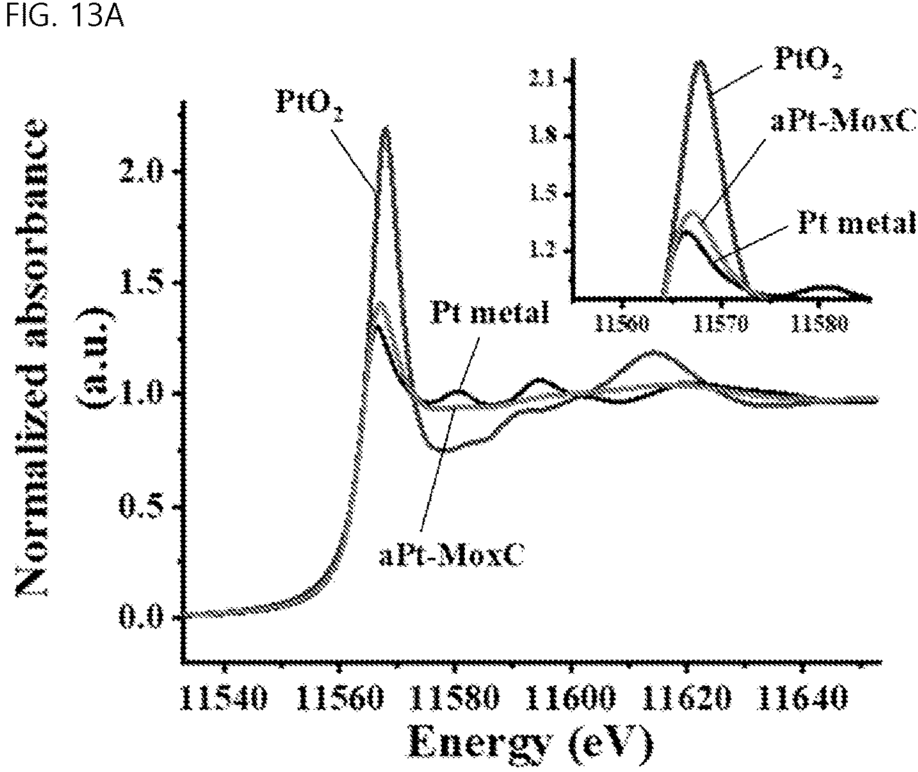
FIGS. 13A, 13B, 13C and 13D show the XANES spectra of aNM-$Mo_xC$ nanocomposites prepared in Examples 1-4 (NM: Pt, Ir, Pd, Rh) for Pt $L_3$-edge (FIG. 13A), Ir $L_3$-edge (FIG. 13B), Pd K-edge (FIG. 13C) and Rh K-edge (FIG. 13D).
Figure 13B:
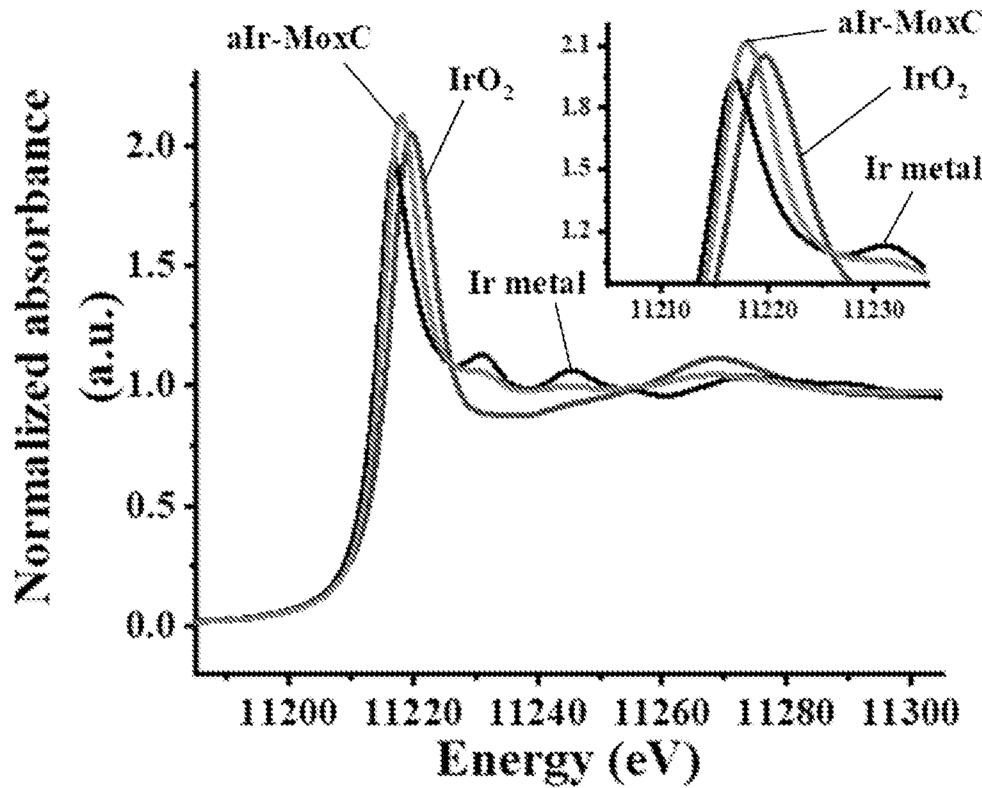
Figure 13C:
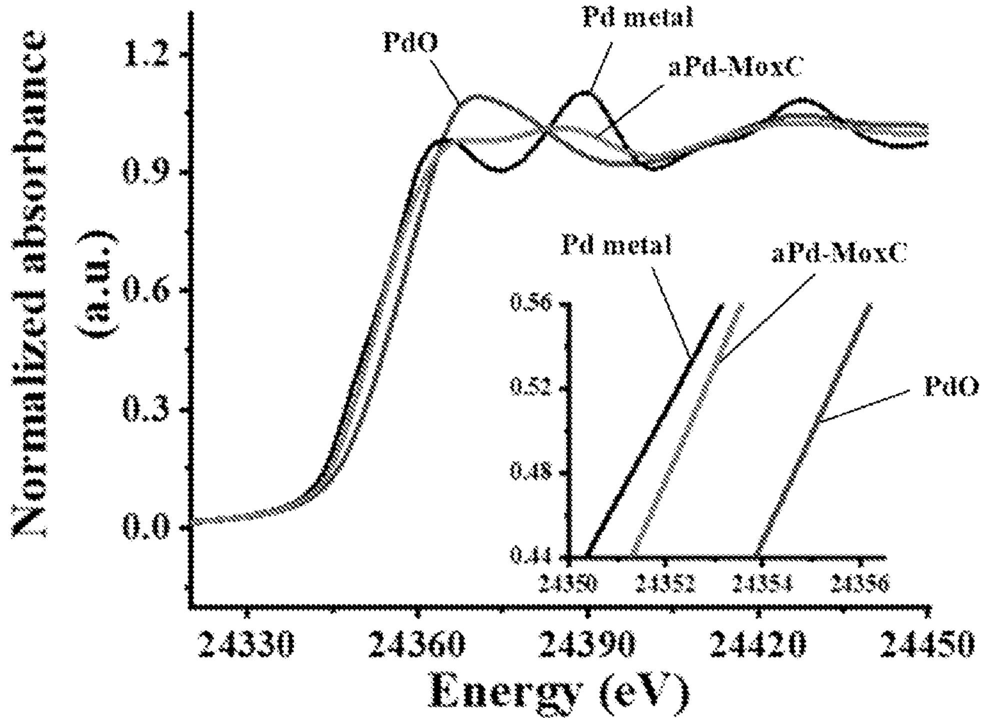
Figure 13D:
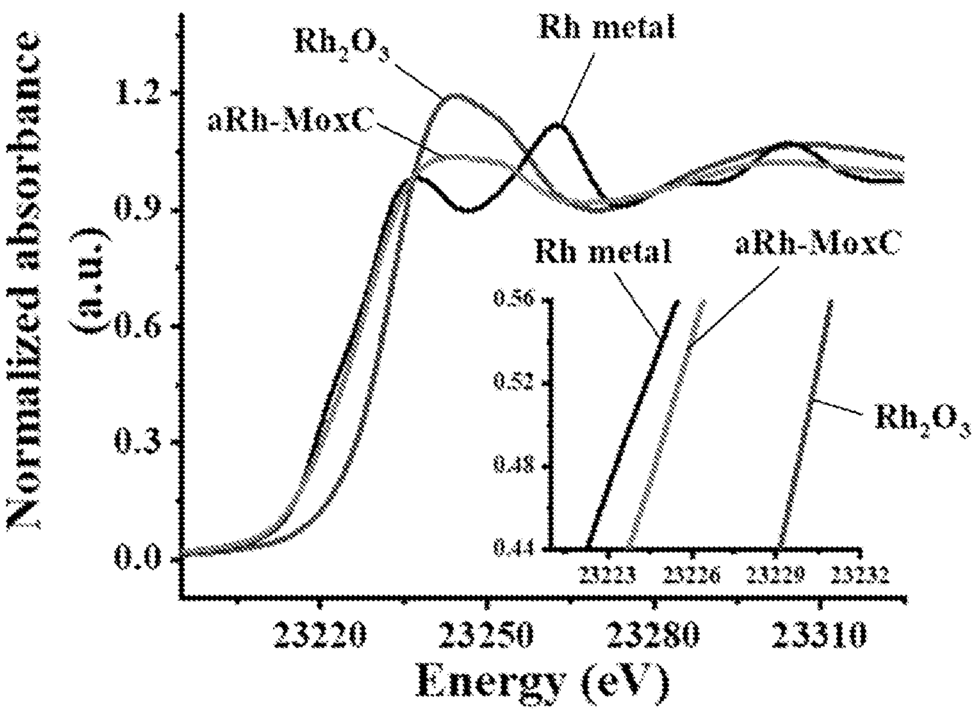

FIGS. 13A, 13B, 13C and 13D show the XANES spectra of the aNM-$Mo_xC$ nanocomposites prepared in Examples 1-4 (NM: Pt, Ir, Pd, Rh) for Pt $L_3$-edge (FIG. 13A), Ir $L_3$-edge (FIG. 13B), Pd K-edge (FIG. 13C) and Rh K-edge (FIG. 13D). Referring to FIGS. 13A, 13B, 13C and 13D, it was confirmed that the aNM-MoxCs exhibit local symmetry different from that of the bulk metal and bulk metal oxide of noble metal chemical species. In addition, it was confirmed that the aNM-MoxCs have metallic edge structure comparable to that of bulk metal in XANES.

Figure 14A:
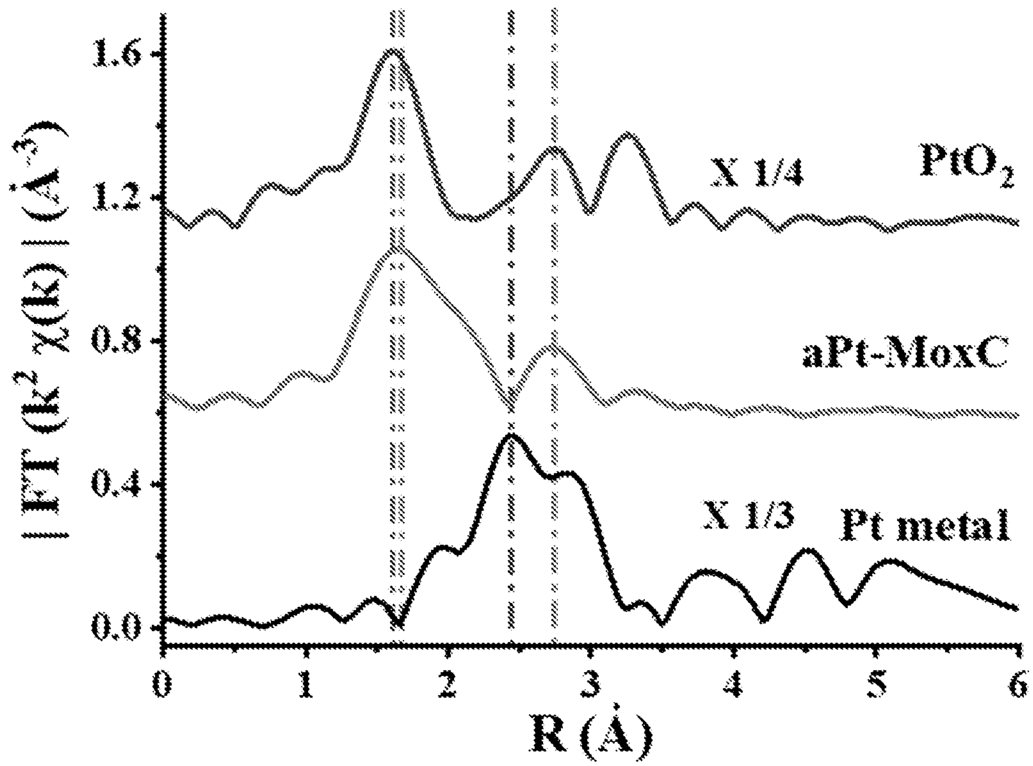
FIGS. 14A, 14B, 14C and 14D show the EXAFS spectra of aNM-$Mo_xC$ nanocomposites prepared in Examples 1-4 (NM: Pt, Ir, Pd, Rh) for Pt $L_3$-edge (FIG. 14A), Ir $L_3$-edge (FIG. 14B), Pd K-edge (FIG. 14C) and Rh K-edge (FIG. 14D).
Figure 14B:
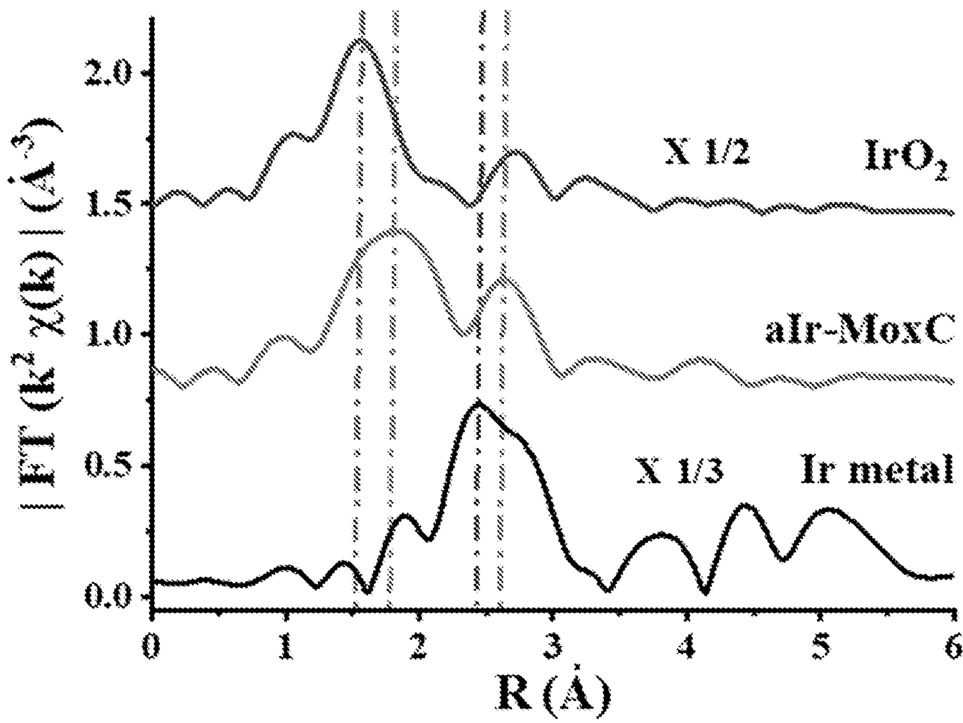
Figure 14C:
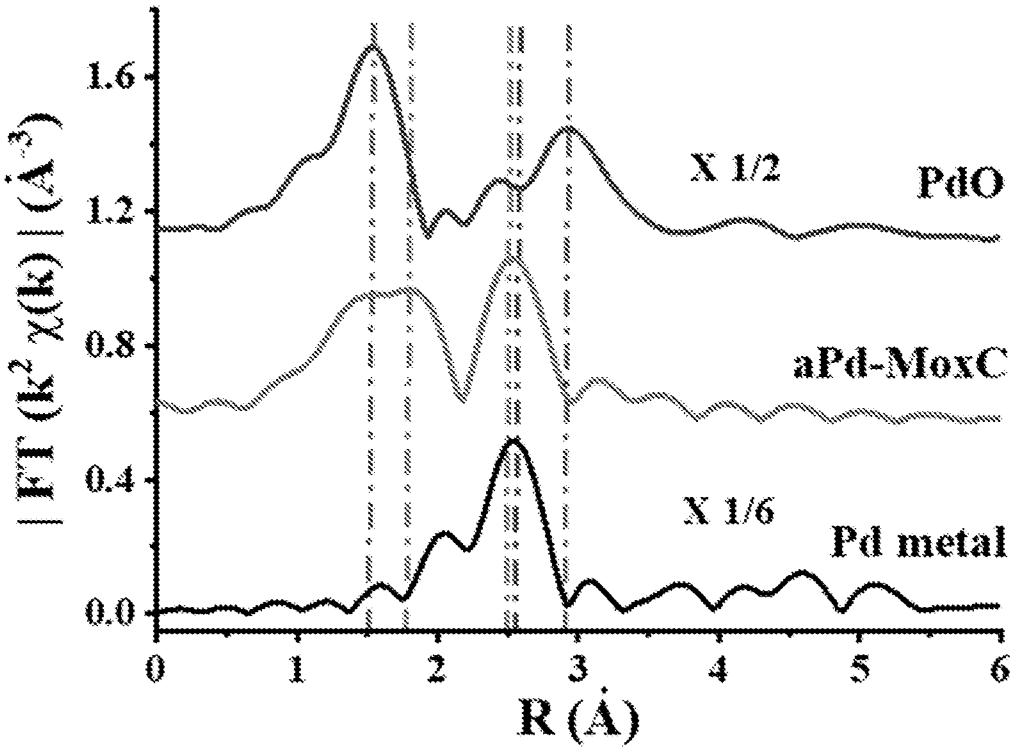
Figure 14D:
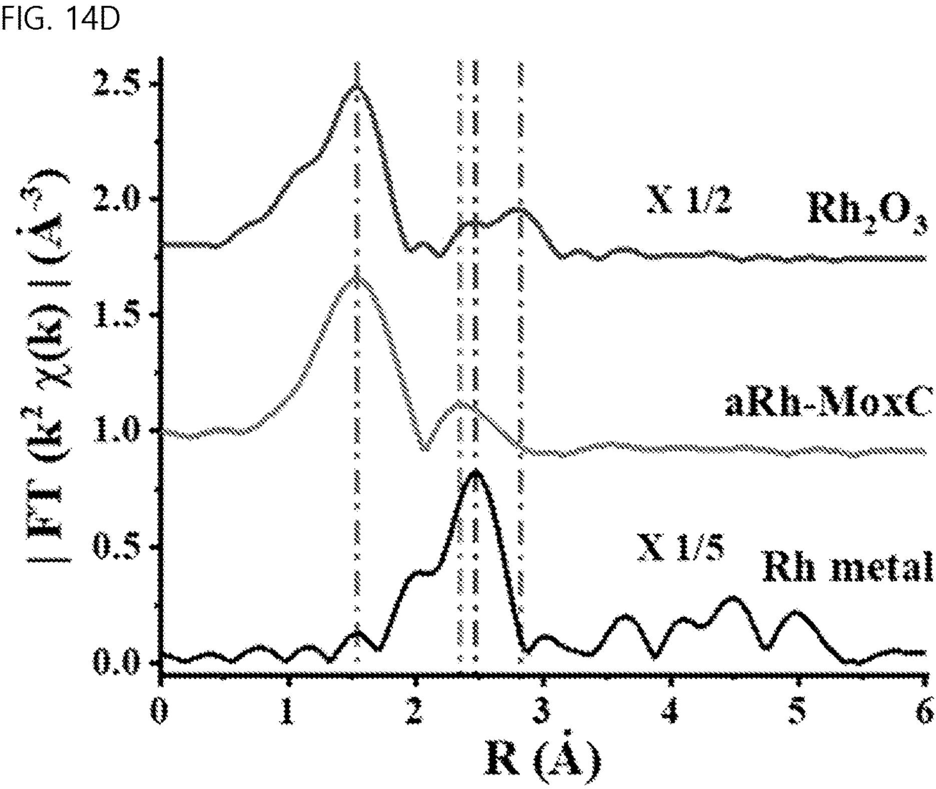
Figure 15A:
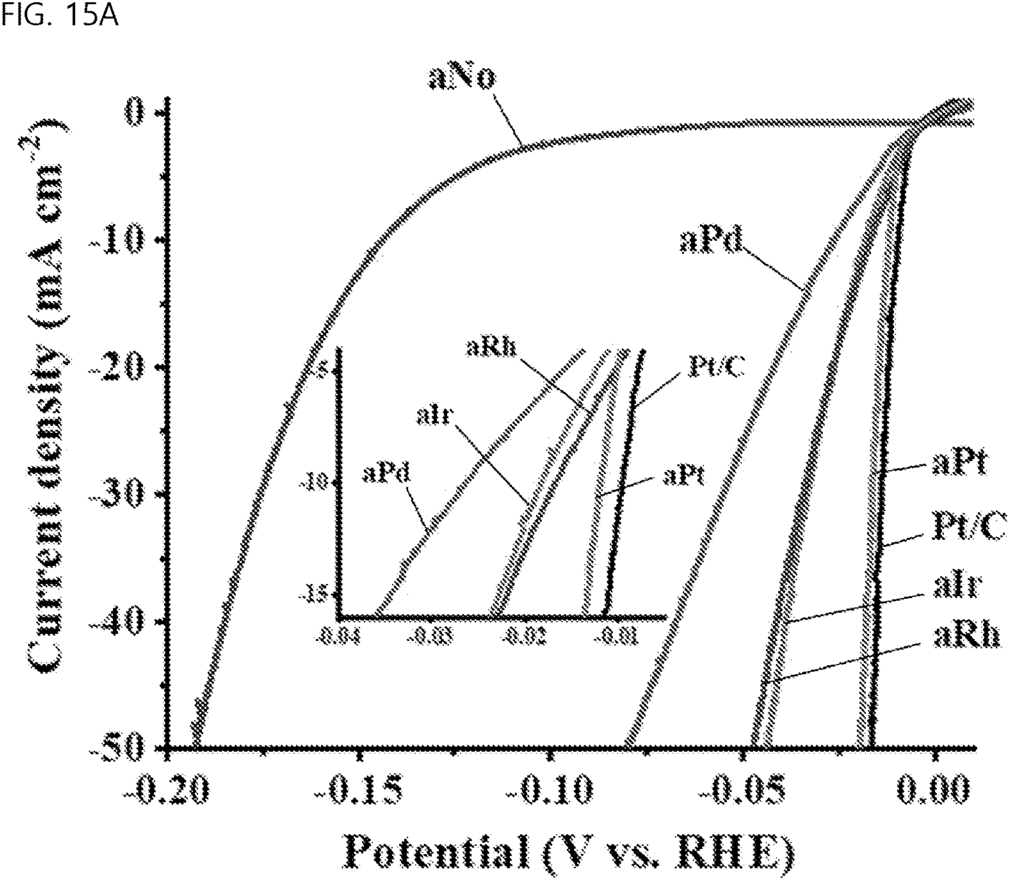
FIGS. 15A, 15B, 15C and 15D show the LSV curves (FIGS. 15A and 15B) and $\eta_{10}$ (FIGS. 15C and 15D) of aNM-$Mo_xC$ nanocomposites prepared in Examples 1-5 and Comparative Examples 1-2 and an existing Pt/C catalyst for identifying HER performance under acidic condition (0.5 M $H_2SO_4$ ($H_2$ purged), 1 mV/s).
Figure 15B:
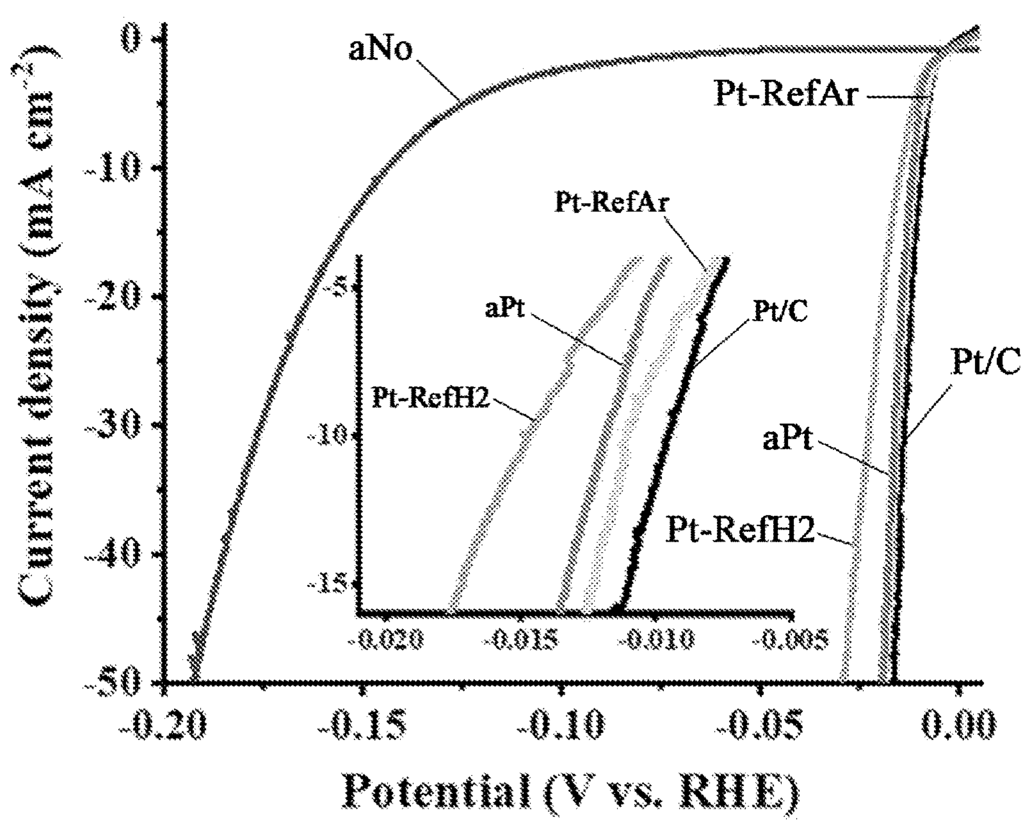
Figure 15C:
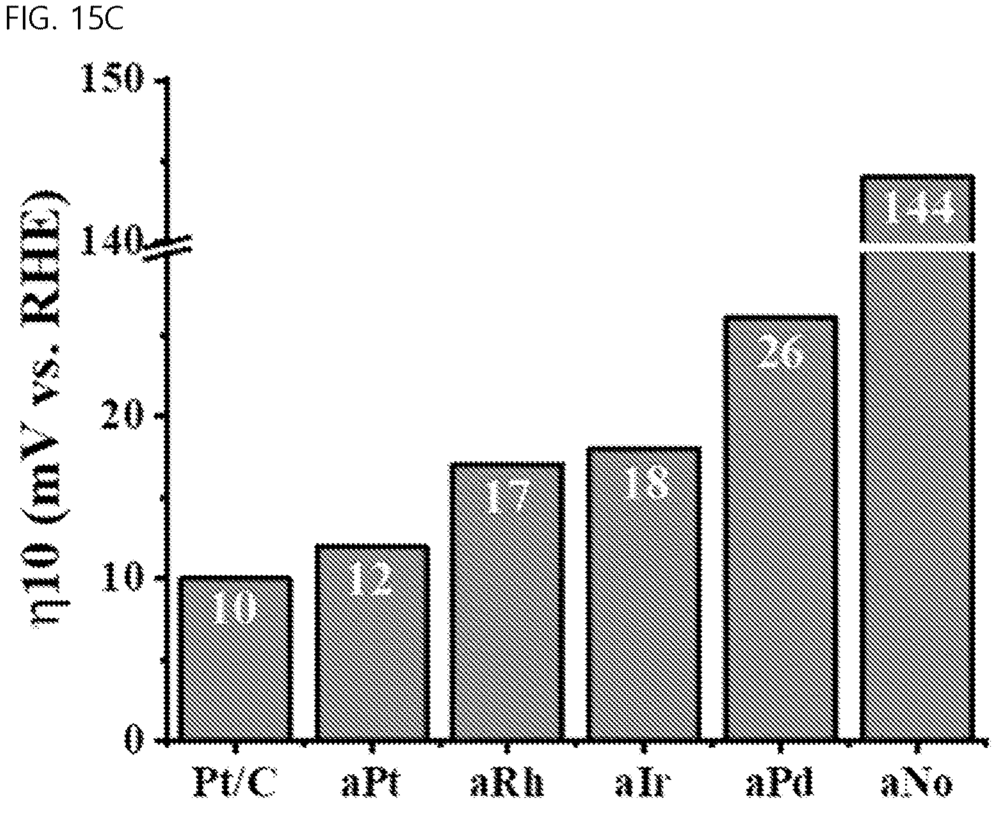
Figure 15D:
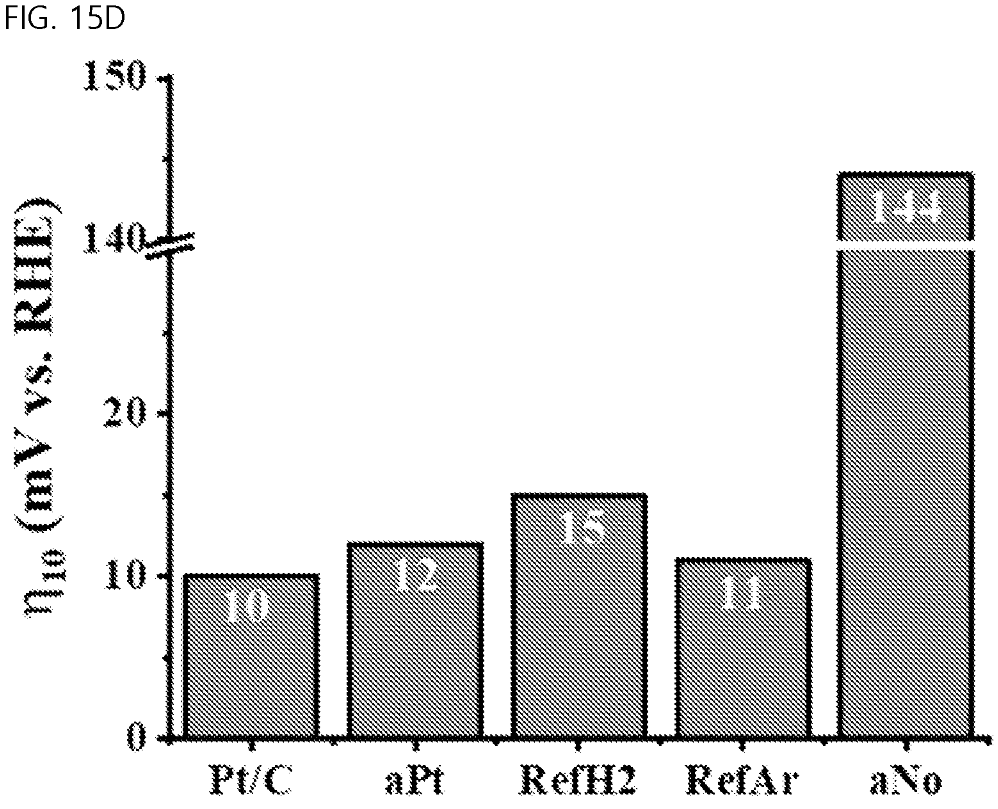
Figure 16A:
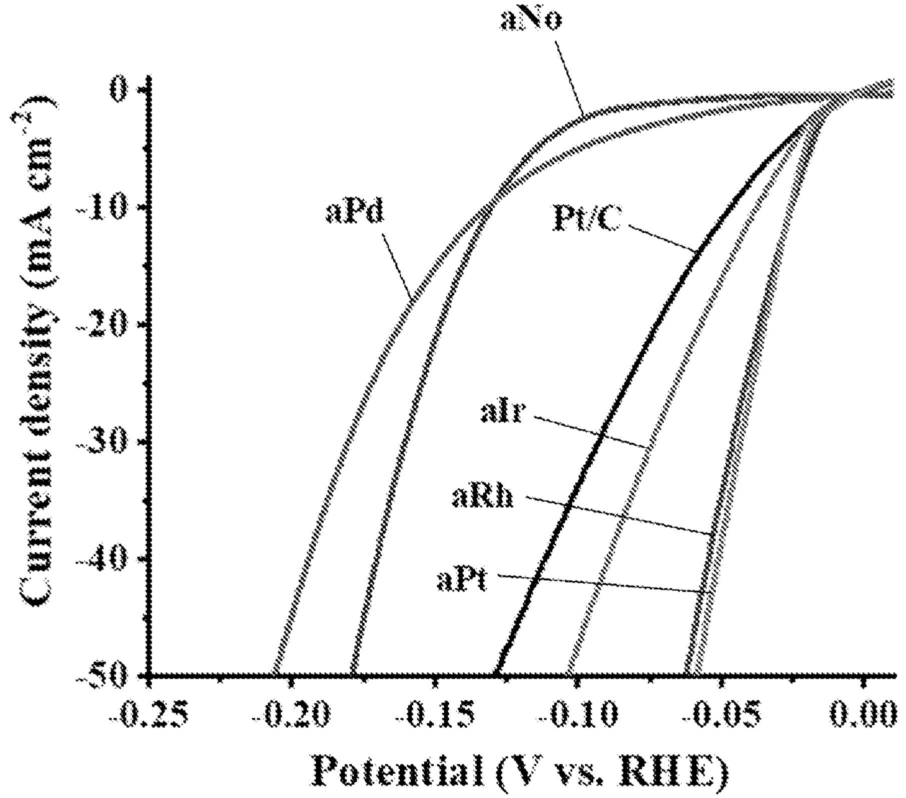
FIGS. 16A, 16B, 16C and 16D show the LSV curves (FIGS. 16A and 16B) and $\eta_{10}$ (FIGS. 16C and 16D) of aNM-$Mo_xC$ nanocomposites prepared in Examples 1-5 and Comparative Example 2 and an existing Pt/C catalyst for identifying HER performance under basic condition (1 M KOH ($H_2$ purged), 1 mV/s).
Figure 16B:
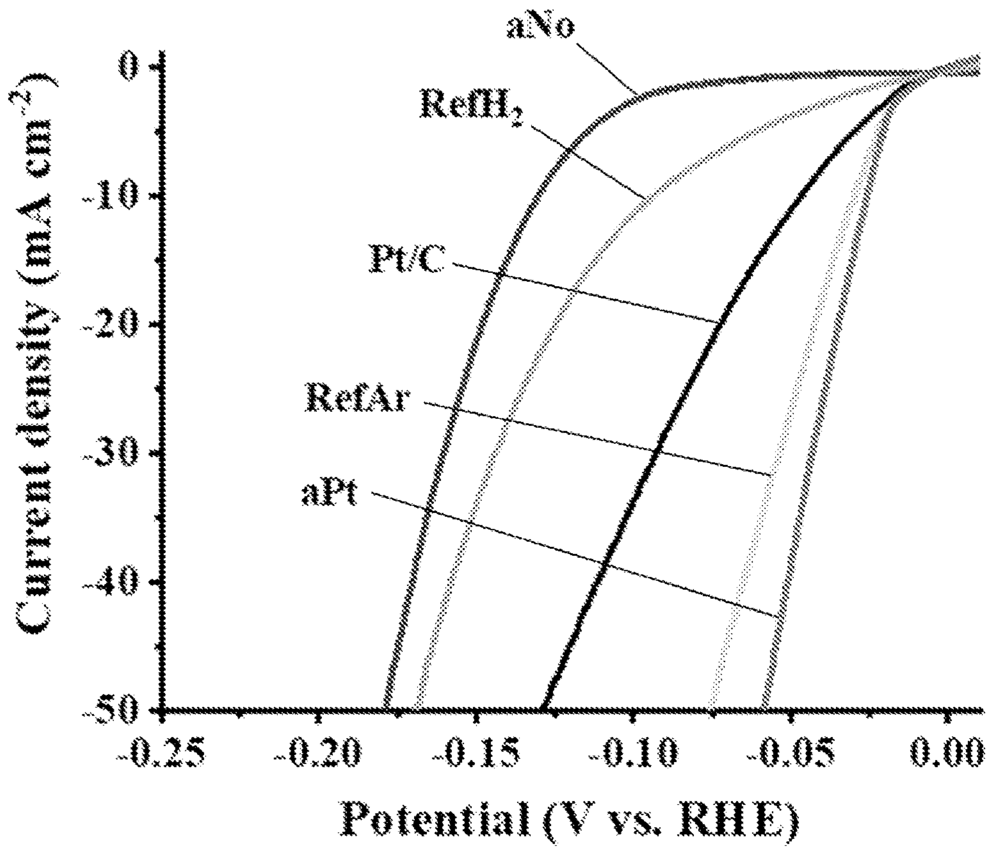
Figure 16C:
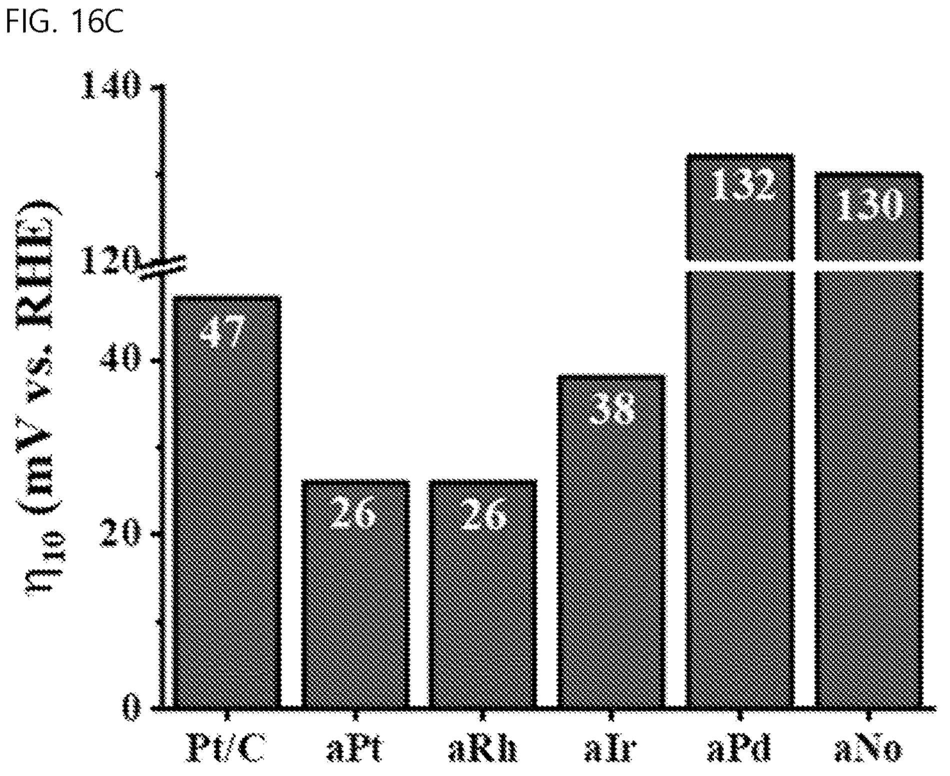
Figure 16D:
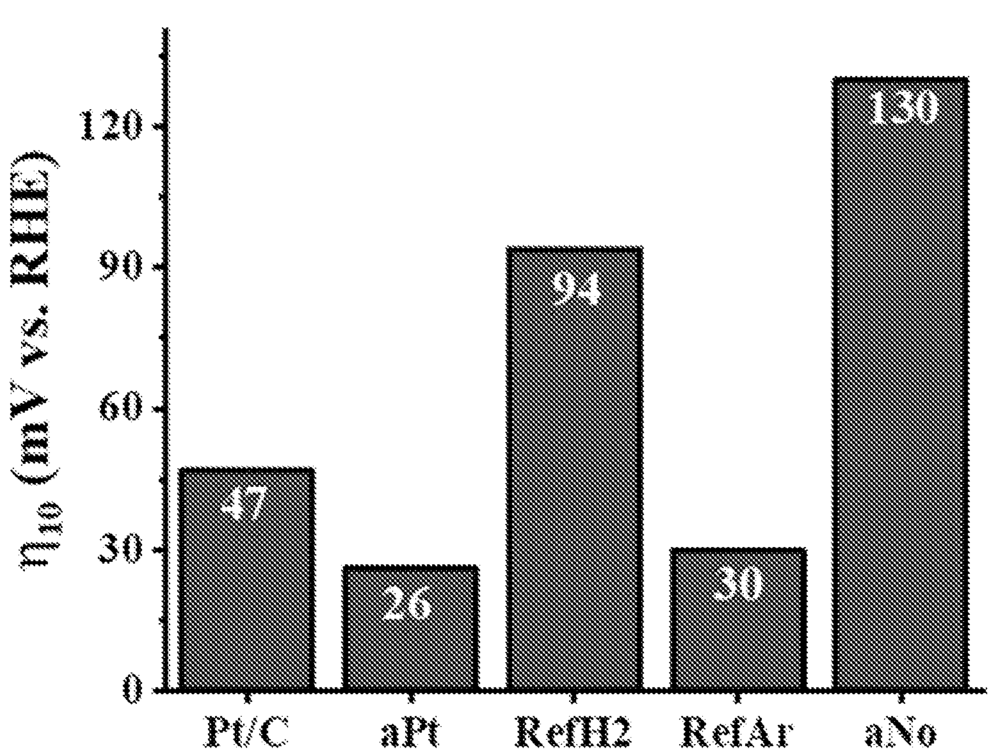

FIGS. 14A, 14B, 14C and 14D show the EXAFS spectra of the aNM-$Mo_xC$ nanocomposites prepared in Examples 1-4 (NM: Pt, Ir, Pd, Rh) for Pt $L_3$-edge (FIG. 14A), Ir $L_3$-edge (FIG. 14B), Pd K-edge (FIG. 14C) and Rh K-edge (FIG. 14D).

Table 2 shows structural parameters extracted from Mo K-edge EXAFS fitting.

TABLE 2

| Sample | Shell | CN | R (Å) | $\sigma^2$ ($10^{-3}$ Å$^2$) | R-factor |
|---|---|---|---|---|---|
| Pt | Pt—Pt | 12* | 2.76 ± 0.00 | 4.18 | 0.002 |
| aPt | Pt—C | 3.09 ± 0.30 | 2.11 ± 0.01 | 5.82 | 0.013 |
| | Pt—Mo | 0.66 ± 0.18 | 2.84 ± 0.02 | 2.50 | |
| $PtO_2$ | Pt—O | 6* | 2.01 ± 0.00 | 2.68 | 0.008 |
| | Pt—Pt | 6* | 3.11 ± 0.01 | 3.25 | |
| | Pt—O | 7* | 3.67 ± 0.02 | 2.15 | |
| Ir | Ir—Ir | 12* | 2.70 ± 0.00 | 2.34 | 0.004 |
| aIr | Ir—C | 3.27 ± 0.38 | 2.13 ± 0.01 | 2.29 | 0.013 |
| | Ir—Mo | 1.82 ± 0.29 | 2.81 ± 0.01 | 3.12 | |
| $IrO_2$ | Ir—O | 2* | 1.98 ± 0.00 | 5.78 | 0.005 |
| | Ir—O | 4* | 2.02 ± 0.00 | | |

TABLE 2-continued

| Sample | Shell | CN | R (Å) | $\sigma^2$ ($10^{-3}$ Å$^2$) | R-factor |
|---|---|---|---|---|---|
| Pd | Pd—Pd | 12* | 2.73 ± 0.00 | 4.94 | 0.008 |
| aPd | Pd—C | 4.56 ± 0.46 | 2.15 ± 0.01 | 13.9 | 0.008 |
| | Pd—Mo | 3.84 ± 0.38 | 2.79 ± 0.01 | 10.1 | |
| PdO | Pd—O | 4* | 2.02 ± 0.01 | 1.03 | 0.005 |
| Rh | Rh—Rh | 12* | 2.68 ± 0.00 | 2.56 | 0.004 |
| aRh | Rh—C | 5.08 ± 0.46 | 2.10 ± 0.01 | 4.22 | 0.012 |
| | Rh—Mo | 1.00 ± 0.36 | 2.73 ± 0.02 | 6.40 | |
| $Rh_2O_3$ | Rh—O | 1* | 1.95 ± 0.01 | 1.77 | 0.008 |
| | Rh—O | 2* | 2.00 ± 0.01 | | |
| | Rh—O | 2* | 2.04 ± 0.01 | | |
| | Rh—O | 1* | 2.07 ± 0.01 | | |

Structural parameters extracted from the Mo K-edge EXAFS fitting. CN is the coordination number; R is the interatomic distance; $\sigma^2$ is the Debye-Waller factor (a measure of the static and thermal disorder in absorber-scatterer distance); $\Delta E_0$ is edge energy shift (the zero kinetic energy difference between experiment and theoretical model); R-factor value is related with the goodness of the fitting.
*Value was assigned in curving fitting based on standard structure
$R_{bkg}$ was set to 1.0 in background removal to remove the noise oscillation below 1 Å in R-space
$S_0^2$ value was calculated from the fitting of metal foil with standard metal structure Referring to FIGS. 14A-14D and Table 2, it can be seen that the noble metal chemical species of the aNM-$Mo_xC$ nanocomposites have longer noble metal-C bonds due to coordination to carbon and show uniform dispersion as single atoms.

Test Example 5: Evaluation of HER Performance of aNM-$Mo_xC$ Under Acidic and Basic Conditions The HER performance of the aNM-$Mo_xC$ nanocomposites prepared in Examples 1-5 and Comparative Examples 1-2 and the existing Pt/C catalyst was evaluated under acidic and basic conditions. The catalytic performance of the synthesized composites for HER under acidic and basic conditions was evaluated in 0.5 M $H_2SO_4$ and 1 M KOH using an RDE system (1600 rpm, $H_2$ purged). The result is shown in FIGS. 15A-19 and Table 3.

FIGS. 15A, 15B, 15C and 15D show the LSV curves (FIGS. 15A and 15B) and $\eta_{10}$ (FIGS. 15C and 15D) of the aNM-$Mo_xC$ nanocomposites prepared in Examples 1-5 and Comparative Examples 1-2 and the existing Pt/C catalyst for identifying HER performance under acidic condition (0.5 M $H_2SO_4$ ($H_2$ purged), 1 mV/s).

Referring to FIGS. 15A, 15B, 15C and 15D, as a result of conducting LSV (linear sweep voltammetry) at a scan rate of 1 mV/s, whereas the $\eta_{10}$ value (overvoltage for achieving the current density of 10 mA/cm$^2$) under acidic condition was 144 mV for the allo-$Mo_xC$ nanocomposite of Comparative Example 1 with no noble metal, the values were superior for the existing Pt/C (10 mV), the aPt-$Mo_xC$ of Example 1 (12 mV), the aRh-$Mo_xC$ of Example 4 (17 mV), the alr-$Mo_xC$ of Example 2 (18 mV) and the aPd-$Mo_xC$ of Example 3 (26 mV). In addition, the Pt-Ref$H_2$ of Comparative Example 2 (15 mV) and the Pt-RefAr of Example 5 (11 mV) synthesized through wet impregnation also showed superior performance. Through this, it was confirmed that the synthesized aNM-$Mo_xC$ nanocomposite catalyst exhibits superior performance even under acidic condition, and the Pt and Rh ADCs synthesized through high-temperature dynamic arrangement exhibits performance comparable to that of Pt/C.

FIGS. 16A, 16B, 16C and 16D show the LSV curves (FIGS. 16A and 16B) and $\eta_{10}$ (FIGS. 16C and 16D) of the aNM-$Mo_xC$ nanocomposites prepared in Examples 1-5 and Comparative Example 2 and the existing Pt/C catalyst for identifying HER performance under basic condition (1 M KOH ($H_2$ purged), 1 mV/s).

Referring to FIGS. 16A, 16B, 16C and 16D, whereas the $\eta_{10}$ value under basic condition was 130 mV for the allo-$Mo_xC$ nanocomposite of Comparative Example 1 with no noble metal, the Pt, Rh and Ir ADCs synthesized through high-temperature dynamic arrangement showed better performance than the commercial Pt/C with the existing Pt/C (47 mV), aPt-$Mo_xC$ (26 mV), aRh-$Mo_xC$ (26 mV), alr-$Mo_xC$ (38 mV) and aPd-$Mo_xC$ (132 mV). In addition, with the Pt-Ref$H_2$ of Comparative Example 2 (94 mV) and the Pt-RefAr of Example 5 (30 mV) synthesized through wet impregnation, only the sample synthesized through high-temperature dynamic arrangement showed superior performance.

Figure 17A:
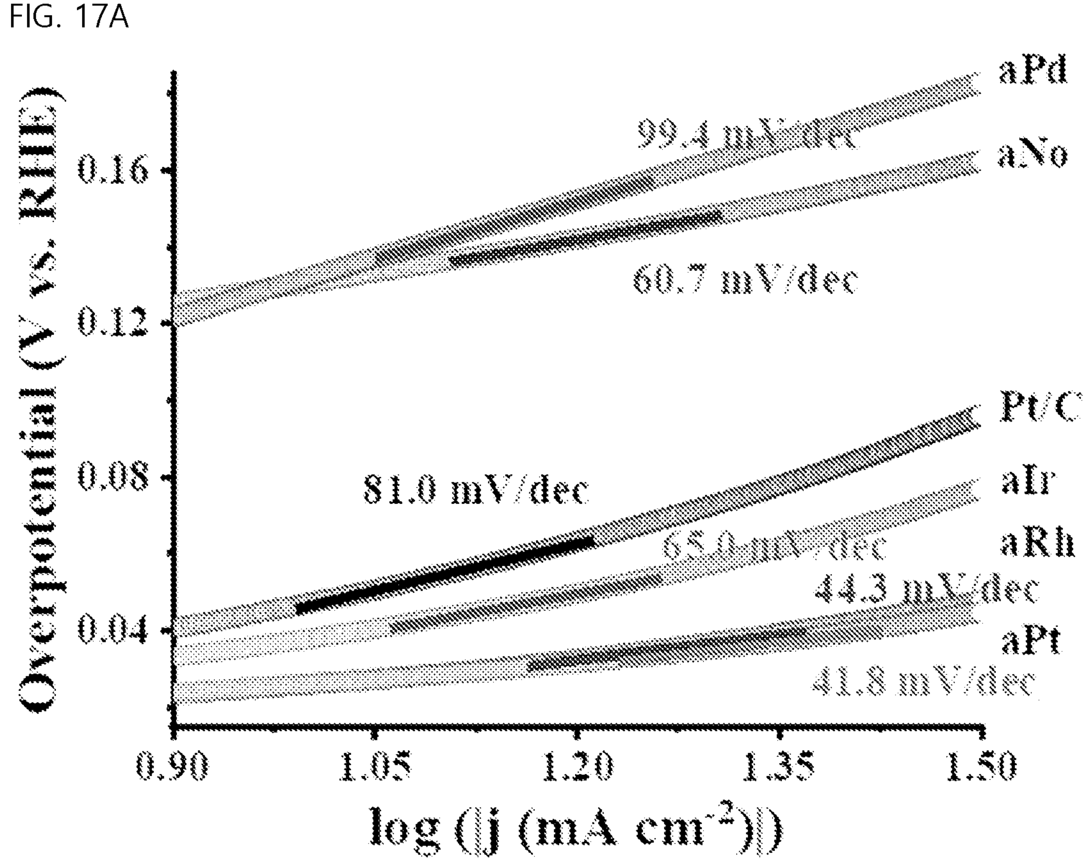
FIGS. 17A and 17B show the Tafel curves of aNM-$Mo_xC$ nanocomposites prepared in Examples 1-5 and Comparative Example 2 and an existing Pt/C catalyst under basic condition (1 M KOH) (FIG. 17A) and the Tafel curves of existing Pt/C, aPt-$Mo_xC$ and allo-$Mo_xC$ (FIG. 17B).
Figure 17B:
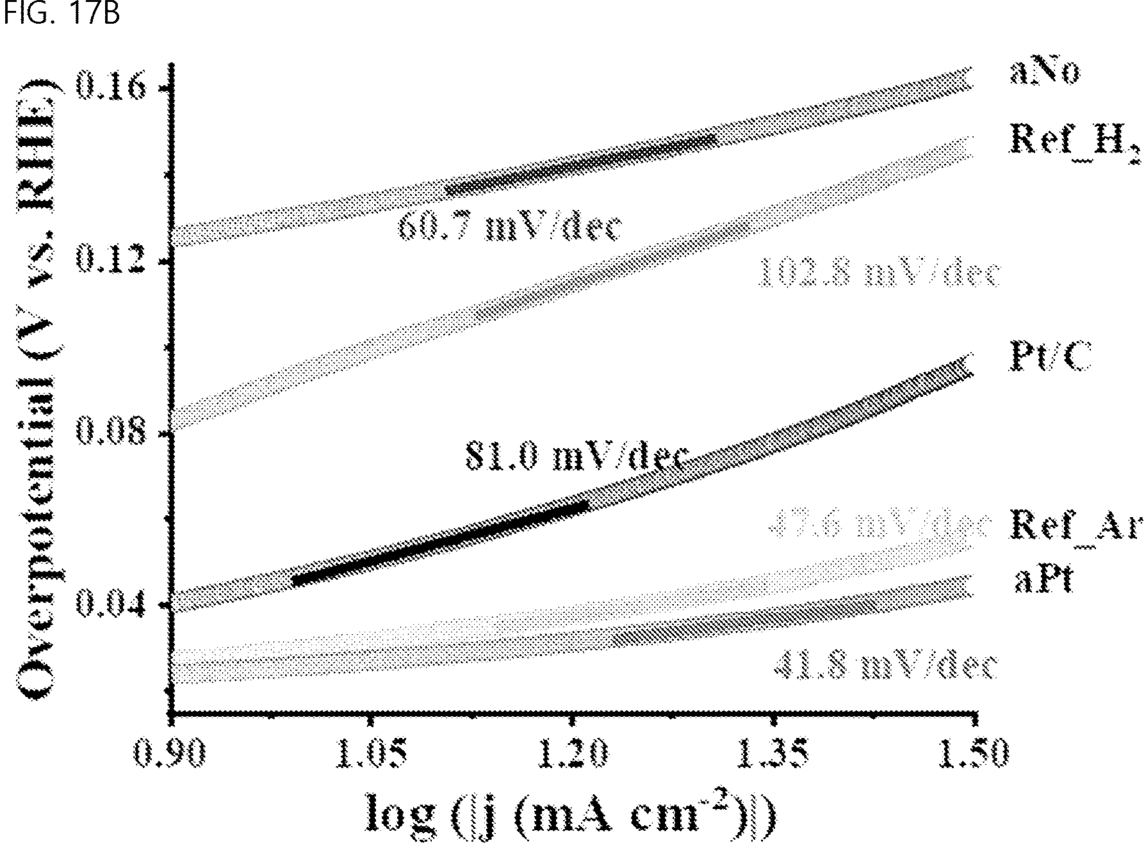

FIGS. 17A and 17B show the Tafel curves of the aNM-$Mo_xC$ nanocomposites prepared in Examples 1-5 and Comparative Example 2 and the existing Pt/C catalyst under basic condition (1 M KOH) (FIG. 17A) and the Tafel curves of the existing Pt/C, aPt-$Mo_xC$ and allo-$Mo_xC$ (FIG. 17B).

Table 3 shows the electrochemical performance of the aNM-$Mo_xC$ nanocomposites prepared in Examples 1-5 and Comparative Example 2 and the existing Pt/C catalyst.

TABLE 3

| | $\eta_{10}$ (mV) | Tafel slope (mV/dec) | $j_0$ (mA cm$^{-2}$) | $j_{at\ 40\ mV}$ (mA cm$^{-2}$) |
|---|---|---|---|---|
| Pt/C | 47 | 81.0 | 2.675 | 7.802 |
| aPt—MoxC | 26 | 41.8 | 2.897 | 26.061 |
| aRh—MoxC | 26 | 44.3 | 2.963 | 23.373 |
| aIr—MoxC | 38 | 65.0 | 2.737 | 11.125 |
| aPd—MoxC | 132 | 99.4 | 0.469 | 1.323 |
| Pt-RefH2 | 94 | 102.8 | 1.214 | 2.835 |
| Pt-RefAr | 30 | 47.6 | 2.568 | 17.876 |
| aNo—MoxC | 130 | 60.7 | — | — |

Referring to FIGS. 17A and 17B and Table 3, it was confirmed that Examples 1, 4, 2 and 5 (aPt-$Mo_xC$, aRh-$Mo_xC$, alr-$Mo_xC$ and Pt-RefAr) wherein the noble metal was supported selectively on $Mo_xC$, exhibit better kinetic characteristics than the existing Pt/C supported on the porous carbon support and Comparative Example 2 (Pt-Ref$H_2$). Through this, it can be seen that the performance of the Pt, Rh and Ir ADCs excelling that of Pt/C is due to superior kinetic characteristics, which is due to the superior water dissociation characteristics of the multifunctional $Mo_xC$.

Figure 18:
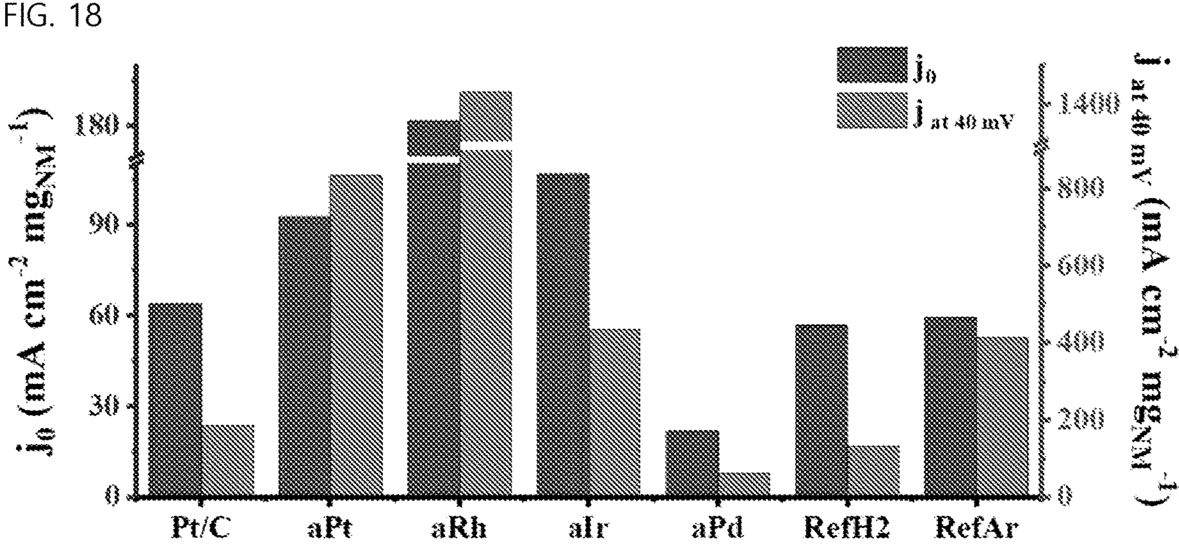
FIG. 18 shows the exchange current density ($j_0$) and current density (at 40 mV vs. RHE) (j at 40 mV) of aNM-$Mo_xC$ nanocomposites prepared in Examples 1-5 and Comparative Example 2 and an existing Pt/C catalyst for HER under basic condition (1 M KOH) per mass of noble metal.

FIG. 18 shows the exchange current density ($j_0$) and current density (at 40 mV vs. RHE) ((j at 40 mV) of the aNM-$Mo_xC$ nanocomposites prepared in Examples 1-5 and Comparative Example 2 and the existing Pt/C catalyst for HER under basic condition (1 M KOH) per mass of noble metal.

Referring to FIG. 18, whereas the current density at 40 mV (vs. RHE) per mass of noble metal was 6 times for the aPt-$Mo_xC$ nanocomposite of Example 1 and 4 times for the Pt-RefAr of Example 5 as compared to the existing Pt/C, it was 0.7 time for the Pt-Ref$H_2$ of Comparative Example 2. That is to say, only the nanocomposites synthesized through high-temperature dynamic arrangement exhibited superior kinetic characteristics per noble metal than the commercial Pt/C, and such improvement could not be achieved with the existing low-temperature synthesis method.

Figure 19:
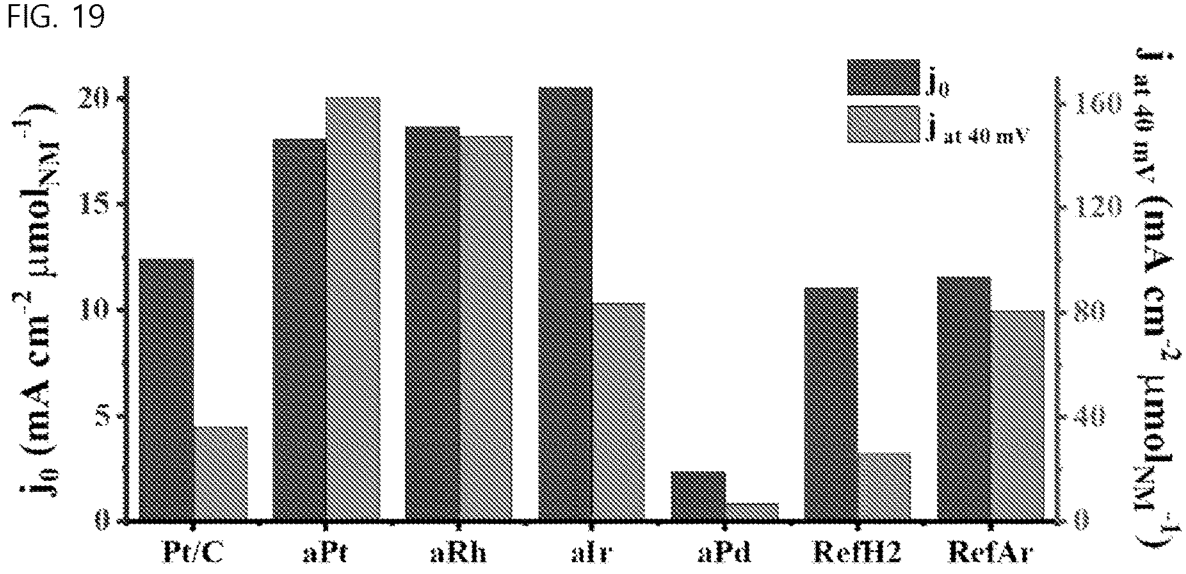
FIG. 19 shows the exchange current density ($j_0$) and current density (at 40 mV vs. RHE) ((j at 40 mV) of aNM-$Mo_xC$ nanocomposites prepared in Examples 1-5 and Comparative Example 2 and an existing Pt/C catalyst for HER under basic condition (1 M KOH) per mole of noble metal.

FIG. 19 shows the exchange current density ($j_0$) and current density (at 40 mV vs. RHE) ((j at 40 mV) of the aNM-$Mo_xC$ nanocomposites prepared in Examples 1-5 and Comparative Example 2 and the existing Pt/C catalyst for HER under basic condition (1 M KOH) per mole of noble metal.

Referring to FIG. 19, the current density at 40 mV (vs. RHE) per mole of noble metal was 6 times for the aPt-$Mo_xC$ nanocomposite of Example 1, 6 times for the aRh-$Mo_xC$ nanocomposite of Example 4 and 2 times for the alr-$Mo_xC$ nanocomposite of Example 2 as compared to the existing Pt/C. That is to say, the Pt, Rh and Ir ADCs synthesized through high-temperature dynamic arrangement exhibited superior kinetic characteristics per noble metal than the existing Pt/C, and such improvement could not be achieved with the existing low-temperature synthesis method.

Through this, it can be seen that, whereas all the nanocomposites synthesized using noble metals have superior performance under acidic condition, only the Pt, Rh and Ir ADCs synthesized through high-temperature dynamic arrangement exhibit better performance than that of the existing Pt/C under basic condition. This is due to the significantly improved kinetic characteristics per noble metal owing to the superior water dissociation characteristics of $Mo_xC$.

Test Example 6: Evaluation of HOR Performance and Stability of aNM-$Mo_xC$ Under Basic Condition The HOR performance of the aNM-$Mo_xC$ nanocomposites prepared in Examples 1-5 and Comparative Example 1 and the existing Pt/C catalyst under basic condition was evaluated. The catalytic performance of the nanocomposites was evaluated in 1 M KOH using an RDE system (1600 rpm, $H_2$ purged) for investigation of applicability as HOR catalysts under basic condition. The result is shown in FIGS. 20-24.

Figure 20:
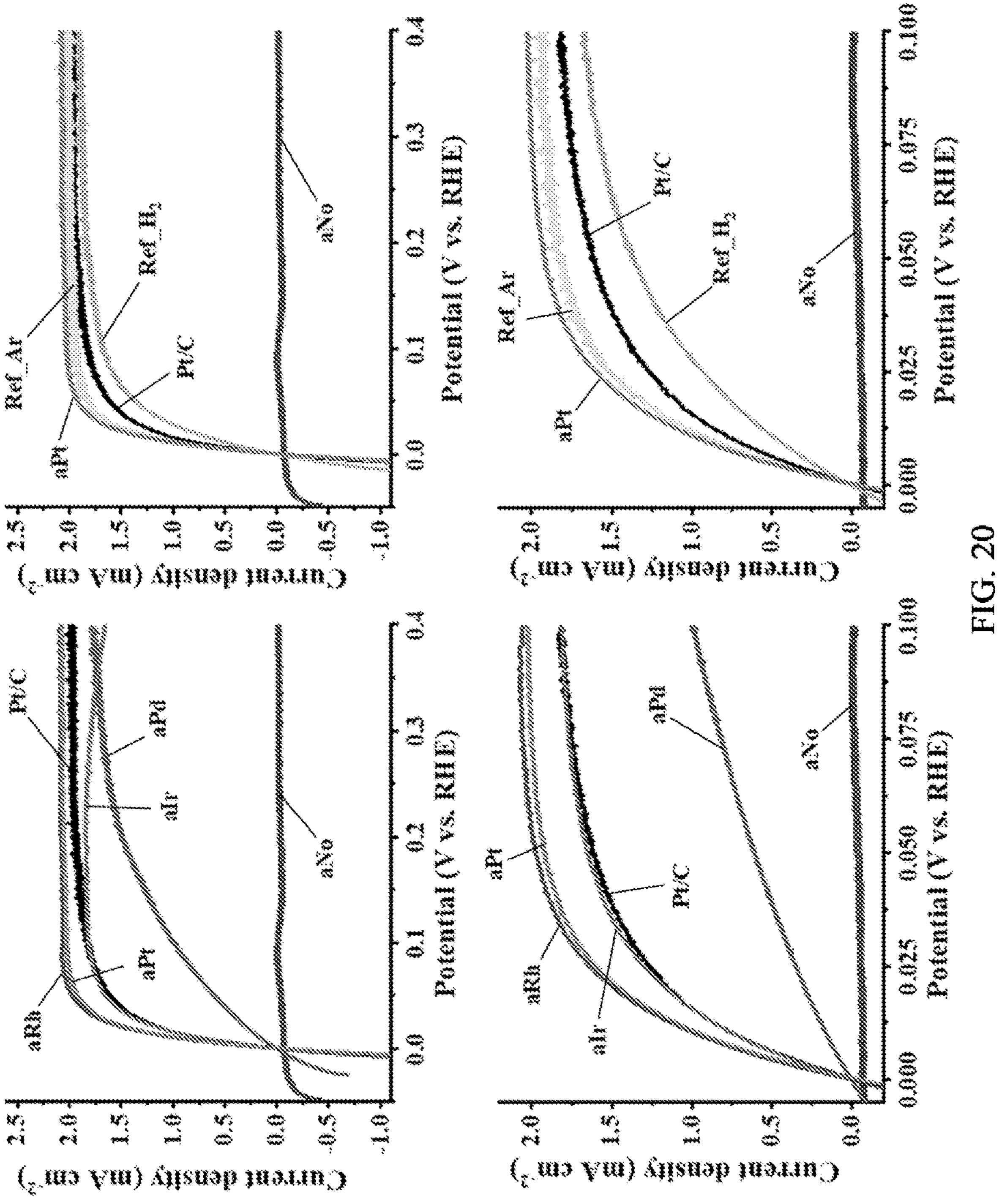
FIG. 20 shows the LSV curves of aNM-$Mo_xC$ nanocomposites prepared in Examples 1-5 and Comparative Example 2 and an existing Pt/C catalyst under basic condition (1 M KOH ($H_2$ purged), 1 mV/s) for identifying HOR performance.

FIG. 20 shows the LSV curves of the aNM-$Mo_xC$ nanocomposites prepared in Examples 1-5 and Comparative Example 2 and the existing Pt/C catalyst under basic condition (1 M KOH ($H_2$ purged), 1 mV/s) for identifying HOR performance.

Referring to FIG. 20, when LSV was conducted at a scan rate of 1 mV/s, the current density value at 25 mV (vs. RHE) was 1.289 mA/cm$^2$ for the existing Pt/C, 1.602 mA/cm$^2$ for the aPt-$Mo_xC$ of Example 1, 1.646 mA/cm$^2$ for the aRh-$Mo_xC$ of Example 4, 1.301 mA/cm$^2$ for the alr-$Mo_xC$ of Example 2, 0.349 mA/cm$^2$ for the aPd-$Mo_xC$ of Example 3, 0.938 mA/cm$^2$ for the Pt-Ref$H_2$ of Comparative Example 2, and 1.509 mA/cm$^2$ for the Pt-RefAr of Example 5. That is to say, the performance of the aPt-$Mo_xC$, aRh-$Mo_xC$, Pt-RefAr and alr-$Mo_xC$ synthesized through high-temperature dynamic arrangement excelled that of the existing Pt/C as in the HER under basic condition.

Figure 21:
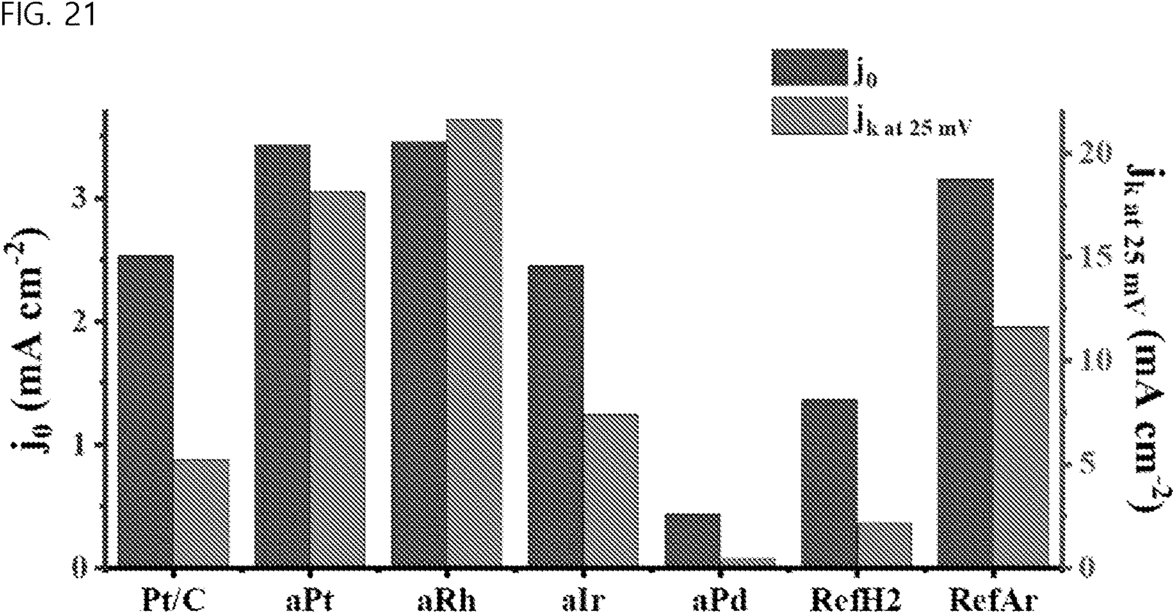
FIG. 21 shows the exchange current density ($j_0$) and diffusion-controlled kinetic current density (at 25 mV vs. RHE) ($j_{at\ 25\ mV}$) of aNM-$Mo_xC$ nanocomposites prepared in Examples 1-5 and Comparative Example 2 and an existing Pt/C catalyst under basic condition (1 M KOH ($H_2$ purged), 1 mV/s) for identifying HOR performance.

FIG. 21 shows the exchange current density ($j_0$) and diffusion-controlled kinetic current density (at 25 mV vs. RHE) ($j_{at\ 25\ mV}$) of the aNM-$Mo_xC$ nanocomposites prepared in Examples 1-5 and Comparative Example 2 and the existing Pt/C catalyst under basic condition (1 M KOH ($H_2$ purged), 1 mV/s) for identifying HOR performance.

Referring to FIG. 21, the diffusion-controlled kinetic current density (25 mV, $j_k$) was 5.227 mA/cm$^2$ for the existing Pt/C, 18.175 mA/cm$^2$ for the aPt-$Mo_xC$ of Example 1, 21.653 mA/cm$^2$ for the aRh-$Mo_xC$ of Example 4, 7.408 mA/cm$^2$ for the alr-$Mo_xC$ of Example 2, 0.454 mA/cm$^2$ for the aPd-$Mo_xC$ of Example 3, 2.180 mA/cm$^2$ for the Pt-Ref$H_2$ of Comparative Example 2, and 11.630 mA/cm$^2$ for the Pt-RefAr of Example 5. That is to say, it was confirmed that their improved performance is due to the superior kinetic characteristics as compared to the existing Pt/C. Through this, it can be seen that the major factor of performance improvement is the improvement of kinetic characteristics and such improvement is achieved only in the nanocomposites synthesized through high-temperature dynamic arrangement.

Figure 22:
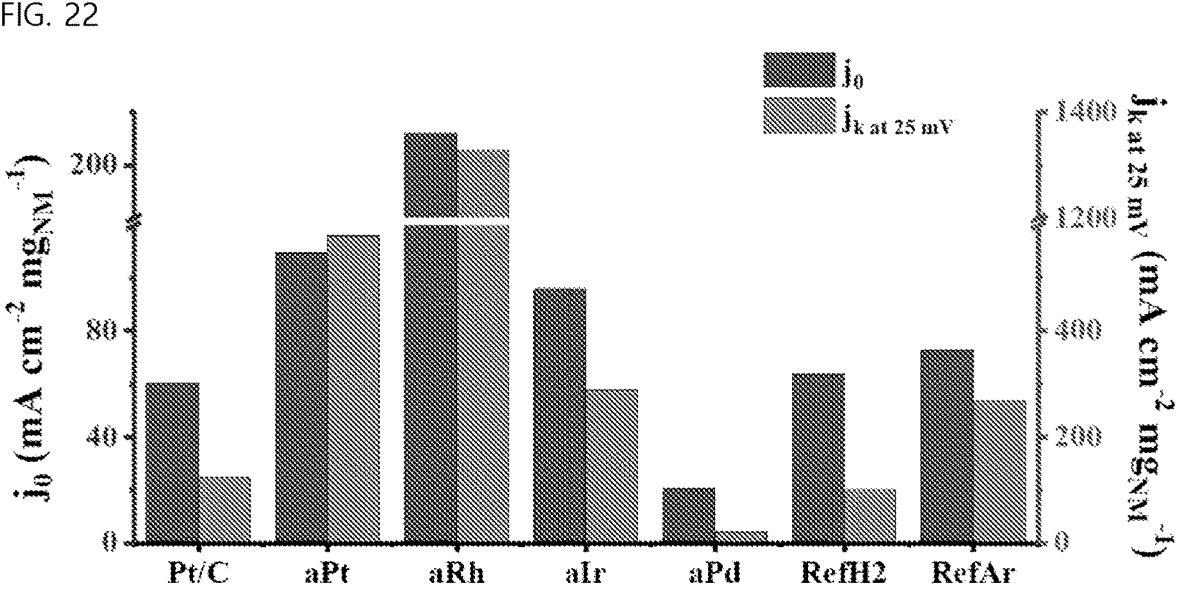
FIG. 22 shows the exchange current density ($j_0$) and diffusion-controlled kinetic current density (at 25 mV vs. RHE) ($j_k$ at 25 mV) of aNM-$Mo_xC$ nanocomposites prepared in Examples 1-5 and Comparative Example 2 and an existing Pt/C catalyst under basic condition (1 M KOH ($H_2$ purged), 1 mV/s) per mass of noble metal for identifying HOR performance.

FIG. 22 shows the exchange current density ($j_0$) and diffusion-controlled kinetic current density (at 25 mV vs. RHE) ($j_k$ at 25 mV) of the aNM-$Mo_xC$ nanocomposites prepared in Examples 1-5 and Comparative Example 2 and the existing Pt/C catalyst under basic condition (1 M KOH ($H_2$ purged), 1 mV/s) per mass of noble metal for identifying HOR performance.

Referring to FIG. 22, the $j_k$ value per mass of noble metal at 25 mV (vs. RHE) was 5 times for the aPt-$Mo_xC$ of Example 1 and 2 times for the Pt-RefAr of Example 5 as compared to the existing Pt/C. That is to say, the nanocomposites synthesized through high-temperature dynamic arrangement exhibited performance excelling that of the commercial Pt/C. Through this, it can be seen that the major factor of performance improvement is the improvement of kinetic characteristics, such improvement is achieved only in the nanocomposites synthesized through high-temperature dynamic arrangement, and the performance per noble metal is enhanced significantly as a result.

Figure 23:
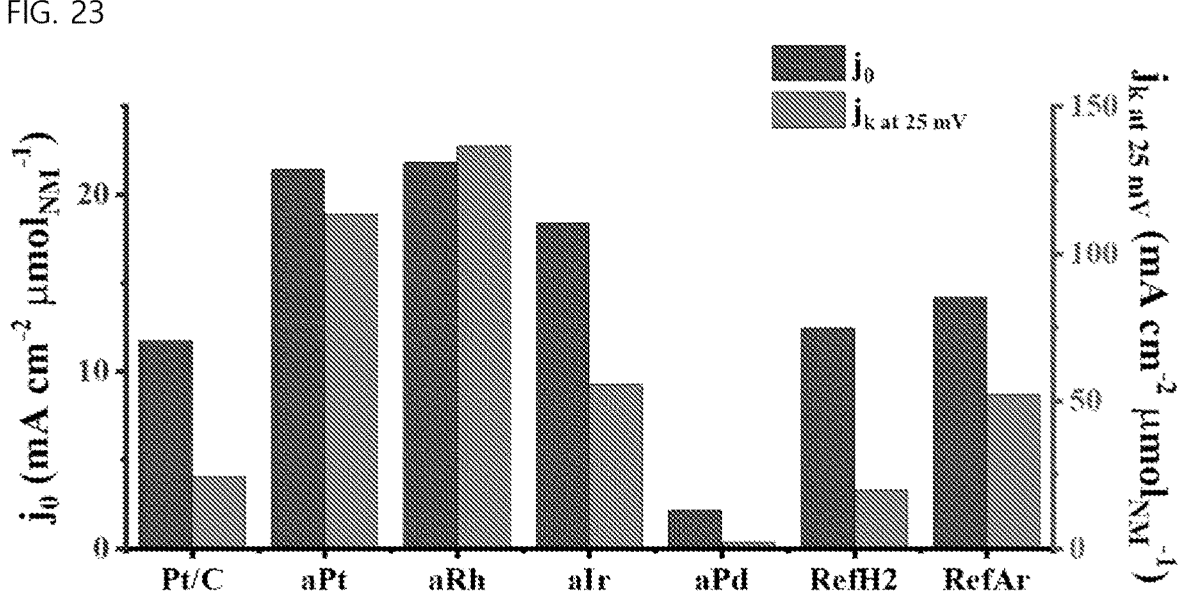
FIG. 23 shows the exchange current density ($j_0$) and diffusion-controlled kinetic current density (at 25 mV vs. RHE) ($j_k$ at 25 mV) of aNM-$Mo_xC$ nanocomposites prepared in Examples 1-5 and Comparative Example 2 and an existing Pt/C catalyst under basic condition (1 M KOH ($H_2$ purged), 1 mV/s) per mole of noble metal for identifying HOR performance.

FIG. 23 shows the exchange current density ($j_0$) and diffusion-controlled kinetic current density (at 25 mV vs. RHE) ($j_k$ at 25 mV) of the aNM-$Mo_xC$ nanocomposites prepared in Examples 1-5 and Comparative Example 2 and the existing Pt/C catalyst under basic condition (1 M KOH ($H_2$ purged), 1 mV/s) per mole of noble metal for identifying HOR performance.

Referring to FIG. 23, the current density per mole of noble metal at 25 mV (vs. RHE) was 5 times for the aPt-$Mo_xC$ of Example 1, 6 times for the aRh-$Mo_xC$ of Example 4, and 1.6 times for the alr-$Mo_xC$ of Example 2 as compared to the existing Pt/C. That is to say, the Pt, Rh and Ir ADCs synthesized through high-temperature dynamic arrangement exhibited performance excelling that of Pt/C. Through this, it can be seen that the major factor of performance improvement is the improvement of kinetic characteristics, such improvement is achieved only in the nanocomposites synthesized through high-temperature dynamic arrangement, and the performance per noble metal is enhanced significantly as a result.

Figure 24:
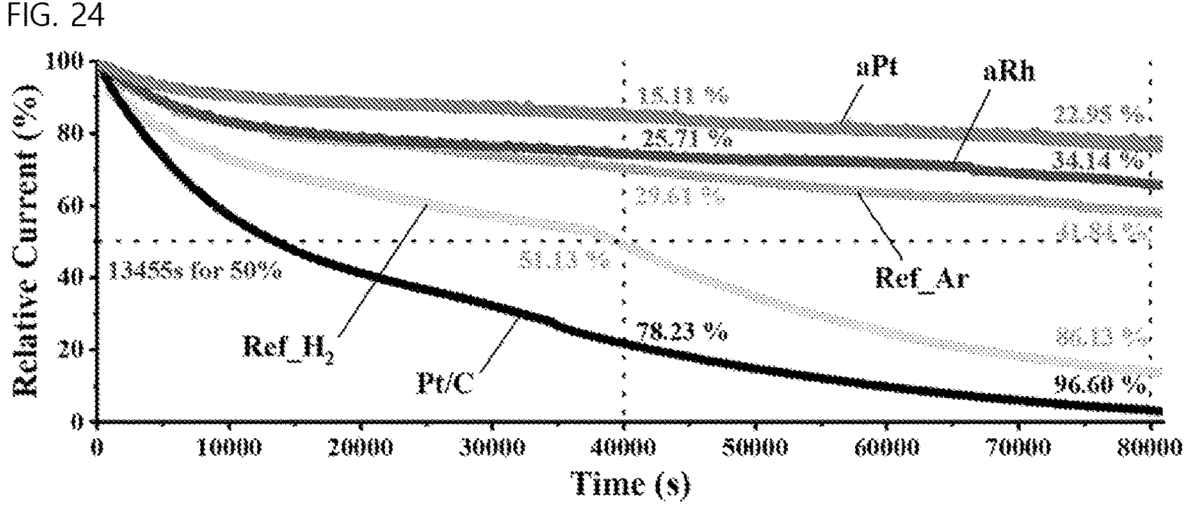
FIG. 24 shows a result of conducting chronoamperometry at 100 mV (vs. RHE) for nanocomposites prepared in Examples 1, 4 and 5 and Comparative Example 2 and an existing Pt/C catalyst under basic condition (1 M KOH ($H_2$ purged), 1 mV/s) for identifying HOR stability.

FIG. 24 shows a result of conducting chronoamperometry at 100 mV (vs. RHE) for the nanocomposites prepared in Examples 1, 4 and 5 and Comparative Example 2 and the existing Pt/C catalyst under basic condition (1 M KOH ($H_2$ purged), 1 mV/s) for identifying HOR stability.

Referring to FIG. 24, as a result of evaluating stability at 100 mV (vs. RHE) for 40000 seconds, current density loss was 78.23% for the existing Pt/C, 25.71% for the aPt-$Mo_xC$ of Example 1, 15.11% for the aRh-$Mo_xC$ of Example 4, 29.61% for the Pt-RefAr of Example 5, and 51.13% for the Pt-Ref$H_2$ of Comparative Example 2. That is to say, the nanocomposites synthesized through high-temperature dynamic arrangement had remarkable stability excelling that of the existing Pt/C and Comparative Example 2 synthesized at low temperature, because of strong interaction between the synthesized Pt and Rh ADCs and $Mo_xC$. The numbers indicate the loss of current density as compared to the initial current density at the corresponding time. This result is due to the significantly improved kinetic characteristics per noble metal owing to the superior water dissociation characteristics of $Mo_xC$.

Test Example 7: Evaluation of CO Tolerance and Stability of aNM-$Mo_xC$ Under Basic Condition The CO tolerance and stability of the aNM-$Mo_xC$ nanocomposites prepared in Examples 1-5 and Comparative Example 2 and the existing Pt/C catalyst under basic condition were evaluated. The catalytic performance of the synthesized nanocomposites was evaluated in 1 M KOH using an RDE system (1600 rpm, $H_2$, 1000 ppm CO purged) for investigation of applicability as HOR catalysts under basic condition. The result is shown in FIGS. 25-29.

Figure 25:
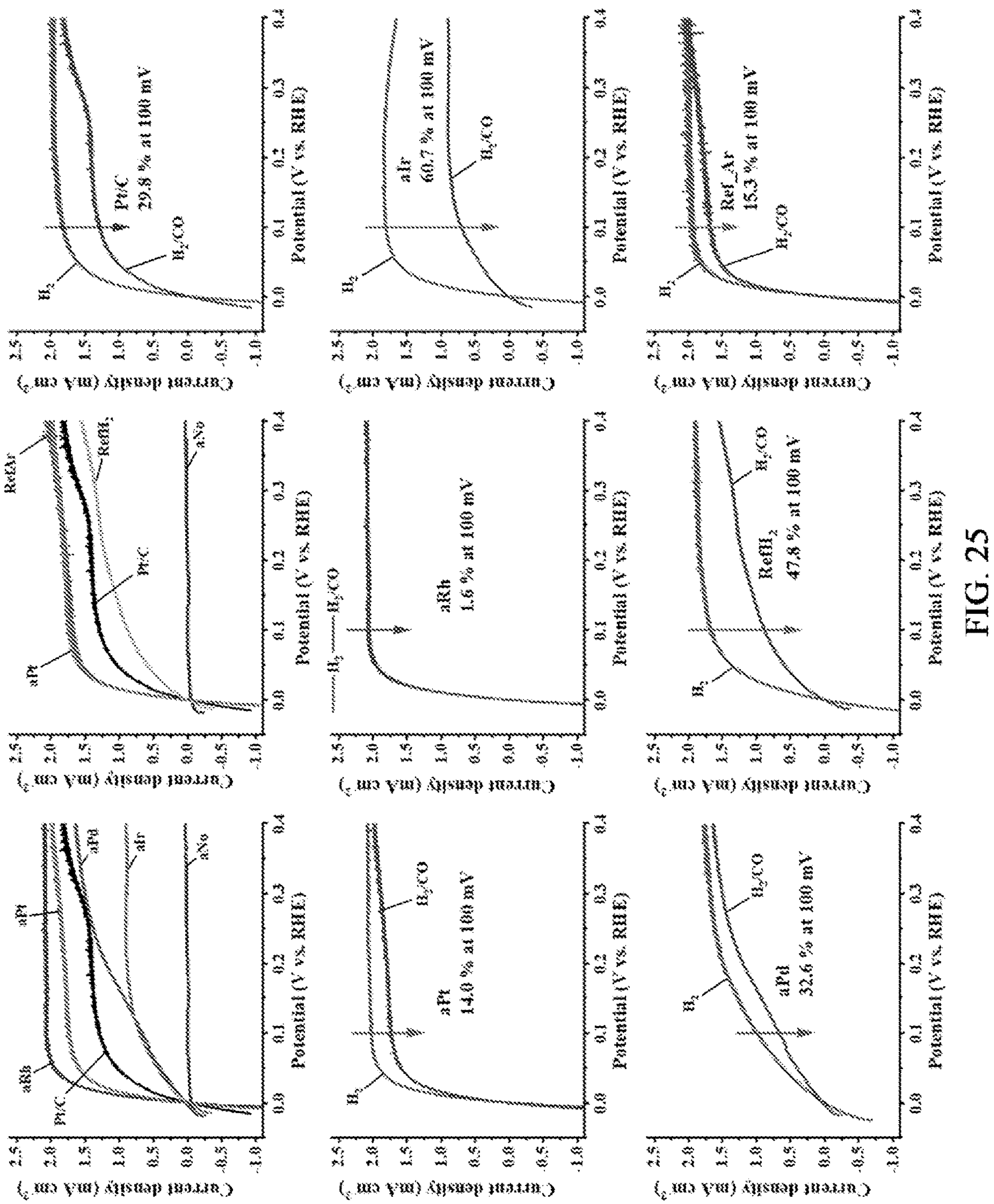
FIG. 25 shows the LSV curves of aNM-$Mo_xC$ nanocomposites prepared in Examples 1-5 and Comparative Example 2 and an existing Pt/C catalyst under basic condition (1 M KOH ($H_2$ with 1000 ppm CO purged), 1 mV/s) for identifying CO tolerance in HOR.

FIG. 25 shows the LSV curves of the aNM-$Mo_xC$ nanocomposites prepared in Examples 1-5 and Comparative Example 2 and the existing Pt/C catalyst under basic condition (1 M KOH ($H_2$ with 1000 ppm CO purged), 1 mV/s) for identifying CO tolerance in HOR.

Referring to FIG. 25, when LSV was conducted at a scan rate of 1 mV/s, the current density ($mA/cm^2$) at 25 mV (vs. RHE) and decrease as compared to the case only $H_2$ was purged ($(1-j_{H2}/j_{H2/CO})\times100$, %) were 0.706 $mA/cm^2$ and 29.8% for the existing Pt/C, 1.279 $mA/cm^2$ and 14.0% for the aPt-$Mo_xC$ of Example 1, 1.609 $mA/cm^2$ and 1.6% for the aRh-$Mo_xC$ of Example 4, 0.269 $mA/cm^2$ and 60.7% for the alr-$Mo_xC$ of Example 2, 0.225 $mA/cm^2$ and 32.6% for the aPd-$Mo_xC$ of Example 3, 0.363 $mA/cm^2$ and 47.8% for the Pt-Ref$H_2$ of Comparative Example 2, and 1.256 $mA/cm^2$ and 15.3% for the Pt-RefAr of Example 5. In particular, the Pt and Rh ADCs of Examples 1 and 4 wherein the noble metal was selectively arranged on the $Mo_xC$ surface in atomic scale showed significantly improved CO tolerance because the current density was 2 times that of the existing Pt/C. In addition, the current loss was only about half, and the Rh—$Mo_xC$ of Example 4 was hardly affected by CO poisoning.

FIG. 26 shows the exchange current density ($j_0$) and diffusion-controlled kinetic current density (at 25 mV vs. RHE) ($j_k$ at 25 mV) of the aNM-$Mo_xC$ nanocomposites prepared in Examples 1-5 and Comparative Example 2 and the existing Pt/C catalyst for HOR under basic condition (1 M KOH ($H_2$ with 1000 ppm CO purged), 1 mV/s).

Referring to FIG. 26, the exchange current density ($j_0$) and the diffusion-controlled kinetic current density (25 mV) were calculated as 1.117 $mA/cm^2$ and 1.274 $mA/cm^2$ for the existing Pt/C, 2.489 $mA/cm^2$ and 5.565 $mA/cm^2$ for the aPt-$Mo_xC$ of Example 1, 3.313 $mA/cm^2$ and 16.749 $mA/cm^2$ for the aRh-$Mo_xC$ of Example 4, 0.378 $mA/cm^2$ and 0.412 $mA/cm^2$ for the alr-$Mo_xC$ of Example 2, 0.244 $mA/cm^2$ and 0.270 $mA/cm^2$ for the aPd-$Mo_xC$ of Example 3, 0.504 $mA/cm^2$ and 0.506 $mA/cm^2$ for the Pt-Ref$H_2$ of Comparative Example 2, and 2.539 $mA/cm^2$ and 4.453 $mA/cm^2$ for the Pt-RefAr of Example 5. That is to say, the CO tolerance of the Pt and Rh ADCs synthesized through high-temperature dynamic arrangement greatly excelled that of the existing Pt/C. Through this, it can be seen that the Pt and Rh ADCs having superior performance even in the presence of CO is because of improved thermodynamic and kinetic characteristics, change in the electrochemical structure and the superior water dissociation characteristics of $Mo_xC$. Particularly, the Rh ADC showed remarkably superior performance.

FIG. 27 shows the exchange current density ($j_0$) and diffusion-controlled kinetic current density (at 25 mV vs. RHE) ($j_k$ at 25 mV) of the aNM-$Mo_xC$ nanocomposites prepared in Examples 1-5 and Comparative Example 2 and the existing Pt/C catalyst for HOR under basic condition (1 M KOH ($H_2$ with 1000 ppm CO purged), 1 mV/s) per mass of noble metal.

Referring to FIG. 27, the $j_k$ at 25 mV (vs. RHE) per mass of noble metal was 7 times for the aPt-$Mo_xC$ nanocomposite of Example 1 and 4 times for the Pt-RefAr nanocomposite of Example 5 as compared to the existing Pt/C. That is to say, it can be seen that the nanocomposites synthesized through high-temperature dynamic arrangement show superior utilization of the noble metal excelling that of the commercial Pt/C. Through this, it can be seen that the Pt and Rh ADCs having superior performance even in the presence of CO is because of improved thermodynamic and kinetic characteristics, change in the electrochemical structure and the superior water dissociation characteristics of $Mo_xC$. Particularly, the Rh ADC showed remarkably superior performance per noble metal.

FIG. 28 shows the exchange current density ($j_0$) and diffusion-controlled kinetic current density (at 25 mV vs. RHE) ($j_k$ at 25 mV) of the aNM-$Mo_xC$ nanocomposites prepared in Examples 1-5 and Comparative Example 2 and the existing Pt/C catalyst for HOR under basic condition (1 M KOH ($H_2$ with 1000 ppm CO purged), 1 mV/s) per mole of noble metal.

Referring to FIG. 28, the current density at 25 mV (vs. RHE) per mole of noble metal was 7 times for the aPt-$Mo_xC$ nanocomposite of Example 1 and 20 times for the aRh-$Mo_xC$ of Example 4 nanocomposite as compared to the existing Pt/C. That is to say, it can be seen that the performance of the Pt and Rh ADCs synthesized through high-temperature dynamic arrangement excelled that of the existing Pt/C. Through this, it can be seen that the Pt and Rh ADCs having superior performance even in the presence of CO is because of improved thermodynamic and kinetic characteristics, change in the electrochemical structure and the superior water dissociation characteristics of $Mo_xC$. Particularly, the Rh ADC showed remarkably superior performance per noble metal.

Figure 29:
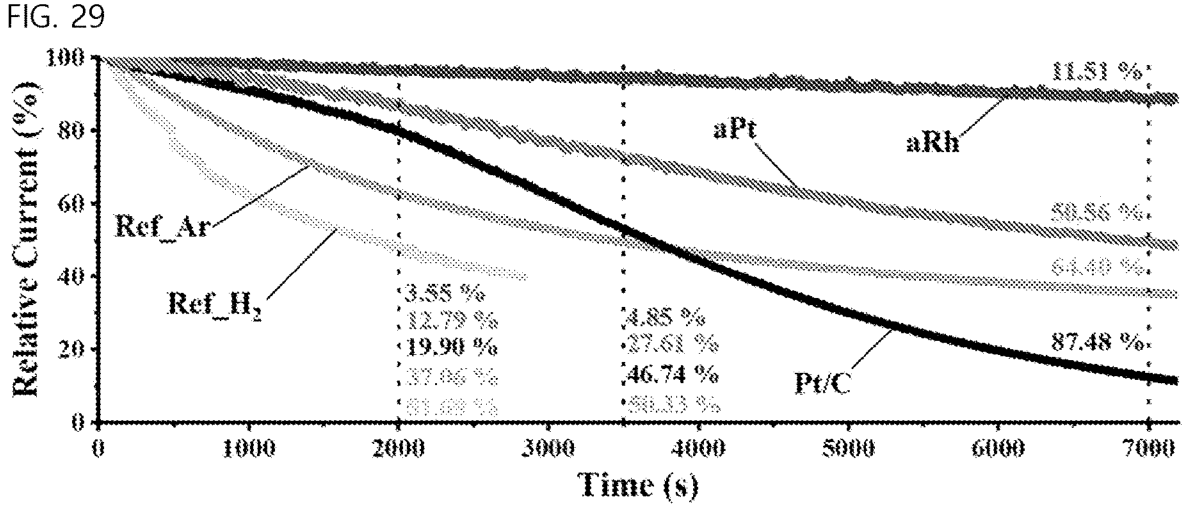
FIG. 29 shows a result of conducting chronoamperometry at 100 mV (vs. RHE) for aNM-$Mo_xC$ nanocomposites prepared in Examples 1-5 and Comparative Example 2 and an existing Pt/C catalyst for HOR under basic condition (1 M KOH ($H_2$ with 1000 ppm CO purged), 1 mV/s).

FIG. 29 shows a result of conducting chronoamperometry at 100 mV (vs. RHE) for the aNM-$Mo_xC$ nanocomposites prepared in Examples 1-5 and Comparative Example 2 and the existing Pt/C catalyst for HOR under basic condition (1 M KOH ($H_2$ with 1000 ppm CO purged), 1 mV/s).

Referring to FIG. 29, as a result of evaluating stability at 100 mV (vs. RHE) for 7000 seconds, current density loss was 87.48% for the existing Pt/C, 50.56% for the aPt-$Mo_xC$ of Example 1, 15.11% for the aRh-$Mo_xC$ of Example 4, and 64.40% for the Pt-RefAr of Example 5. That is to say, the Pt and Rh ADCs synthesized through high-temperature dynamic arrangement had remarkable stability excelling that of the existing Pt/C and Comparative Example 2 synthesized at low temperature, because of strong interaction between the synthesized Pt and Rh ADCs and $Mo_xC$. The numbers indicate the loss of current density as compared to the initial current density at the corresponding time. Particularly, it can be seen that the Rh ADC shows very low decrease in performance caused by CO as compared to other samples.

Such superior CO tolerance is because OH* adsorbed on the $Mo_xC$ surface allows easy removal of CO that may be adsorbed on the noble metal catalytic sites or the change in the geometric or electrochemical structure due to the ADC structure of the noble metal leads to change in the binding strength of CO.

What is claimed is:

1. A noble metal single atom and cluster-porous molybdenum carbide/carbon nanocomposite comprising:

a porous carbon support;

molybdenum carbide nanoparticles bonded on the porous carbon support;

wherein the molybdenum carbide of the molybdenum carbide nanoparticles has a modified valence structure formed after bonding to the porous carbon support;

a noble metal catalyst supported on the molybdenum carbide nanoparticles as being dispersed as a mixture of single atoms and clusters;

a plurality of mesopores formed between the porous carbon support, wherein the noble metal catalyst is metallic and selectively bonded only on the surface of the molybdenum carbide nanoparticles as the noble metal catalyst is dynamically arranged in atomic scale.

2. The noble metal single atom and cluster-porous molybdenum carbide/carbon nanocomposite according to claim 1, wherein the molybdenum carbide nanoparticles are $\alpha$-MoC, $\beta$-$Mo_2C$ or a mixture thereof.

3. The noble metal single atom and cluster-porous molybdenum carbide/carbon nanocomposite according to claim 1, wherein the noble metal catalyst is one or more metal selected from the group consisting of Pt, Ir, Pd, Rh and Ru;

wherein when the noble metal catalyst is Pt, the noble metal single atom or cluster-porous molybdenum carbide/carbon nanocomposite exhibits an XPS first effective peak and a second effective peak at binding energies of 70-72 eV.

4. The noble metal single atom and cluster-porous molybdenum carbide/carbon nanocomposite according to claim 1, wherein the loading amount of the noble metal catalyst is 0.5-8 wt % based on 100 wt % of the noble metal single atom and cluster-porous molybdenum carbide/carbon nanocomposite.

5. The noble metal single atom and cluster-porous molybdenum carbide/carbon nanocomposite according to claim 1, wherein the noble metal single atom and cluster-porous molybdenum carbide/carbon nanocomposite has a pore volume of 0.2-0.7 $cm^3/g$ and a pore size of 20-40 nm.

6. The noble metal single atom and cluster-porous molybdenum carbide/carbon nanocomposite according to claim 1, wherein the noble metal single atom and cluster-porous molybdenum carbide/carbon nanocomposite has a BET surface area of 355 to 520 $m^2/g$.

7. A catalyst for hydrogen evolution reaction comprising the noble metal single atom and cluster-porous molybdenum carbide/carbon nanocomposite according to claim 1.

8. An electrode comprising the catalyst according to claim 7.

9. An apparatus for hydrogen evolution comprising the electrode according to claim 8, a counter electrode and an electrolyte or an ionic liquid.

10. A catalyst for hydrogen oxidation reaction comprising the noble metal single atom and cluster-porous molybdenum carbide/carbon nanocomposite according to claim 1.

11. An electrode comprising the catalyst according to claim 10.

12. An apparatus for hydrogen oxidation reaction comprising the electrode according to claim 11, a counter electrode and an electrolyte or an ionic liquid.

13. A method for preparing a noble metal single atom or cluster-porous molybdenum carbide/carbon nanocomposite, comprising:

(a) preparing a mixture solution wherein an amphiphilic block copolymer, a molybdenum precursor, a carbon precursor, an organic polymer and a noble metal catalyst precursor are mixed in a solvent;

(b) preparing a composite wherein the molybdenum precursor, the carbon precursor, the organic polymer and the noble metal catalyst precursor are dispersed in a hydrophilic polymer of the amphiphilic block copolymer through evaporation-induced self-assembly (EISA) by removing the solvent from the mixture solution;

(c) preparing a composite wherein a noble metal catalyst is dispersed in a porous molybdenum carbide/carbon composite support as the amphiphilic block copolymer is removed and mesopores are formed by heat-treating the composite of (b) firstly under inert gas atmosphere;

(d) controlling the valence electronic structure of molybdenum carbide by heat-treating the firstly heat-treated composite secondly under atmosphere of a mixture of inert gas and oxygen gas; and (e) preparing a noble metal single atom or cluster-porous molybdenum carbide/carbon nanocomposite wherein the noble metal catalyst is redispersed and bonded on the porous molybdenum carbide/carbon composite support in the form of single atoms, clusters or a mixture thereof by heat-treating the secondly heat-treated composite thirdly under inert gas atmosphere, wherein the noble metal catalyst is selectively bonded on molybdenum carbide nanoparticles of the noble metal single atom or cluster-porous molybdenum carbide/carbon nanocomposite as it is dynamically arranged in atomic scale.

14. The method for preparing a noble metal single atom or cluster-porous molybdenum carbide/carbon nanocomposite according to claim 13, wherein the amphiphilic block copolymer is one or more selected from the group consisting of poly(ethylene oxide)-b-poly(styrene), poly(ethylene oxide)-b-poly(methyl methacrylate), poly(isoprene)-b-poly(ethylene oxide), poly(isoprene)-b-poly(styrene)-b-poly(ethylene oxide), poly(4-tert-butyl) styrene-block-polyethylene oxide and a Pluronic-based commercial block copolymer (P123, F127 or F108).

15. The method for preparing a noble metal single atom or cluster-porous molybdenum carbide/carbon nanocomposite according to claim 13, wherein the noble metal catalyst precursor is a precursor comprising one or more metal selected from the group consisting of Pt, Ir, Pd, Rh and Ru.

16. The method for preparing a noble metal single atom or cluster-porous molybdenum carbide/carbon nanocomposite according to claim 13, wherein the evaporation-induced self-assembly in (b) is performed at 40-80° C.

17. The method for preparing a noble metal single atom or cluster-porous molybdenum carbide/carbon nanocomposite according to claim 13, wherein, the step (b) further comprises a step of polymerizing the carbon precursor and the organic polymer in the composite by performing annealing at 90-120° C. for 45-52 hours after removing the solvent.

18. The method for preparing a noble metal single atom or cluster-porous molybdenum carbide/carbon nanocomposite according to claim 13, wherein the amphiphilic block copolymer is one or more selected from the group consisting of poly(ethylene oxide)-b-poly(styrene), poly(ethylene oxide)-b-poly(methyl methacrylate) and poly(isoprene)-b-poly(ethylene oxide), the solvent is tetrahydrofuran, ethanol or a mixture thereof, the molybdenum precursor is phosphomolybdic acid, molybdenyl acetylacetonate or a mixture thereof, the carbon precursor is phenol-formaldehyde, the organic polymer is melamine-formaldehyde, the noble metal catalyst is Pt, Rh or a mixture thereof, in the step (b), the evaporation-induced self-assembly is performed at 45-60° C., the step (b) further comprises a step of polymerizing the carbon precursor and the organic polymer in the composite by performing annealing at 90-120° C. for 45-52 hours after removing the solvent, the first heat treatment is performed at 630-780° C., the second heat treatment is performed at 130-160° C., the third heat treatment is performed at 1000-1200° C.,
the inert gas is argon,
the molybdenum carbide nanoparticles are a mixture of $\alpha$-MoC and $\beta$-$Mo_2C$,
the loading amount of the noble metal catalyst is 4-6 wt % based on 100 wt % of the noble metal single atom or cluster-porous molybdenum carbide/carbon nanocomposite,
the noble metal single atom or cluster-porous molybdenum carbide/carbon nanocomposite has a pore volume of 0.35-0.55 $cm^3$/g and a pore size of 22-37 nm, and
the noble metal single atom or cluster-porous molybdenum carbide/carbon nanocomposite has a BET surface area of 368-416 $m^2$/g.

19. The method for preparing a noble metal single atom or cluster-porous molybdenum carbide/carbon nanocomposite according to claim 18, wherein
the amphiphilic block copolymer is poly(ethylene oxide)-b-poly(styrene),
the solvent is tetrahydrofuran,
the molybdenum precursor is phosphomolybdic acid,
the carbon precursor is phenol-formaldehyde,
the organic polymer is melamine-formaldehyde,
the noble metal catalyst is Pt,
in the step (b), the evaporation-induced self-assembly is performed at 48-53° C.,
the step (b) further comprises a step of polymerizing the carbon precursor and the organic polymer in the composite by performing annealing at 90-120° C. for 45-52 hours after removing the solvent,
the first heat treatment is performed at 670-720° C.,
the second heat treatment is performed at 145-155° C.,
the third heat treatment is performed at 1050-1150° C.,
the inert gas is argon,
the molybdenum carbide nanoparticles are a mixture of $\alpha$-MoC and $\beta$-$Mo_2C$,
the loading amount of the noble metal catalyst is 4.6-5.3 wt % based on 100 wt % of the noble metal single atom or cluster-porous molybdenum carbide/carbon nanocomposite,
the noble metal single atom or cluster-porous molybdenum carbide/carbon nanocomposite has a pore volume of 0.4-0.53 $cm^3$/g and a pore size of 28-37 nm,
the noble metal single atom or cluster-porous molybdenum carbide/carbon nanocomposite has a BET surface area of 405-407 $m^2$/g, and
the noble metal single atom or cluster-porous molybdenum carbide/carbon nanocomposite exhibits a first effective peak and a second effective peak at binding energies of 70-72 eV and 74-76 eV as a result of XPS analysis, and the ratio of the intensity of the first effective peak to the intensity of the second effective peak is 0.7-0.9.

20. A method for preparing a noble metal single atom or cluster-porous molybdenum carbide/carbon nanocomposite, comprising:
(a) preparing a mixture solution wherein an amphiphilic block copolymer, a molybdenum precursor, a carbon precursor and an organic polymer are mixed in a solvent;
(b) preparing a composite wherein the molybdenum precursor, the carbon precursor and the organic polymer are dispersed in a hydrophilic polymer of the amphiphilic block copolymer through evaporation-induced self-assembly (EISA) by removing the solvent from the mixture solution;
(c) preparing a porous molybdenum carbide/carbon composite support as the amphiphilic block copolymer is removed and mesopores are formed by heat-treating the composite of (b) firstly under inert gas atmosphere;
(d) controlling the valence electronic structure of molybdenum carbide by heat-treating the firstly heat-treated porous molybdenum carbide/carbon composite support secondly under atmosphere of a mixture of inert gas and oxygen gas; and
(e) dispersing a noble metal catalyst precursor solution in a dispersion comprising the secondly heat-treated porous molybdenum carbide/carbon composite support and then supporting the noble metal catalyst precursor on the porous molybdenum carbide/carbon composite support by wet impregnation; and
(f) preparing a noble metal single atom or cluster-porous molybdenum carbide/carbon nanocomposite wherein the noble metal catalyst is redispersed and bonded on the porous molybdenum carbide/carbon composite support in the form of single atoms, clusters or a mixture thereof by heat-treating the porous molybdenum carbide/carbon composite support on which the noble metal catalyst precursor is supported thirdly,
wherein, in (f), the noble metal catalyst is selectively bonded on molybdenum carbide nanoparticles of the porous molybdenum carbide/carbon nanocomposite as it is dynamically arranged in atomic scale.

* * * * *